United States Patent
Muruganathan et al.

(10) Patent No.: US 11,811,688 B2
(45) Date of Patent: Nov. 7, 2023

(54) REDUCED DENSITY CHANNEL STATE INFORMATION REFERENCE SIGNAL

(71) Applicant: Telefonaktiebolaget LM Ericsson (publ), Stockholm (SE)

(72) Inventors: Siva Muruganathan, Stittsville (CA); Mattias Frenne, Uppsala (SE); Shiwei Gao, Nepean (CA); Robert Mark Harrison, Grapevine, TX (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1438 days.

(21) Appl. No.: 16/088,348

(22) PCT Filed: Mar. 30, 2017

(86) PCT No.: PCT/SE2017/050307
§ 371 (c)(1),
(2) Date: Sep. 25, 2018

(87) PCT Pub. No.: WO2017/171617
PCT Pub. Date: Oct. 5, 2017

(65) Prior Publication Data
US 2020/0304258 A1   Sep. 24, 2020

Related U.S. Application Data

(60) Provisional application No. 62/317,063, filed on Apr. 1, 2016.

(51) Int. Cl.
*H04L 5/00* (2006.01)
(52) U.S. Cl.
CPC .......... *H04L 5/0048* (2013.01); *H04L 5/0007* (2013.01); *H04L 5/0057* (2013.01)

(58) Field of Classification Search
CPC .... H04L 5/0048; H04L 5/0007; H04L 5/0057
See application file for complete search history.

(56) References Cited

U.S. PATENT DOCUMENTS

| | | | |
|---|---|---|---|
| 2015/0036606 A1* | 2/2015 | Ji | H04L 5/0055 370/329 |
| 2015/0063286 A1* | 3/2015 | Robert Safavi | H04L 5/0053 370/329 |

(Continued)

FOREIGN PATENT DOCUMENTS

| | | |
|---|---|---|
| JP | 2016509785 A | 11/2015 |
| JP | 2019513336 A | 5/2019 |

(Continued)

OTHER PUBLICATIONS

PCT International Search Report for International application No. PCT/SE2017/050307—dated Jun. 29, 2017.

(Continued)

*Primary Examiner* — Atique Ahmed
(74) *Attorney, Agent, or Firm* — Christopher & Weisberg, P.A.

(57) ABSTRACT

According to some embodiments, a method for use in a network node of transmitting channel state information reference signals (CSI-RS) comprises transmitting a number M of CSI-RS ports to one or more wireless devices. A fraction of the M ports are transmitted over a first physical resource block (PRB) and a remaining fraction of the M ports are transmitted over a second PRB. Some embodiments further comprise mapping the number M of CSI-RS ports to resource elements of a radio subframe. A fraction of the M ports are mapped to a first PRB of the subframe and a remaining fraction of the M ports are mapped to a second PRB of the subframe.

20 Claims, 27 Drawing Sheets

(56) References Cited

U.S. PATENT DOCUMENTS

| | | | |
|---|---|---|---|
| 2015/0318972 A1 | 11/2015 | Zhang et al. | |
| 2016/0050153 A1* | 2/2016 | Xu | H04L 47/125 370/230 |
| 2016/0248562 A1* | 8/2016 | Nam | H04L 5/0051 |
| 2016/0278073 A1* | 9/2016 | Dinan | H04L 5/001 |
| 2017/0207932 A1* | 7/2017 | Kim | H04L 5/00 |
| 2017/0237535 A1* | 8/2017 | Park | H04L 5/0035 370/329 |
| 2019/0109686 A1* | 4/2019 | Jiang | H04L 5/0053 |

FOREIGN PATENT DOCUMENTS

| | | |
|---|---|---|
| WO | 2014166052 A1 | 10/2014 |
| WO | 2017166108 A1 | 10/2017 |

OTHER PUBLICATIONS

3GPP TSG RAN WG1 Meeting #82-bis; Malmo, Sweden; Source: ITL Inc.; Title: Details on 12-and 16-port NZP CSI-RS resource configuration for FD-MIMO (R1-155773)—Oct. 5-9, 2015.

3GPP TSG RAN WG1 Meeting #82bis; Malmo, Sweden; Source: ETRI; Title; CSI-RS design for 12 and 16 ports (R1-155836)—Oct. 5-9, 2015.

3GPP TSG RAN WG1 Meeting #83; Anaheim, US; Source: Huawei, HiSilicon; Title: Discussion on CSI-RS design and signalling for 12 and 16 ports (R1-157489)—Nov. 15-22, 2015.

PCT Written Opinion of the International Searching Authority For International application No. PCT/SE2017/050307—dated Jun. 29, 2017.

3GPP TS 36.213 Technical Specification Group Radio Access Network; Evolved Universal Terrestrial Radio Access (E-UTRA); Physical layer procedures (Release 13); V13.0.1 (Jan. 2016); ftp://www.3gpp.org/specs/archive/36_series/36.213/36213-d01.zip.

3GPP TS 36.211 Technical Specification Group Radio Access Network; Evolved Universal Terrestrial Radio Access (E-UTRA); Physical channels and modulation (Release 13); V13.0.0 (Dec. 2015); ftp://www.3gpp.org/specs/archive/36_series/36.211/36211-d00.zip.

3GPP TS 36.331 Technical Specification Group Radio Access Network; Evolved Universal Terrestrial Radio Access (E-UTRA); Radio Resource Control (RRC); Protocol specification (Release 13); V13.0.0 (Dec. 2015); ftp://www.3gpp.org/specs/archive/36_series/36.331/36331-d00.zip.

Japanese Patent Office, Office Action 2018-548219, dated Sep. 2, 2019; pages.

"Extension of Non-Precoded CSI-RS for 12 and 16 Ports"; 3GPP TSG RAN WG1 Meeting #82bis; Malmö, Sweden (R1-155264); Oct. 5-9, 2015; 7 pages.

"Discussions on CSI-RS for LTE-Advanced"; 3GPP TSG RAN WG1 Meeting #58bis; Miyazaki, Japan (R1-094089); Oct. 12-16, 2009; 6 pages.

"CSI-RS enhancaments to support more than 8 CSI-RS ports"; 3GPP TSG RAN WG1 Meeting #81; Fukuoka, Japan (R1-153007); May 25-29, 2019; 6 pages.

"Discussion on 12 and 16 port non-precoded CSI-RS design"; 3GPP TSG RAN W31 Meeting #82; Beijing, China (R1-154273); Aug. 24-28, 2019; 3 pages.

Ohtsuka Patent Office, Japan, Appln. No. 2018-548219, letter dated Jan. 23, 2020 regarding Final Rejection dated Dec. 13, 2019.

Ohtsuka Patent Office, Japan Appln. No. 2016-0548219, Final Rejection dated Dec. 13, 2019, with Summary of Final Rejection of Japanese Patent Application No. 2018-548219 in English: 8 pages total.

3GPP TSG RAN WG1 Meeting #82bis, Malmö, Sweden: Oct. 5-9, 2015; R1-155263; ZTE, Ttitle: Extension of Non-Precoded CSI-RS for 12-16 Ports; 5 pages.

* cited by examiner

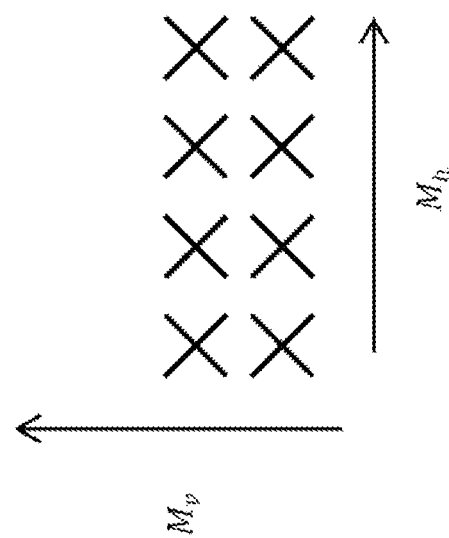
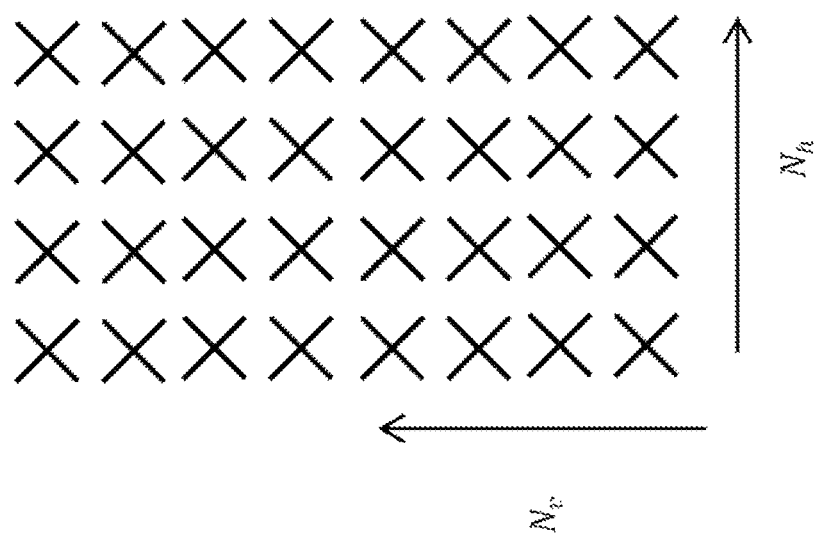
Fig. 5

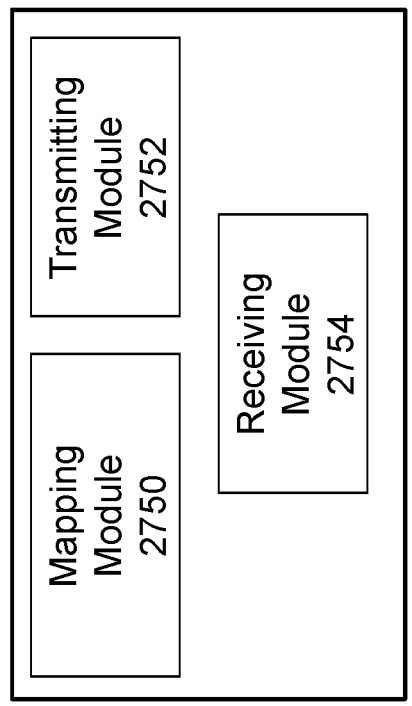
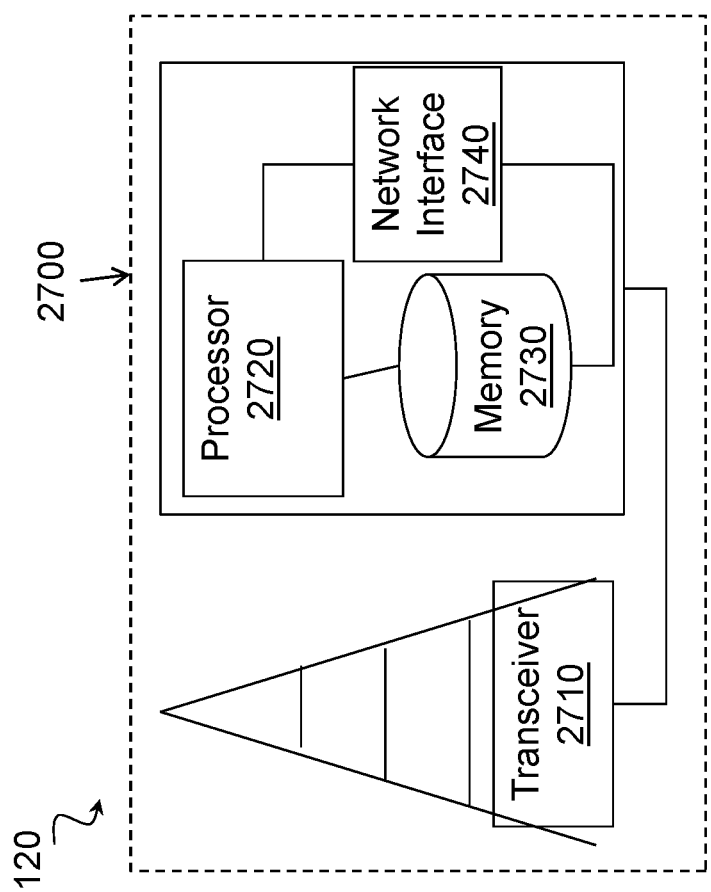
Fig. 27B
Fig. 27A

REDUCED DENSITY CHANNEL STATE INFORMATION REFERENCE SIGNAL

PRIORITY

This nonprovisional application is a U.S. National Stage Fling under 35 U.S.C. § 371 of International Patent Application Ser. No. PCT/SE2017/050307 filed Mar. 30, 2017, and entitled "REDUCED DENSITY CHANNEL STATE INFORMATION REFERENCE SIGNAL" which claims priority to U.S. Provisional Patent Application No. 62/317,063 filed Apr. 1, 2016, both of which are hereby incorporated by reference in their entirety.

TECHNICAL FIELD

Particular embodiments are directed to wireless communications and, more particularly, to a reduced density channel state information reference signal (CSI-RS).

BACKGROUND

Third Generation Partnership Project (3GPP) Long Term Evolution (LTE) uses Orthogonal Frequency Division Multiplexing (OFDM) in the downlink, where each downlink symbol may be referred to as an OFDM symbol, and Discrete Fourier Transform (DFT)-spread OFDM in the uplink, where each uplink symbol may be referred to as an SC-FDMA symbol.

The basic LTE downlink physical resource comprises a time-frequency grid as illustrated in FIG. 1.

The next generation mobile wireless communication system (5G or NR), supports a diverse set of use cases and a diverse set of deployment scenarios. The later includes deployment at both low frequencies (100s of MHz), similar to LTE today, and very high frequencies (mm waves in the tens of GHz). At high frequencies, propagation characteristics make achieving good coverage challenging. One solution to the coverage issue is to employ high-gain beamforming, typically in an analog manner, to achieve satisfactory link budget. Beamforming may also be used at lower frequencies (typically digital beamforming), and is expected to be similar in nature to the already standardized 3GPP LTE system (4G).

FIG. 1 illustrates an example downlink radio subframe. The horizontal axis represents time and the other axis represents frequency. Radio subframe 10 includes resource elements 12. Each resource element 12 corresponds to one OFDM subcarrier during one OFDM symbol interval. In the time domain, LTE downlink transmissions may be organized into radio frames.

LTE and NR use OFDM in the downlink and DFT-spread OFDM or OFDM in the uplink. The basic LTE or NR downlink physical resource can thus be seen as a time-frequency grid as illustrated in FIG. 1, where each resource element corresponds to one OFDM subcarrier during one OFDM symbol interval. Although a subcarrier spacing of $\Delta f=15$ kHz is shown in FIG. 1, different subcarrier spacing values are supported in NR. The supported subcarrier spacing values (also reference to as different numerologies) in NR are given by $\Delta f=(15 \times 2^{\alpha})$ kHz where $\alpha$ is a non-negative integer.

FIG. 2 illustrates an example radio frame. Radio frame 14 includes subframes 10. In LTE, each radio frame 14 is 10 ms and consists of ten equally-sized subframes 10 of length Tsubframe=1 ms. In LTE, for normal cyclic prefix, one subframe consists of 14 OFDM symbols and the duration of each symbol is approximately 71.4 as. In NR, subframe length is fixed at 1 ms regardless of the numerology used. In NR, the slot duration for a numerology of $(15 \times 2^{\alpha})$ kHz is given by $1/2^{\alpha}$ ms assuming 14 OFDM symbols per slot, and the number of slots per subframe depends on the numerology.

Users are allocated a specific number of subcarriers for a predetermined amount of time. These are referred to as physical resource blocks (PRBs). PRBs thus have both a time and frequency dimension. In LTE, a resource block corresponds to one slot (0.5 ms) in the time domain and 12 contiguous subcarriers in the frequency domain. Resource blocks are numbered in the frequency domain, starting with 0 from one end of the system bandwidth. For NR, a resource block is also 12 subcarriers in frequency but may span one or more slots in the time domain.

Downlink transmissions are dynamically scheduled, i.e., in each subframe the base station transmits control information about to which terminals data is transmitted and upon which resource blocks the data is transmitted, in the current downlink subframe. The control signaling is typically transmitted in the first 1, 2, 3 or 4 OFDM symbols in each subframe.

FIG. 3 illustrates an example downlink subframe. Subframe 10 includes reference symbols and control signaling. In the illustrated example, the control region includes 3 OFDM symbols. The reference symbols include cell specific reference symbols (CRS) which may support multiple functions including fine time and frequency synchronization and channel estimation for certain transmission modes.

LTE includes codebook-based precoding. Multi-antenna techniques can significantly increase the data rates and reliability of a wireless communication system. The performance is in particular improved if both the transmitter and the receiver are equipped with multiple antennas, which results in a multiple-input multiple-output (MIMO) communication channel. Such systems and/or related techniques are commonly referred to as MIMO.

The LTE standard is currently evolving with enhanced MIMO support. A core component in LTE is the support of MIMO antenna deployments and MIMO related techniques. Currently, LTE-Advanced supports an 8-layer spatial multiplexing mode for 8 Tx antenna ports with channel dependent precoding. LTE-Advanced Pro adds 8-layer spatial multiplexing support for 2D/1D port layouts with 8/12/16 Tx antenna ports with channel dependent precoding. The spatial multiplexing mode applies for high data rates in favorable channel conditions. FIG. 4 illustrates example spatial multiplexing operation.

FIG. 4 is a block diagram illustrating the logical structure of precoded spatial multiplexing mode in LTE. The information carrying symbol vector s is multiplied by an $N_T \times r$ precoder matrix W, which serves to distribute the transmit energy in a subspace of the $N_T$ (corresponding to $N_T$ antenna ports) dimensional vector space.

The precoder matrix is typically selected from a codebook of possible precoder matrices, and is typically indicated by a precoder matrix indicator (PMI), which specifies a unique precoder matrix in the codebook for a given number of symbol streams. The r symbols in s each correspond to a layer and r is referred to as the transmission rank. Spatial multiplexing is achieved because multiple symbols can be transmitted simultaneously over the same time/frequency resource element (TFRE). The number of symbols r is typically adapted to suit the current channel properties.

LTE uses OFDM in the downlink (and DFT precoded OFDM in the uplink). The received $N_R \times 1$ vector $y_n$ for a certain TFRE on subcarrier n (or alternatively data TFRE number n) is thus modeled by $$y_n = H_n W s_n + e_n \qquad \text{Equation 1}$$

where $e_n$ is a noise/interference vector. The precoder W can be a wideband precoder, which is constant over frequency, or frequency selective.

The precoder matrix is often chosen to match the characteristics of the $N_R \times N_T$ MIMO channel matrix $H_n$, which may be referred to as channel dependent precoding. This is also commonly referred to as closed-loop precoding and essentially attempts to focus the transmit energy into a subspace which is strong in the sense of conveying much of the transmitted energy to the UE. In addition, the precoder matrix may also be selected to orthogonalize the channel, meaning that after proper linear equalization at the UE, the inter-layer interference is reduced.

The transmission rank, and thus the number of spatially multiplexed layers, is reflected in the number of columns of the precoder. For efficient performance, a transmission rank may be selected to match the channel properties.

Two-dimensional antenna arrays where each antenna element has an independent phase and amplitude control enables beamforming both in the vertical and in the horizontal dimensions. Such antenna arrays may be (partly) described by the number of antenna columns corresponding to the horizontal dimension $N_h$, the number of antenna rows corresponding to the vertical dimension $N_v$, and the number of dimensions corresponding to different polarizations $N_p$. The total number of antenna elements is thus $N = N_h N_v N_p$. An example of an antenna where $N_h = 4$ and $N_v = 8$ is illustrated in FIG. 5. Furthermore, the antenna elements are cross-polarized antenna elements, meaning that $N_p = 2$. Such an antenna may be referred to as an 8×4 antenna array with cross-polarized antenna elements.

FIG. 5 illustrates an example cross polarized antenna array. Particularly, the example illustration includes a two-dimensional antenna array of cross-polarized antenna elements ($N_p = 2$), with $N_h = 4$ horizontal antenna elements and $N_v = 8$ vertical antenna elements. The figure to the right illustrates the actual port layout with 2 vertical ports and 4 horizontal ports. This could, for example, be obtained by virtualizing each port by 4 vertical antenna elements. Thus, assuming cross-polarized ports are present, a UE will measure 16 antenna ports in this example.

The actual number of elements in the antenna array, however, may not be known to the UE. Rather, the UE may be aware of antenna ports, where each port corresponds to a CSI (channel state information) reference signal described in more detail below. The UE can thus measure the channel from each of these ports. Therefore, a two-dimensional port layout may be described by the number of antenna ports in the horizontal dimension $M_h$, the number of antenna rows corresponding to the vertical dimension $M_v$, and the number of dimensions corresponding to different polarizations $M_p$. The total number of antenna ports is thus $M = M_h M_v M_p$. The mapping of these ports to the N antenna elements is an eNB implementation issue and thus not necessarily known to the UE. The UE may not even know the value of N. It may only know the value of the number of ports M.

LTE Rel-12 UE and earlier only supports a codebook feedback for a one-dimensional port layout with 2, 4 or 8 antenna ports. Thus, the codebook is designed assuming these ports are arranged on a straight line. LTE Rel-13 specifies codebooks for two-dimensional port layouts for the case of 8, 12, or 16 antenna ports. In addition, LTE Rel-13 specifies a codebook one-dimensional port layout for the case of 16 antenna ports. The specified Rel-13 codebooks for the two-dimensional port layouts can be interpreted as a combination of precoders tailored for a horizontal array and a vertical array of antenna ports. This means that (at least part of) the precoder can be described as a function of $$v_{l,m} = \left[ u_m \quad e^{j\frac{2\pi l}{O_2 N_2}} \quad \ldots \quad e^{j\frac{2\pi l(N_1-1)}{O_1 N_1}} u_m \right]^T \qquad \text{Equation 2}$$

$$u_m = \left[ 1 \quad e^{j\frac{2\pi m}{O_2 N_2}} \quad \ldots \quad e^{j\frac{2\pi m(N_2-1)}{O_2 N_2}} \right] \qquad \text{Equation 3}$$

In Equations 2 and 3, the parameters $N_1$ and $N_2$ denote the number of ports in the 1st dimension and the 2nd dimension, respectively. For one-dimensional port layouts, $N_2 = 1$ and urn in Equation 3 becomes 1. The 1st dimension can either be the horizontal dimension or the vertical dimension and the 2nd dimension represents the other dimension. In other words, using the notation of FIG. 5, we could have the following two possibilities: (1) $N_1 = M_h$ and $N_2 = M_v$, (2) $N_1 = M_v$ and $N_2 = M_h$.

The $O_1$ and $O_2$ parameters in Equations 2 and 3 represent the beam spatial oversampling factors in dimensions 1 and 2, respectively. The values of $N_1$, $N_2$, $O_1$ and $O_2$ are configured by RRC signaling. The supported configurations of $(O_1, O_2)$ and $(N_1, N_2)$ for a given number of CSI-RS ports are given in Table 7.2.4-17 of 3GPP TS 36.213, which is reproduced in Table 1.

TABLE 1

Supported configurations of $(O_1, O_2)$ and $(N_1, N_2)$

| Number of CSI-RS antenna ports | $(N_1, N_2)$ | $(O_1, O_2)$ |
| --- | --- | --- |
| 8 | (2, 2) | (4, 4), (8, 8) |
| 12 | (2, 3) | (8, 4), (8, 8) |
|  | (3, 2) | (8, 4), (4, 4) |
| 16 | (2, 4) | (8, 4), (8, 8) |
|  | (4, 2) | (8, 4), (4, 4) |
|  | (8, 1) | (4, —), (8, —) |

The details of the LTE Rel-13 codebooks defined using the quantity $v_{1,m}$ in Equation 2 can be found in Tables 7.2.4-10, 7.2.4-11, 7.2.4-12, 7.2.4-13, 7.2.4-14, 7.2.4-15, 7.2.4-16, and 7.2.4-17 of 3GPP TS 36.213.

LTE Release-10 introduced a new reference symbol sequence to estimate channel state information referred to as the Non-Zero Power Channel State Information Reference Symbols (NZP CSI-RS).

The NZP CSI-RS provides several advantages over basing the CSI feedback on the cell-specific reference symbols (CRS) which were used, for that purpose, in previous releases. As one example, the NZP CSI-RS is not used for demodulation of the data signal, and thus does not require the same density (i.e., the overhead of the NZP CSI-RS is substantially less). As another example, NZP CSI-RS provides a flexible means to configure CSI feedback measurements (e.g., which NZP CSI-RS resource to measure can be configured in a UE specific manner).

By measuring on a NZP CSI-RS, a UE can estimate the effective channel the NZP CSI-RS is traversing, including the radio propagation channel and antenna gains. In more mathematical rigor this means that if a known NZP CSI-RS signal x is transmitted, a UE can estimate the coupling between the transmitted signal and the received signal (i.e., the effective channel). Thus, if no virtualization is performed in the transmission, the received signal Y can be expressed as $$y=Hx+e \qquad \text{Equation 4}$$

and the UE can estimate the effective channel H.

Up to eight NZP CSI-RS ports can be configured for a LTE Rel. 11 UE. Thus, the UE can estimate the channel for up to eight transmit antenna ports in LTE Rel-11.

Up to LTE Rel-12, the NZP CSI-RS utilizes an orthogonal cover code (OCC) of length two to overlay two antenna ports on two consecutive resource elements. OCC may alternatively be referred to as code division multiplexing (CDM).

Many different NZP CSI-RS patterns are available. Examples are illustrated in FIG. 6.

FIG. 6 illustrates resource element grids with resource block pairs showing potential positions for CSI-RS for 2, 4, and 8 antenna ports. Each resource element grid represents one PRB 16. The horizontal axis represents the time domain and the vertical axis represents the frequency domain.

For 2 CSI-RS antenna ports, FIG. 6 illustrates the 20 different patterns within a subframe (i.e., the 20 pairs of resource elements labelled 0 and 1). One example pattern is illustrated with cross-hatching.

For 4 CSI-RS antenna ports, the corresponding number of patterns is 10 (i.e., the 10 groups of resource elements labelled 0-3, where resource element pair 0 and 1 and resource element pair 2 and 3 within the same group are separated by 6 resource elements in the frequency domain). One example pattern is illustrated with cross-hatching.

For 8 CSI-RS antenna ports, the corresponding number of patterns is 5 (i.e., the 5 groups of resource elements labelled 0-7, where resource element pair 0 and 1 and resource element pair 2 and 3 within the same group are separated by 6 resource elements in the frequency domain and resource element pair 4 and 5 and resource element pair 6 and 7 within the same group are separated by 6 resource elements in the frequency domain). One example pattern is illustrated with cross-hatching.

The illustrated examples are for frequency division duplex (FDD). For time division duplex (TDD), additional CSI-RS patterns are available.

The reference-signal sequence for CSI-RS is defined in Section 6.10.5.1 of 3GPP TS 36.211 as $$r_{l,n_s}(m) = \frac{1}{\sqrt{2}}(1 - 2 \cdot c(2m)) + j\frac{1}{\sqrt{2}}(1 - 2 \cdot c(2m+1)), \qquad \text{Equation 5}$$

$$m = 0, 1, \ldots, N_{RB}^{max,DL} - 1$$

where $n_s$ is the slot number within a radio frame and l is the OFDM symbol number within the slot. The pseudo-random sequence c(i) is generated and initialized according to Sections 7.2 and 6.10.5.1 of 3GPP TS 36.211, respectively. Furthermore, in Equation 5 $N_{RB}^{max,DL}=110$ is the largest downlink bandwidth configuration supported by 3GPP TS 36.211.

In LTE Rel-13, the NZP CSI-RS resource is extended to include 12 and 16 ports. Such Rel-13 NZP CSI-RS resource is obtained by aggregating three legacy 4 port CSI-RS resources (to form a 12 port NZP CSI-RS resource) or two legacy 8 port CSI-RS resources (to form a 16 port NZP CSI-RS resource). All aggregated NZP CSI-RS resources are located in the same subframe. Examples of forming 12 port and 16 port NZP CSI-RS resources are shown in FIGS. 7A and 7B, respectively.

FIGS. 7A and 7B illustrate resource element grids with resource block pairs showing potential positions for CSI-RS for 12 and 16 antenna ports, respectively. The horizontal axis represents the time domain and the vertical axis represents the frequency domain.

FIG. 7A illustrates an example of aggregating three 4-port resources to form a 12-port NZP CSI-RS resource. Each resource element of the same 4-port resource is labeled with the same number (e.g., the four resources labeled 1 form one 4-port resource, the four resources labeled 2 form a second 4-port resource, and the four resources labeled 3 form a third 4-port resource). Together, the three aggregated 4-port resources form a 12 port resource.

FIG. 7B illustrates an example of aggregating two 8-port resources to form a 16-port NZP CSI-RS resource. Each resource element of the same 8-port resource is labeled with the same number (e.g., the eight resources labeled 1 form one 8-port resource, and the eight resources labeled 2 form a second 8-port resource). Together, the two aggregated 8-port resources form a 16 port resource.

In a given subframe, three 12-port resource configurations (i.e., nine out of ten 4-port resources used) and two 16-port resource configurations (i.e., four out of five 8-port resources used) are possible. The following port numbering is used for the aggregated NZP CSI-RS resources. For 16 NZP CSI-RS ports, the aggregated port numbers are 15, 16, 17, 18, 19, 20, 21, 22, 23, 24, 25, 26, 27, 28, 29 and 30. For 12 NZP CSI-RS ports, the aggregated port numbers are 15, 16, 17, 18, 19, 20, 21, 22, 23, 24, 25 and 26.

In addition, Rel-13 NZP CSI-RS design supports two different OCC lengths. Multiplexing antenna ports is possible using OCC lengths two and four for both 12-port and 16-port NZP CSI-RS. Examples using OCC length two are illustrated in FIGS. 8 and 9. Examples using OCC length four are illustrated in FIGS. 10 and 11.

FIG. 8 illustrates a resource element grid with an example NZP CSI-RS design for 12 ports with OCC length 2. The different 4-port NZP CSI-RS resources are denoted by the letters A-J. For example, 4-port resources A, F, and J could be aggregated to form a 12-port NZP CSI-RS resource. The length 2 OCC is applied across two resource elements with the same sub-carrier index and adjacent OFDM symbol indices (e.g., OCC 2 is applied to the resource elements with OFDM symbol indices 5-6 and sub-carrier index 9 in slot 0).

FIG. 9 illustrates a resource element grid with an example NZP CSI-RS design for 16 ports with OCC length 2. The different 8-port NZP CSI-RS resources are indicated by number (e.g., 0-4). The resource pairs that comprise the 8-port resource are indicated by letter (e.g., A-D). For example, the resource pairs A0, B0, C0 and D0 form one 8-port NZP CSI-RS resource. The resource pairs A3, B3, C3 and D3 form another 8-port NZP CSI-RS resource. 8-port NZP CSI-RS resources 0 and 3, for example, may be aggregated to form a 16-port NZP CSI-RS resource. The length 2 OCC is applied across two resource elements with the same sub-carrier index and adjacent OFDM symbol indices (e.g., OCC 2 is applied to the resource elements with OFDM symbol indices 2-3 and sub-carrier index 7 in slot 1).

For the OCC length 2 case (i.e., when higher layer parameter 'cdmType' is set to cdm2 or when 'cdmType' is not configured by EUTRAN—see 3GPP TS 36.331 for further details), the mapping of the reference signal sequence $r_{l,n_s}$(m) of Equation 5 to the complex-valued modulation symbols $a_{k,l}^{(p)}$ used as reference symbols on antenna port p is defined as:

$$a_{k,l}^{(p)} = w_{l''} \cdot r_{l,n_s}(m') \quad \text{Equation 6}$$

where $$k = k' + 12m + \begin{cases} -0 & \text{for } p' \in \{15, 16\}, \text{normal cyclic prefix} \\ -6 & \text{for } p' \in \{17, 18\}, \text{normal cyclic prefix} \\ -1 & \text{for } p' \in \{19, 20\}, \text{normal cyclic prefix} \\ -7 & \text{for } p' \in \{21, 22\}, \text{normal cyclic prefix} \\ -0 & \text{for } p' \in \{15, 16\}, \text{extended cyclic prefix} \\ -3 & \text{for } p' \in \{17, 18\}, \text{extended cyclic prefix} \\ -6 & \text{for } p' \in \{19, 20\}, \text{extended cyclic prefix} \\ -9 & \text{for } p' \in \{21, 22\}, \text{extended cyclic prefix} \end{cases} \quad \text{Equation 7}$$

$$l = l' + \begin{cases} 1'' & \text{CSI reference signal configurations 0-19,} \\ & \text{normal cyclic prefix} \\ 21'' & \text{CSI reference signal configurations 20-31,} \\ & \text{normal cyclic prefix} \\ 1'' & \text{CSI reference signal configurations 0-27,} \\ & \text{extended cyclic prefix} \end{cases}$$

$$w_{l'} = \begin{cases} 1 & p' \in \{15, 17, 19, 21\} \\ (-1)^{l''} & p' \in \{16, 18, 20, 22\} \end{cases}$$

$$l'' = 0, 1$$

$$m = 0, 1, \ldots, N_{RB}^{DL} - 1$$

-continued $$m' = m + \left\lfloor \frac{N_{RB}^{max,DL} - N_{RB}^{DL}}{2} \right\rfloor$$

In Equations 6 and 7, $N_{RB}^{DL}$ represents the downlink transmission bandwidth; the indices k' and l' indicate the subcarrier index (starting from the bottom of each PRB) and the OFDM symbol index (starting from the right of each slot). The mapping of different (k', l') pairs to different CSI-RS resource configurations is given in Table 2. The quantity p' for the case of OCC length 2 is related to the antenna port number P as follows:

p=p' for CSI-RS using up to 8 antenna ports when higher-layer parameter 'cdmType' is set to cdm2 for CSI-RS using more than 8 antenna ports, then $$p = \begin{cases} p' + \frac{N_{port}^{CSI}}{2}i & \text{for } p' \in \\ & \{15, \ldots, 15 + N_{ports}^{CSI}/2 - 1\} \\ & \text{for } p' \in \\ p' + \frac{N_{ports}^{CSI}}{2}(i + N_{res}^{CSI} - 1) & \{15 + N_{ports}^{CSI}/2, \ldots, \\ & 15 + N_{ports}^{CSI} - 1\} \end{cases} \quad \text{Equation 8}$$

wherein $i \in \{0, 1, \ldots, N_{res}^{CSI} - 1\}$ is the CSI resource number; and $N_{res}^{CSI}$ and $N_{ports}^{CSI}$ respectively denote the number of aggregated CSI-RS resources and the number of antenna ports per aggregated CSI-RS resource. As described above, the allowed values of $N_{res}^{CSI}$ and $N_{ports}^{CSI}$ for the cases of 12 and 16 port NZP CSI-RS design are given in Table 3.

TABLE 2

Mapping from CSI reference signal configuration to (k', l') for normal cyclic prefix - taken from Table 6.10.5.2-1 of 3GPP TS 36.211.

| | Number of CSI reference signals configured | | | | | |
|---|---|---|---|---|---|---|
| | 1 or 2 | | 4 | | 8 | |
| CSI-RS config. | Normal subframe (k', l') $n_s'$ | Special subframe (k', l') $n_s'$ | Normal subframe (k', l') $n_s'$ | Special subframe (k', l') $n_s'$ | Normal subframe (k', l') $n_s'$ | Special subframe (k', l') $n_s'$ |
| 0 | (9, 5) 0 | (9, 5) 0 | (9, 5) 0 | (9, 5) 0 | (9, 5) 0 | (9, 5) 0 |
| 1 | (11, 2) 1 | (11, 5) 0 | (11, 2) 1 | (11, 5) 0 | (11, 2) 1 | (11, 5) 0 |
| 2 | (9, 2) 1 | (9, 2) 1 | (9, 2) 1 | (9, 2) 1 | (9, 2) 1 | (9, 2) 1 |
| 3 | (7, 2) 1 | (7, 5) 0 | (7, 2) 1 | (7, 5) 0 | (7, 2) 1 | (7, 5) 0 |
| 4 | (9, 5) 1 | | (9, 5) 1 | | (9, 5) 1 | |
| 5 | (8, 5) 0 | (8, 5) 0 | (8, 5) 0 | (8, 5) 0 | | |
| 6 | (10, 2) 1 | (10, 5) 0 | (10, 2) 1 | (10, 5) 0 | | |
| 7 | (8, 2) 1 | (8, 2) 1 | (8, 2) 1 | (8, 2) 1 | | |
| 8 | (6, 2) 1 | (6, 5) 0 | (6, 2) 1 | (6, 5) 0 | | |
| 9 | (8, 5) 1 | | (8, 5) 1 | | | |
| 10 | (3, 5) 0 | (3, 5) 0 | | | | |
| 11 | (2, 5) 0 | (2, 5) 0 | | | | |
| 12 | (5, 2) 1 | (5, 5) 0 | | | | |
| 13 | (4, 2) 1 | (4, 5) 0 | | | | |
| 14 | (3, 2) 1 | (3, 2) 1 | | | | |
| 15 | (2, 2) 1 | (2, 2) 1 | | | | |
| 16 | (1, 2) 1 | (1, 5) 0 | | | | |
| 17 | (0, 2) 1 | (0, 5) 0 | | | | |
| 18 | (3, 5) 1 | | | | | |
| 19 | (2, 5) 1 | | | | | |
| 20 | (11, 1) 1 | | (11, 1) 1 | | (11, 1) 1 | |
| 21 | (9, 1) 1 | | (9, 1) 1 | | (9, 1) 1 | |
| 22 | (7, 1) 1 | | (7, 1) 1 | | (7, 1) 1 | |
| 23 | (10, 1) 1 | | (10, 1) 1 | | | |

TABLE 2-continued

Mapping from CSI reference signal configuration to (k', l') for normal cyclic prefix - taken from Table 6.10.5.2-1 of 3GPP TS 36.211.

| | Number of CSI reference signals configured | | | | | |
|---|---|---|---|---|---|---|
| | 1 or 2 | | 4 | | 8 | |
| CSI-RS config. | Normal subframe (k', l') $n_s'$ | Special subframe (k', l') $n_s'$ | Normal subframe (k', l') $n_s'$ | Special subframe (k', l') $n_s'$ | Normal subframe (k', l') $n_s'$ | Special subframe (k', l') $n_s'$ |
| 24 | (8, 1) 1 | | (8, 1) 1 | | | |
| 25 | (6, 1) 1 | | (6, 1) 1 | | | |
| 26 | (5, 1) 1 | | | | | |
| 27 | (4, 1) 1 | | | | | |
| 28 | (3, 1) 1 | | | | | |
| 29 | (2, 1) 1 | | | | | |
| 30 | (1, 1) 1 | | | | | |
| 31 | (0, 1) 1 | | | | | |

Note:
$n_s' = n_s$ mod 2. Configurations 0-19 for normal subframes are available for frame structure types 1, 2 and 3. Configurations 20-31 and configurations for special subframes are available for frame structure type 2 only.

TABLE 3

Aggregation of CSI-RS resources - taken from Table 6.10.5-1 of 3GPP TS 36.211.

| Total number of antenna ports $N_{res}^{CSI} N_{ports}^{CSI}$ | Number of antenna ports per resources $N_{ports}^{CSI}$ | Number of CSI-RS resources $N_{res}^{CSI}$ |
|---|---|---|
| 12 | 4 | 3 |
| 16 | 8 | 2 |

FIG. 10 illustrates a resource element grid with an example NZP CSI-RS design for 12 ports with OCC length 4. The different 4-port NZP CSI-RS resources are denoted by the letters A-J. For example, 4-port resources A, F, and J could be aggregated to form a 12-port NZP CSI-RS resource. A length 4 OCC is applied within a CDM group where a CDM group consists of the 4 resource elements used for mapping legacy 4-port CSI-RS. That is, the resource elements labeled with the same letter comprise one CDM group.

FIG. 11 illustrates a resource element grid with an example NZP CSI-RS design for 16 ports with OCC length 4. The different 8-port NZP CSI-RS resources are indicated by number (e.g., 0-4). The resource pairs that comprise the 8-port resource are indicated by letter (e.g., A-B). For example, the resource pairs labelled A0 and B0 form one 8-port NZP CSI-RS resource. The resource pairs labelled A3 and B3 form another 8-port NZP CSI-RS resource. 8-port NZP CSI-RS resources 0 and 3, for example, may be aggregated to form a 16-port NZP CSI-RS resource. A and B are the CDM groups within each 8-port resource. An OCC with length 4 is applied within each CDM group.

For the OCC length 4 case (i.e., when higher layer parameter 'cdmType' is set to cdm4—see 3GPP TS 36.331 for further details), the mapping of the reference signal sequence $r_{l,n_s}(m)$ of Equation 5 to the complex-valued modulation symbols $a_{k,l}^{(p)}$ used as reference symbols on antenna port p are defined as:

$$a_{k,l}^{(p')} = w_{p'}(i) \cdot r_{l,n_s}(m') \quad \text{Equation 9}$$

where $$k = k' + 12m - \begin{cases} k'' & \text{for } p' \in \{15, 16, 19, 20\}, \\ & \text{normal cyclic prefix, } N_{ports}^{CSI} = 8 \\ k'' + 6 & \text{for } p' \in \{17, 18, 21, 22\}, \\ & \text{normal cyclic prefix, } N_{ports}^{CSI} = 8 \\ 6k'' & \text{for } p' \in \{15, 16, 17, 18\}, \\ & \text{normal cyclic prefix, } N_{ports}^{CSI} = 4 \end{cases} \quad \text{Equation 10}$$

$$l = l' + \begin{cases} 1'' & \text{CSI reference signal configurations 0-19,} \\ & \text{normal cyclic prefix} \\ 21'' & \text{CSI reference signal configurations 20-31,} \\ & \text{normal cyclic prefix} \end{cases}$$

$$1'' = 0, 1$$

$$k'' = 0, 1$$

$$i = 2k'' + 1''$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In Equations 9 and 10, $N_{RB}^{DL}$ represents the downlink transmission bandwidth; $N_{ports}^{CSI}$ denotes the number of antenna ports per aggregated CSI-RS resource; the indices k' and l' indicate the subcarrier index (starting from the bottom of each RB) and the OFDM symbol index (starting from the right of each slot). The mapping of different (k', l') pairs to different CSI-RS resource configurations is given in Table 2. Furthermore, $w_{p'}(i)$ in Equation 9 is given by Table 4. When higher-layer parameter 'cdmType' is set to cdm4 for CSI-RS using more than 8 antenna ports, antenna port number p=i$N_{ports}^{CSI}$+p' where p'∈{15, 16, . . . , 15+$N_{ports}^{CSI}$−1} for CSI-RS resource number i∈{0, 1, . . . , $N_{res}^{CSI}$−1}.

TABLE 4

The sequence $w_{p'}(i)$ for CDM4 - taken
from Table 6.10.5.2-0 of 3GPP TS 36.211

| | p' | |
|---|---|---|
| $N_{ports}^{CSI} = 4$ | $N_{ports}^{CSI} = 8$ | $[w_{p'}(0)\ w_{p'}(1)\ w_{p'}(2)\ w_{p'}(3)]$ |
| 15 | 15, 17 | [1 1 1 1] |
| 16 | 16, 18 | [1 −1 1 −1] |
| 17 | 19, 21 | [1 1 −1 −1] |
| 18 | 20, 22 | [1 −1 −1 1] |

The number of different 12-port and 16-port CSI-RS configurations in a subframe in the LTE Release 13 NZP CSI-RS designs are three and two, respectively. That is, for the 12 port case, three different CSI-RS configurations can be formed where each configuration is formed by aggregating three legacy 4-port CSI-RS configurations. This consumes 36 CSI-RS resource elements of the 40 CSI-RS resource elements available for CSI-RS within a PRB. For the 16 port case, two different CSI-RS configurations can be formed where each configuration is formed by aggregating two legacy 8-port CSI-RS configurations. This consumes 32 CSI-RS resource elements of the 40 CSI-RS resource elements available for CSI-RS within a PRB.

The LTE NZP CSI-RS designs described above include various problems when extending the designs to include more CSI-RS ports. As one example, in the NZP CSI-RS designs of legacy LTE releases (up to and including Release 13), the number of CSI-RS resource elements per PRB equals the number of CSI-RS ports. For example, the number of CSI-RS resource elements per PRB in the 12 port and 16 port CSI-RS designs is 12 and 16, respectively. Thus, one problem with this approach is that the CSI-RS resource element overhead increases if the number of CSI-RS ports increases beyond 16.

Another problem with extending the NZP CSI-RS designs described above to higher CSI-RS port numbers is that the number of available CSI-RS configurations in a subframe may be reduced to one. For example, simply following the method described above, a 32-port NZP CSI-RS design can be obtained by aggregating four legacy 8-port CSI-RS configurations. For example, using 32 CSI-RS resource elements per PRB to form a 32-port NZP CSI-RS design will consume 32 CSI-RS resource elements of the 40 available CSI-RS resource elements. As a result, only one 32-port CSI-RS can be configured in a subframe with this approach. This may be detrimental to channel state information estimation if the same 32-port CSI-RS configuration is utilized in neighboring cells.

One possible solution is to have CSI-RS transmissions of neighboring cells in different subframes. Although this would prevent CSI-RS collision between neighboring cells, CSI-RS transmissions of the serving cell would be interfered with by the PDSCH transmissions from the neighboring cells. The effect of this interference may not be severe in low load conditions but may become more severe at high load conditions. At high load conditions, cell edge UEs may suffer due to the interference caused by PDSCH transmissions in a neighboring cell on the serving cell CSI-RS transmissions (considering that the PDSCH is beamformed and the CSI-RS transmissions are not beamformed in LTE Rel-13 Class A CSI-RS).

To avoid PDSCH interference from neighboring cells, zero power CSI-RS (ZP CSI-RS) can be configured in neighboring cells. However, the overhead associated with ZP CSI-RS transmissions would be significantly higher for CSI-RS transmissions involving a higher number of ports (i.e., 32 ports).

SUMMARY

The embodiments described herein include solutions for transmitting and receiving more than 16 CSI-RS ports in a subframe. In a first example solution, more than 16 CSI-RS ports are transmitted in $N_{res}^{CSI}$ aggregated legacy LTE CSI-RS resources where the number of ports Q transmitted within each such resource is an integer multiple of the number of ports $N_{ports}^{CSI}$ allowed within each such resource in a legacy LTE CSI-RS transmission. In this solution, the transmission of Q CSI-RS ports within each CSI-RS resource is achieved by applying an orthogonal cover code over $Q/N_{ports}^{CSI}$ adjacent resource blocks within the CSI-RS resource.

In a second example solution, more than 16 CSI-RS ports are transmitted in $N_{res}^{CSI}$ aggregated legacy LTE CSI-RS resources where a fraction of the total number of CSI-RS ports are transmitted over the even resource blocks and the remaining CSI-RS ports are transmitted over the odd resource blocks.

A third example solution may be suitable for supporting legacy UEs in a CSI-RS transmission scheme that supports more than 16 ports. In this example solution, CSI-RS ports are achieved via aggregating legacy LTE CSI-RS resources wherein the legacy UE is configured for CSI-RS transmission in one of the aggregated CSI-RS resources and is configured with zero power CSI-RS in all other aggregated CSI-RS resources.

According to some embodiments, a method for use in a network node of transmitting channel state information reference signals (CSI-RS) comprises transmitting a number M of CSI-RS ports to one or more wireless devices. A fraction of the M ports are transmitted over a first physical resource block (PRB) and a remaining fraction of the M ports are transmitted over a second PRB. The network node may map the M CSI-RS ports to resource elements of a radio subframe. A fraction of the M ports may be mapped to a first PRB of the subframe and a remaining fraction of the M ports may be mapped to a second PRB of the subframe. In particular embodiments, the method further comprises receiving, from a wireless device, a measured channel state information based on one or more of the transmitted CSI-RS ports. The first PRB may be an odd numbered PRB of a subframe and the second PRB may be an even numbered PRB of the subframe.

In particular embodiments, the mapping comprises grouping the resource elements of the radio subframe into a plurality of aggregated CSI-RS resources. Each aggregated CSI-RS resource comprises a number $N_{ports}^{CSI}$ of resource elements per PRB, wherein $N_{ports}^{CSI}$ comprises two, four, or eight resource elements. The mapping further comprises combining a number ($\tilde{N}_{res}^{CSI}$) of the plurality of aggregated CSI-RS resources to carry the M CSI-RS ports. A number (Q) of antenna ports carried within each aggregated CSI-RS resource is an integer multiple of $N_{ports}^{CSI}$.

In particular embodiments, M is greater than sixteen. For example, M may be equal to thirty-two. The resource elements of the first PRB may comprise at least two groups of aggregated CSI-RS resources, wherein each of the at least two groups comprises eight resource elements and carries eight antenna ports. The resource elements of the second PRB may comprise at least two groups of aggregated CSI-RS resources, wherein each of the at least two groups comprises eight resource elements and carries eight antenna ports. A length eight orthogonal cover code (OCC) may be used across the eight antenna ports of each of the at least two groups of aggregated CSI-RS resources of the first PRB and the second PRB.

As another example, M is equal to twenty. The resource elements of the first PRB may comprise at least three groups of aggregated CSI-RS resources. Each of the at least three groups comprises four resource elements and carries four antenna ports. The resource elements of the second PRB comprise at least two groups of aggregated CSI-RS resources, wherein each of the at least two groups comprises four resource elements and carries four antenna ports. A length four orthogonal cover code (OCC) may be used across the four antenna ports of each of the at least three groups of aggregated CSI-RS resources of the first resource block and the at least two groups of aggregated CSI-RS resources of the second resource block.

As another example, M is equal to twenty-eight. The resource elements of the first PRB may comprise at least four groups of aggregated CSI-RS resources, wherein each of the at least four groups comprises four resource elements and carries four antenna ports. The resource elements of the second PRB may comprise at least three groups of aggregated CSI-RS resources, wherein each of the at least three groups comprises four resource elements and carries four antenna ports. A length four orthogonal cover code (OCC) may be used across the four antenna ports of each of the at least four groups of aggregated CSI-RS resources of the first resource block and the at least three groups of aggregated CSI-RS resources of the second resource block.

In particular embodiments, the number of CSI-RS ports transmitted in the first PRB is not equal to the number of CSI-RS ports transmitted in the second PRB.

According to some embodiments, a method for use in a wireless device of receiving CSI-RS comprises receiving a number M of CSI-RS ports. A fraction of the M ports are received over a first PRB and a remaining fraction of the M ports are received over a second PRB. In particular embodiments, the M CSI-RS ports are mapped to resource elements of a radio subframe. A fraction of the M ports are mapped to a first PRB of the subframe and a remaining fraction of the M ports are mapped to a second PRB of the subframe. The method may further comprise measuring a channel of the received CSI-RS ports to estimate an effective channel, and transmitting a measured channel state information to a network node. M is greater than sixteen.

In particular embodiments, the first PRB is an odd numbered PRB of a subframe and the second PRB is an even numbered PRB of the subframe. The mapping may comprise grouping the resource elements of the radio subframe into a plurality of aggregated CSI-RS resources. Each aggregated CSI-RS resource may comprise a number $N_{ports}^{CSI}$ of resource elements per PRB (e.g., two, four, or eight resource elements). The mapping may further comprise combining a number ($\tilde{N}_{res}^{CSI}$) of the plurality of aggregated CSI-RS resources to carry the M CSI-RS ports. A number (Q) of antenna ports carried within each aggregated CSI-RS resource is an integer multiple of $N_{ports}^{CSI}$.

In particular embodiments, the number of CSI-RS ports transmitted in the first PRB is not equal to the number of CSI-RS ports transmitted in the second PRB.

According to some embodiments, a network node operable to transmit CSI-RS comprises processing circuitry. The processing circuitry is operable to transmit a number M of CSI-RS ports to one or more wireless devices. A fraction of the M ports are transmitted over a first PRB, and a remaining fraction of the M ports are transmitted over a second PRB. In some embodiments, the processing circuitry is operable to map the M CSI-RS ports to resource elements of a radio subframe. A fraction of the M ports are mapped to a first PRB of the subframe and a remaining fraction of the M ports are mapped to a second PRB of the subframe. The processing circuitry may be further operable to receive, from a wireless device, a channel estimation based on one or more of the transmitted CSI-RS ports. The first PRB may be an odd numbered PRB of a subframe and the second PRB may be an even numbered PRB of the subframe. M is greater than sixteen.

In particular embodiments, the processing circuitry maps the M CSI-RS ports to resource elements of the radio subframe by grouping the resource elements of the radio subframe into a plurality of aggregated CSI-RS resources. Each aggregated CSI-RS resource comprises a number $N_{ports}^{CSI}$ of resource elements per PRB (e.g., two, four, or eight resource elements). The mapping further comprises combining a number ($\tilde{N}_{res}^{CSI}$) of the plurality of aggregated CSI-RS resources to carry the M CSI-RS ports, wherein a number (Q) of antenna ports carried within each aggregated CSI-RS resource is an integer multiple of $N_{ports}^{CSI}$. In particular embodiments, the number of CSI-RS ports transmitted in the first PRB is not equal to the number of CSI-RS ports transmitted in the second PRB.

According to some embodiments, a wireless device operable to receive CSI-RS comprises processing circuitry. The processing circuitry is operable to receive a number M of CSI-RS ports, wherein a fraction of the M ports are received over a first PRB and a remaining fraction of the M ports are received over a second PRB. In some embodiments, the M CSI-RS ports are mapped to resource elements of a radio subframe. A fraction of the M ports are mapped to a first PRB of the subframe, and a remaining fraction of the M ports are mapped to a second PRB of the subframe. The first PRB may be an odd numbered PRB of a subframe, and the second PRB may be an even numbered PRB of the subframe. M is greater than sixteen. The processing circuitry may be further operable to measure a channel of the received CSI-RS ports to estimate an effective channel, and transmit a measured channel state information to a network node.

In particular embodiments, the mapping comprises grouping the resource elements of the radio subframe into a plurality of aggregated CSI-RS resources. Each aggregated CSI-RS resource comprises a number $N_{ports}^{CSI}$ of resource elements per PRB (e.g., two, four, or eight resource elements). The mapping further comprises combining a number ($\tilde{N}_{res}^{CSI}$) of the plurality of aggregated CSI-RS resources to carry the M CSI-RS ports. A number (Q) of antenna ports carried within each aggregated CSI-RS resource is an integer multiple of $N_{ports}^{CSI}$.

In particular embodiments, the number of CSI-RS ports transmitted in the first PRB is not equal to the number of CSI-RS ports transmitted in the second PRB.

According to some embodiments, a network node operable to transmit CSI-RS comprises a transmitting module. The transmitting module is operable to transmit a number M of CSI-RS ports to one or more wireless devices. A fraction of the M ports are transmitted over a first PRB, and a remaining fraction of the M ports are transmitted over a second PRB.

According to some embodiments, a wireless device operable to receive CSI-RS comprises a receiving module. The receiving module is operable to receive a number M of CSI-RS ports. A fraction of the M ports are received over a first PRB and a remaining fraction of the M ports are received over a second PRB.

Also disclosed is a computer program product. The computer program product comprises instructions stored on non-transient computer-readable media which, when executed by a processor, perform the act of transmitting a number M of CSI-RS ports to one or more wireless devices. A fraction of the M ports are transmitted over a first PRB, and a remaining fraction of the M ports are transmitted over a second PRB.

Another computer program product comprises instructions stored on non-transient computer-readable media which, when executed by a processor, perform the acts of receiving a number M of CSI-RS ports. A fraction of the M ports are received over a first PRB and a remaining fraction of the M ports are received over a second PRB.

Particular embodiments may exhibit some of the following technical advantages. For example, particular embodiments may reduce the CSI-RS RE overhead compared to the approach of limiting each aggregated resource to $N_{ports}^{CSI}$ CSI-RS ports as done in LTE Release 13 CSI-RS design. Furthermore, since each aggregated CSI-RS resource carries more than $N_{ports}^{CSI}$ CSI-RS ports per resource, the number of NZP CSI-RS resources that need to be aggregated may be reduced. This means that the number of available CSI-RS configurations in a subframe does not have to be reduced.

The third example solution described above supports legacy UEs in a CSI-RS transmission scheme that supports more than 16 ports. Other technical advantages will be readily apparent to one skilled in the art from the following figures, description and claims.

BRIEF DESCRIPTION OF THE DRAWINGS

For a more complete understanding of the embodiments and their features and advantages, reference is now made to the following description, taken in conjunction with the accompanying drawings, in which:

FIG. 5 illustrates an example cross polarized antenna array;

FIG. 27A is a block diagram illustrating an example embodiment of a network node; and FIG. 27B is a block diagram illustrating example components of a network node.

DETAILED DESCRIPTION

Third Generation Partnership Project (3GPP) Long Term Evolution (LTE) uses Non-Zero Power Channel State Information Reference Symbols (NZP CSI-RS) as a flexible means to configure channel state information (CSI) feedback measurements. By measuring on a NZP CSI-RS, a user equipment (UE) can estimate the effective channel the NZP CSI-RS is traversing, including the radio propagation channel and antenna gains.

Figures 7A, 7B:
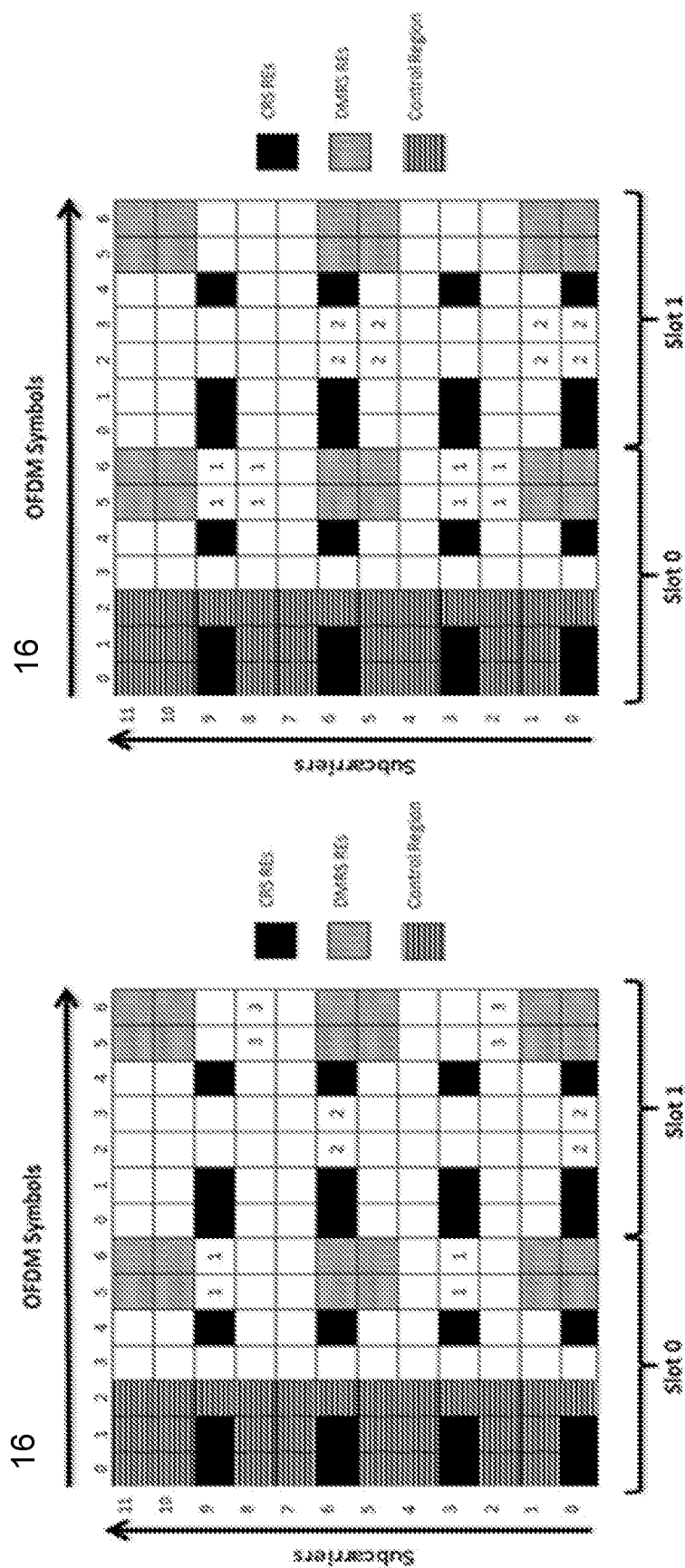
FIGS. 7A and 7B illustrate resource element grids with resource block pairs showing potential positions for CSI-RS for 12 and 16 antenna ports, respectively.
Figure 8:
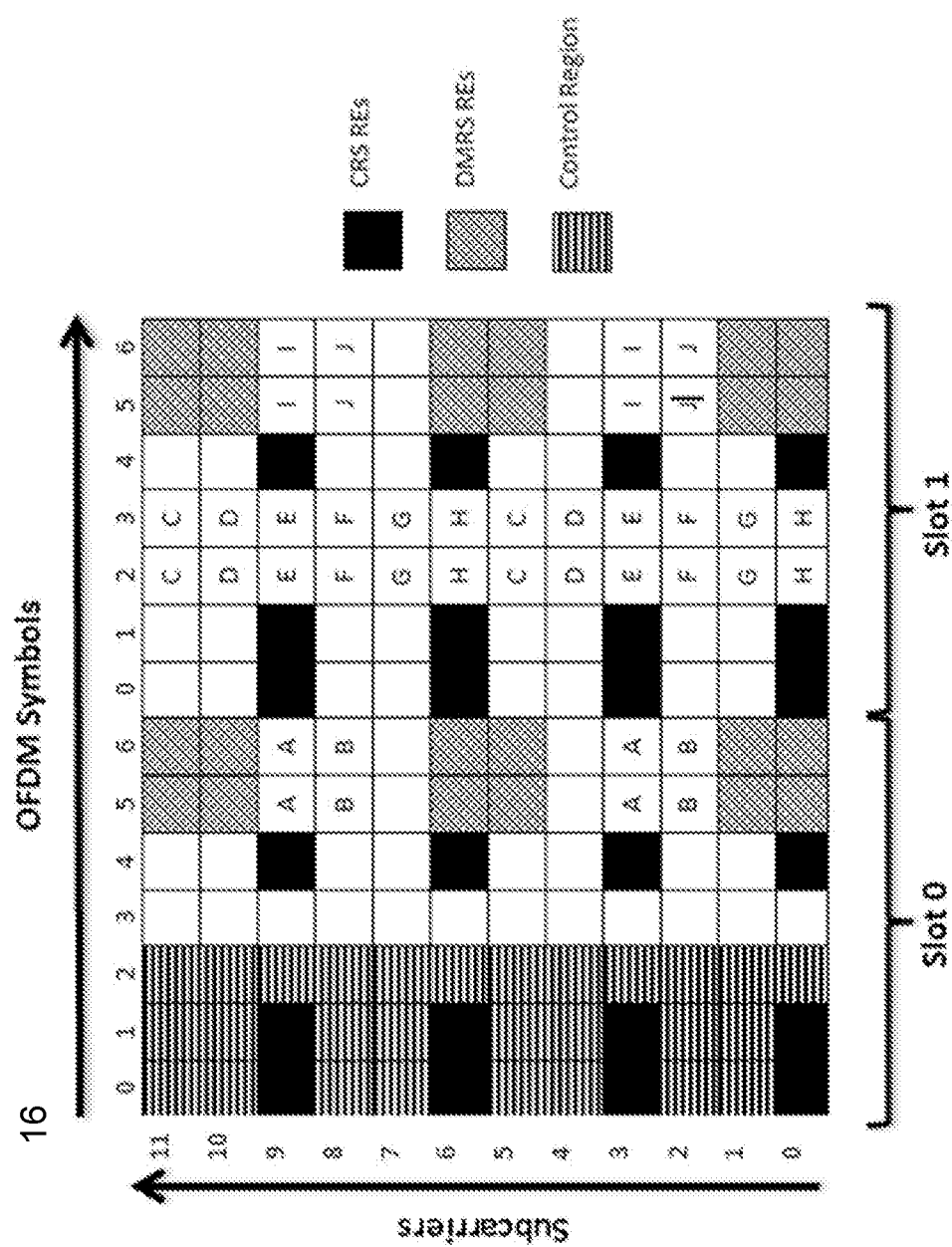
FIG. 8 illustrates a resource element grid with an example NZP CSI-RS design for 12 ports with OCC length 2.
Figure 9:
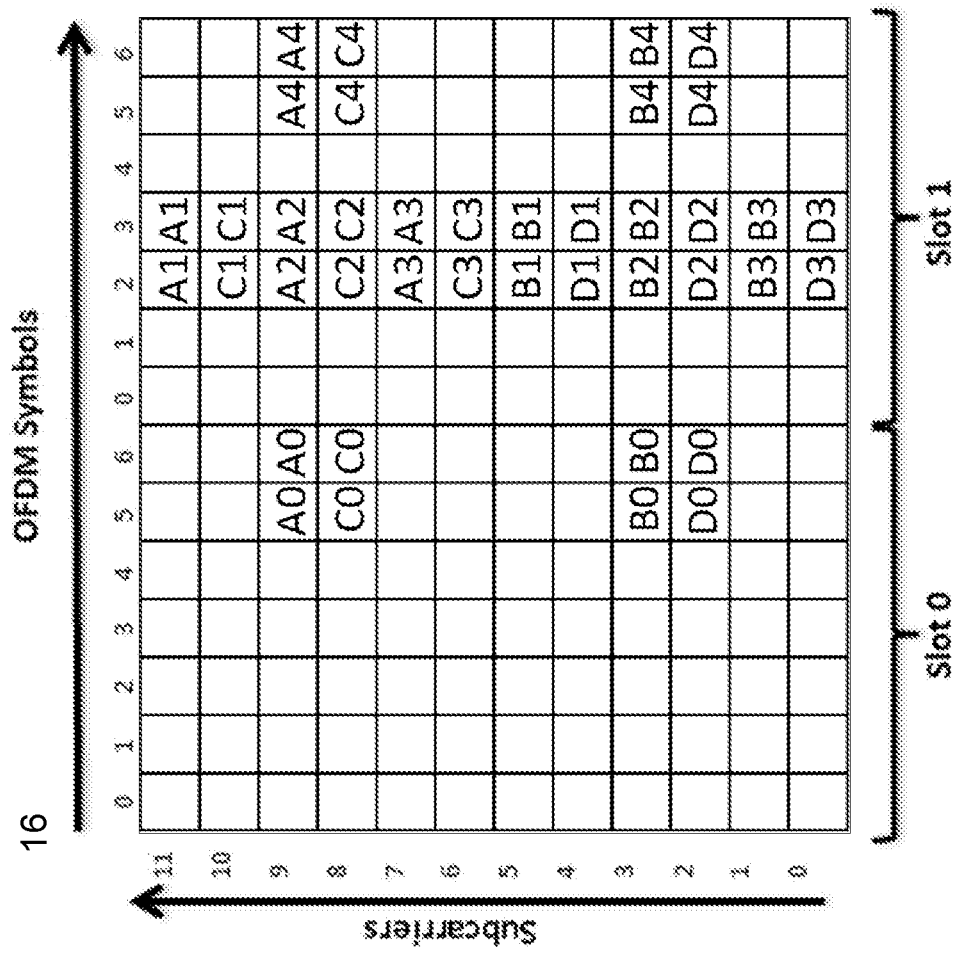
FIG. 9 illustrates a resource element grid with an example NZP CSI-RS design for 16 ports with OCC length 2.
Figure 10:
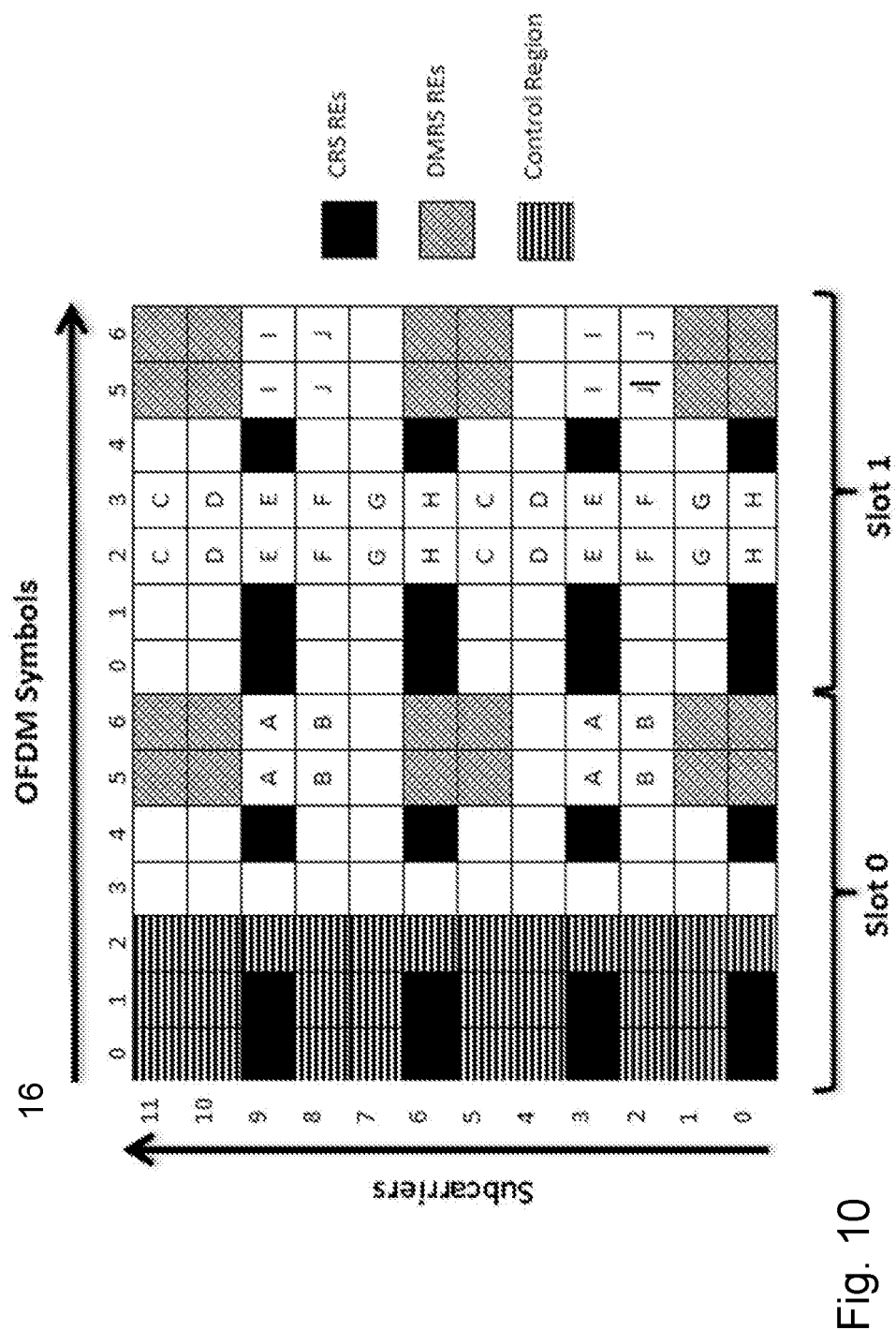
FIG. 10 illustrates a resource element grid with an example NZP CSI-RS design for 12 ports with OCC length 4.
Figure 11:
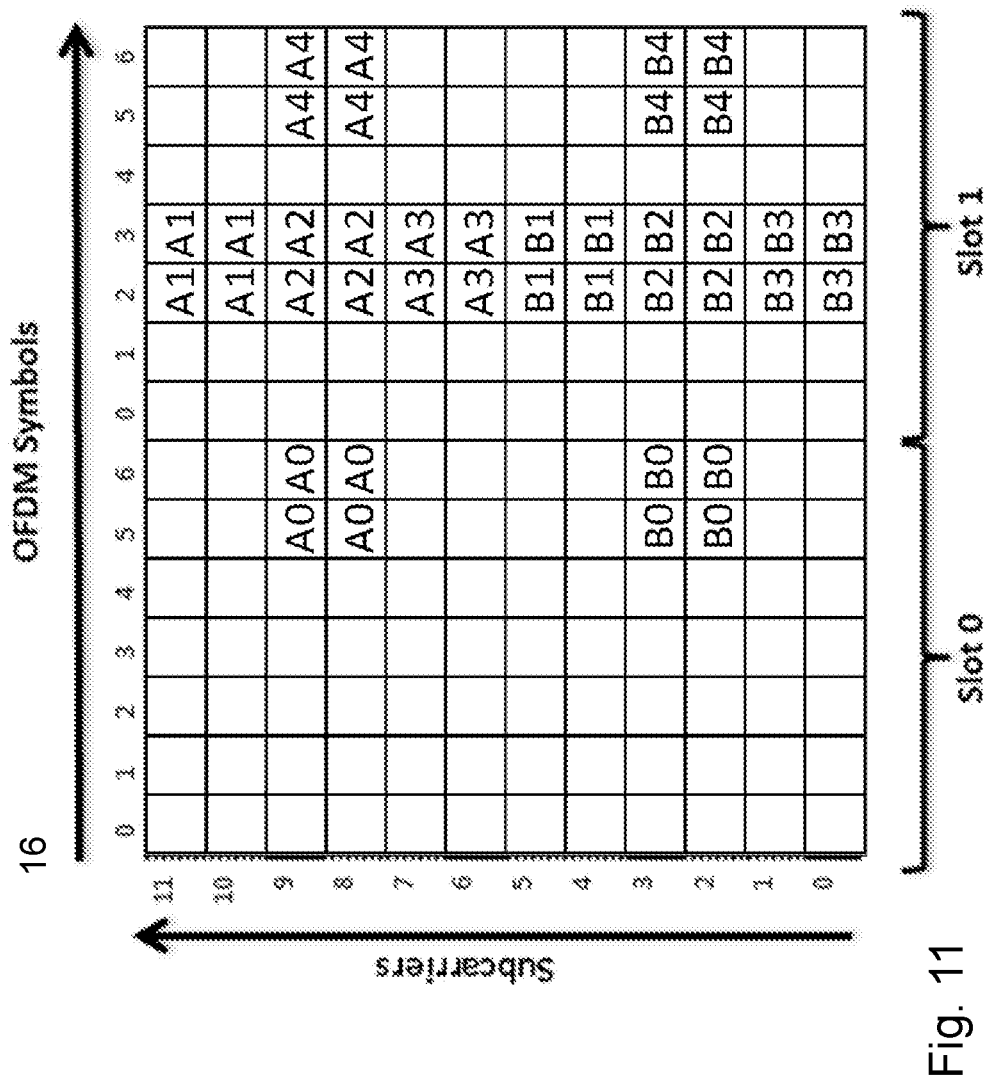
FIG. 11 illustrates a resource element grid with an example NZP CSI-RS design for 16 ports with OCC length 4.

LTE Rel-11 supports up to eight NZP CSI-RS ports. Thus, a UE can estimate the channel for up to eight transmit antenna ports in LTE Rel-11. LTE Rel-13 extends the NZP CSI-RS resources to include 12 and 16 ports. Rel-13 aggregates three legacy 4 port CSI-RS resources (to form a 12 port NZP CSI-RS resource) or two legacy 8 port CSI-RS resources (to form a 16 port NZP CSI-RS resource). All aggregated NZP CSI-RS resources are located in the same subframe. Examples of forming 12 port and 16 port NZP CSI-RS resources are described above with respect to FIGS. 7A and 7B.

The number of different 12-port and 16-port CSI-RS configurations in a subframe in the LTE Release 13 NZP CSI-RS designs are three and two, respectively. For the 12 port case, three different CSI-RS configurations can be formed where each configuration is formed by aggregating three legacy 4-port CSI-RS configurations. This consumes 36 CSI-RS resource elements of the 40 CSI-RS resource elements available for CSI-RS within a PRB. For the 16 port case, two different CSI-RS configurations can be formed where each configuration is formed by aggregating two legacy 8-port CSI-RS configurations. This consumes 32 CSI-RS resource elements of the 40 CSI-RS resource elements available for CSI-RS within a PRB.

The LTE NZP CSI-RS designs described above include various problems when extending the designs to include more CSI-RS ports. As one example, in the NZP CSI-RS designs of legacy LTE releases (up to and including Release 13), the number of CSI-RS resource elements per PRB equals the number of CSI-RS ports. For example, the number of CSI-RS resource elements per PRB in the 12 port and 16 port CSI-RS designs is 12 and 16, respectively. Thus, one problem with this approach is that the CSI-RS resource element overhead increases if the number of CSI-RS ports increases beyond 16.

Another problem with extending the NZP CSI-RS designs described above to higher CSI-RS port numbers is that the number of available CSI-RS configurations in a subframe may be reduced to one. For example, simply following the method described above, a 32-port NZP CSI-RS design can be obtained by aggregating four legacy 8-port CSI-RS configurations. For example, using 32 CSI-RS resource elements per PRB to form a 32-port NZP CSI-RS design will consume 32 CSI-RS resource elements of the 40 available CSI-RS resource elements. As a result, only one 32-port CSI-RS can be configured in a subframe with this approach. This may be detrimental to channel state information estimation if the same 32-port CSI-RS configuration is utilized in neighboring cells.

One possible solution is to have CSI-RS transmissions of neighboring cells in different subframes. Although this would prevent CSI-RS collision between neighboring cells, CSI-RS transmissions of the serving cell would be interfered with by the PDSCH transmissions from the neighboring cells. The effect of this interference may not be severe in low load conditions but may become more severe at high load conditions. At high load conditions, cell edge UEs may suffer due to the interference caused by PDSCH transmissions in a neighboring cell on the serving cell CSI-RS transmissions (considering that the PDSCH is beamformed and the CSI-RS transmissions are not beamformed in LTE Rel-13 Class A CSI-RS).

To avoid PDSCH interference from neighboring cells, zero power CSI-RS (ZP CSI-RS) can be configured in neighboring cells. However, the overhead associated with ZP CSI-RS transmissions would be significantly higher for CSI-RS transmissions involving a higher number of ports (i.e., 32 ports).

Particular embodiments obviate the problems described above and include transmitting and receiving more than 16 CSI-RS ports in a subframe. In some embodiments, more than 16 CSI-RS ports are transmitted in $N_{res}^{CSI}$ aggregated legacy LTE CSI-RS resources where a fraction of the total number of CSI-RS ports are transmitted over the even resource blocks and the remaining CSI-RS ports are transmitted over the odd resource blocks.

The following description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Although terminology from 3GPP LTE is used herein to describe particular embodiments, the embodiments are not limited to only the aforementioned system. Other wireless systems, including New radio (NR), WCDMA, WiMax, UMB and GSM, etc. may also benefit from the embodiments described herein.

Terminology such as eNodeB and UE should be considered non-limiting and do not imply a particular hierarchical relation between the two. In NR the corresponding node to the eNodeB is referred to as a gNodeB. In general, "eNodeB" may be considered as a first device and "UE" as a second device. The two devices communicate with each other over a radio channel. While particular embodiments describe wireless transmissions in the downlink, other embodiments are equally applicable in the uplink.

Particular embodiments are described with reference to FIGS. 12-27B of the drawings, like numerals being used for like and corresponding parts of the various drawings. LTE is used throughout this disclosure as an example cellular system, but the ideas presented herein may apply to other wireless communication systems as well.

Figure 12:
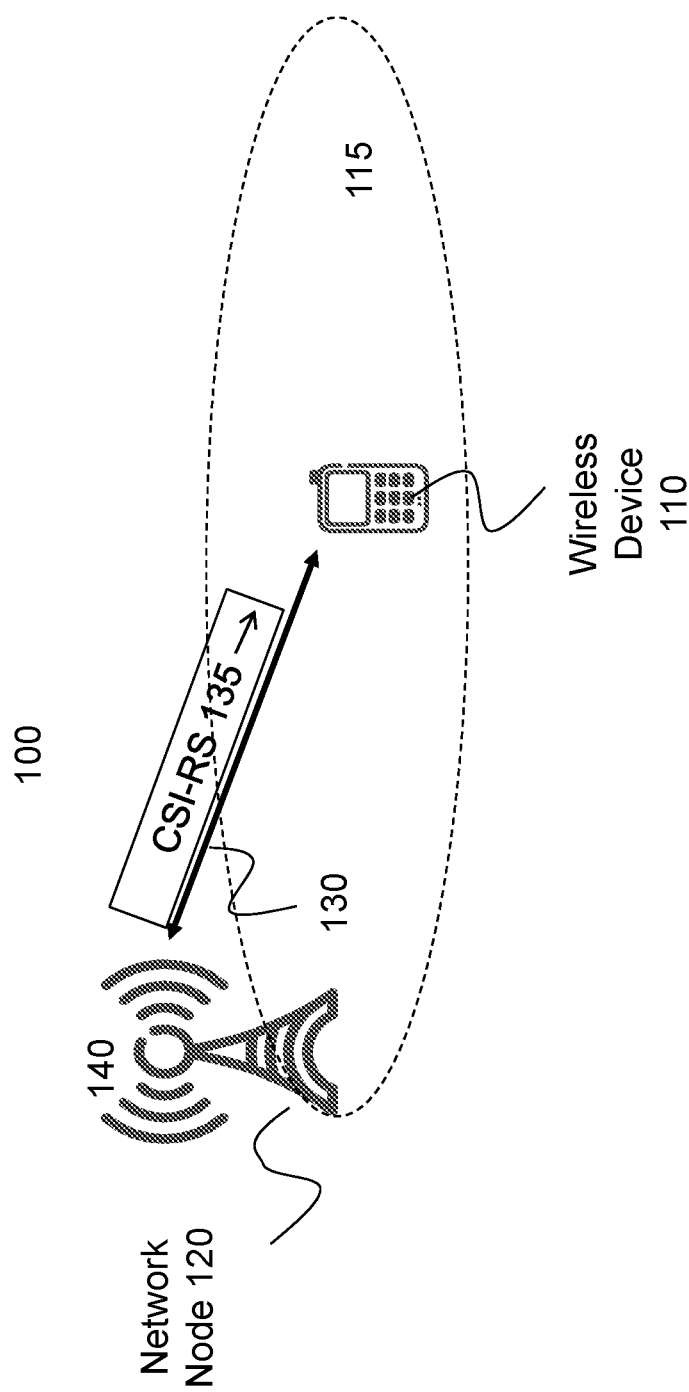
FIG. 12 is a block diagram illustrating an example wireless network, according to some embodiments.

FIG. 12 is a block diagram illustrating an example wireless network, according to a particular embodiment. Wireless network 100 includes one or more wireless devices 110 (such as mobile phones, smart phones, laptop computers, tablet computers, MTC devices, or any other devices that can provide wireless communication) and a plurality of network nodes 120 (such as base stations or eNodeBs). Wireless device 110 may also be referred to as a UE. Network node 120 serves coverage area 115 (also referred to as cell 115).

In general, wireless devices 110 that are within coverage of network node 120 (e.g., within cell 115 served by network node 120) communicate with network node 120 by transmitting and receiving wireless signals 130. For example, wireless devices 110 and network node 120 may communicate wireless signals 130 containing voice traffic, data traffic, and/or control signals. A network node 120 communicating voice traffic, data traffic, and/or control signals to wireless device 110 may be referred to as a serving network node 120 for the wireless device 110. Communication between wireless device 110 and network node 120 may be referred to as cellular communication. Wireless signals 130 may include both downlink transmissions (from network node 120 to wireless devices 110) and uplink transmissions (from wireless devices 110 to network node 120).

Figure 1:
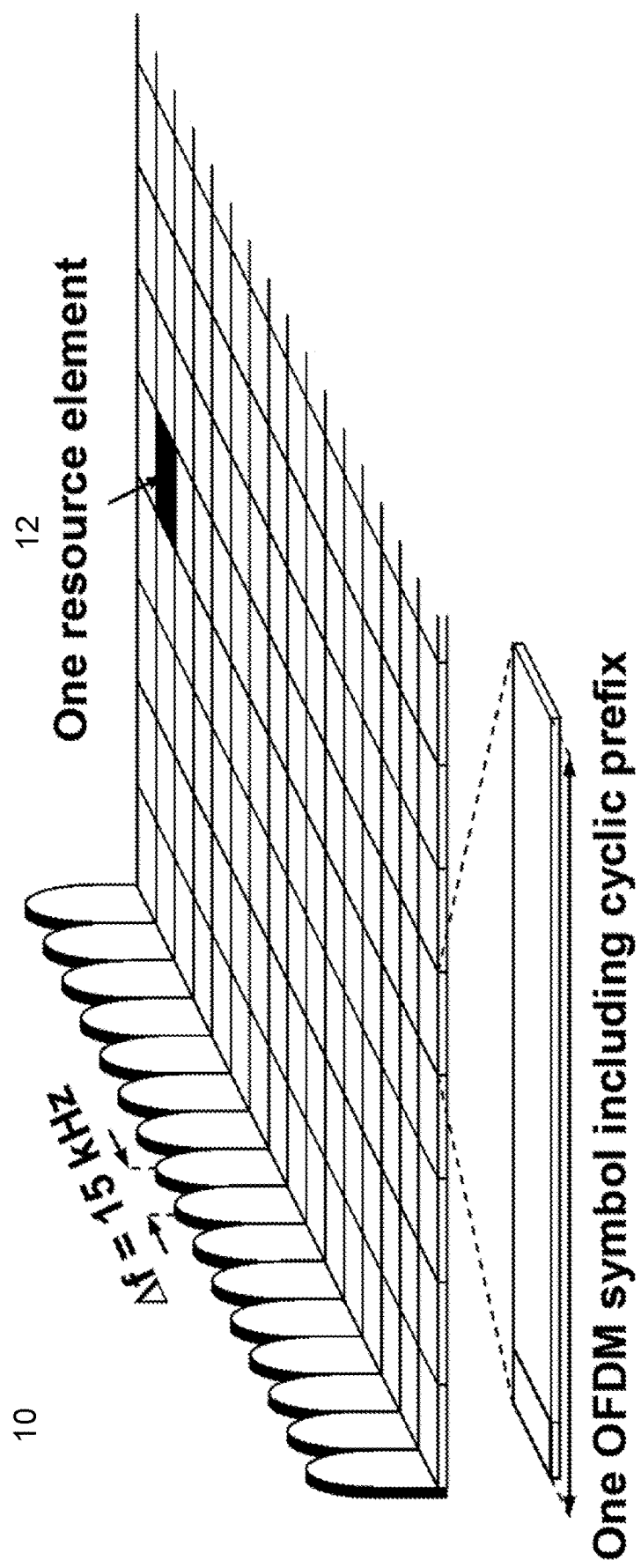
FIG. 1 illustrates an example downlink radio subframe.
Figure 2:
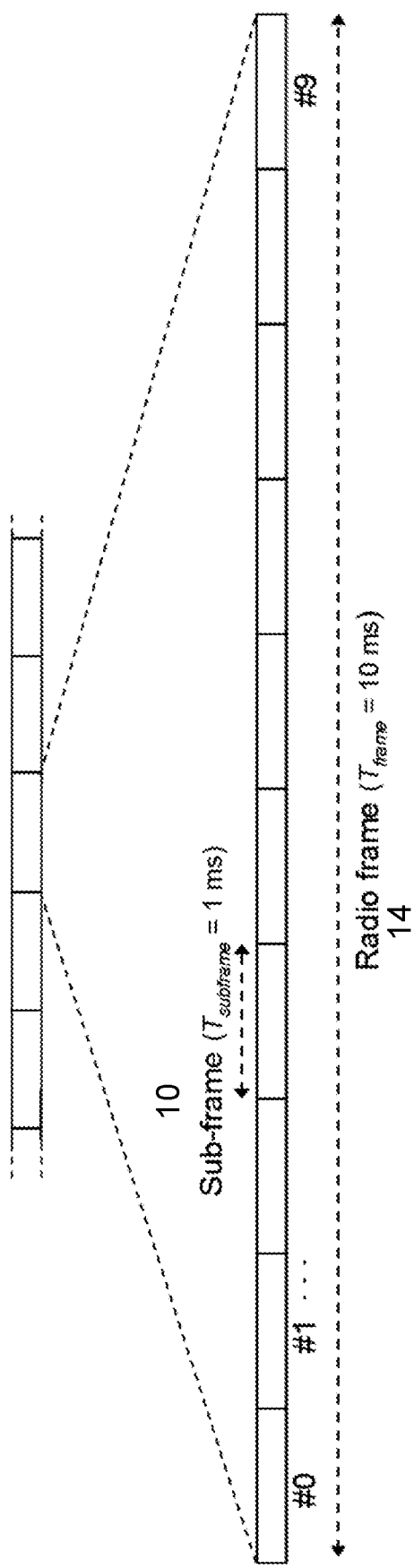
FIG. 2 illustrates an example radio frame.
Figure 3:
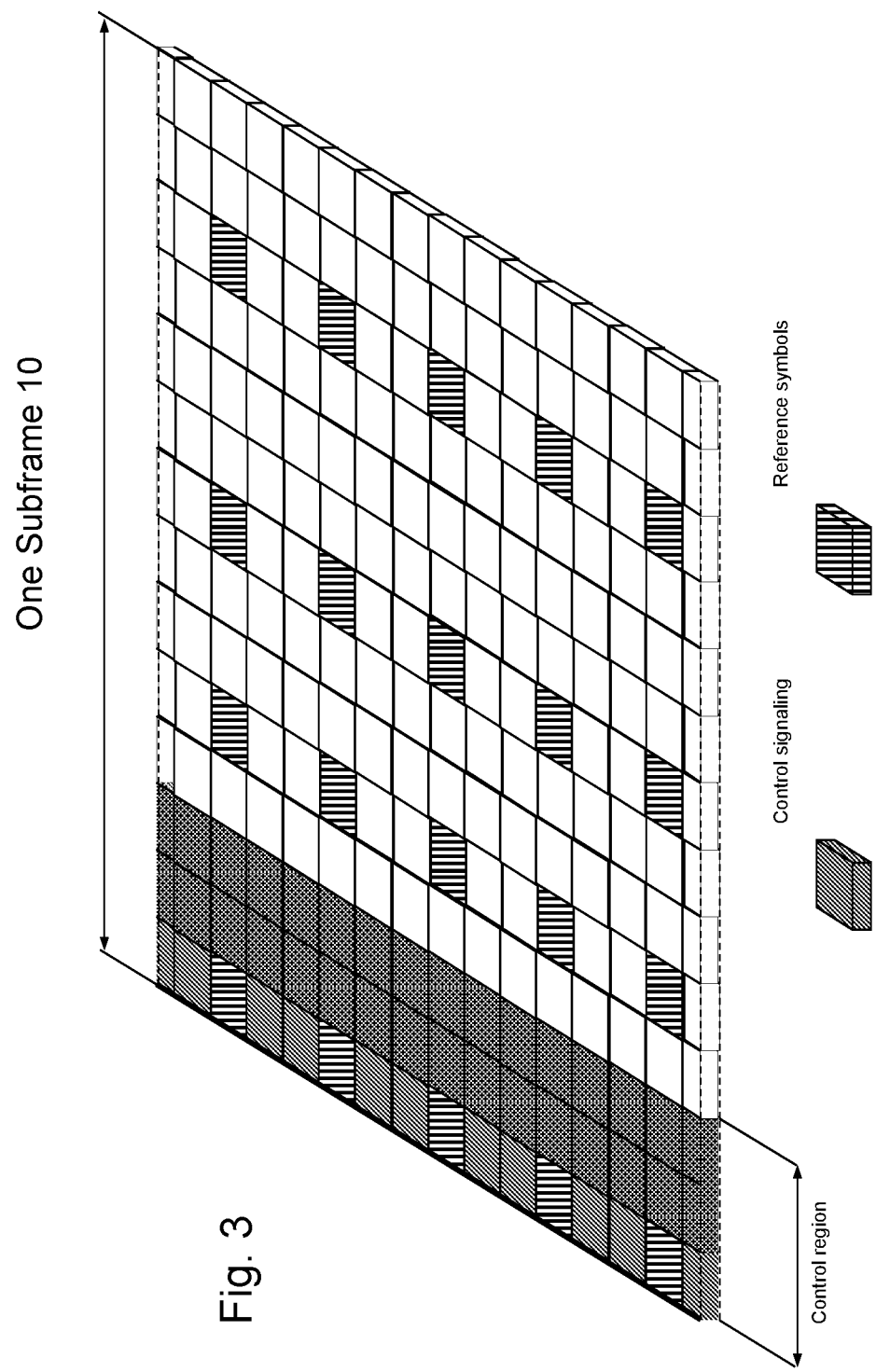
FIG. 3 illustrates an example downlink subframe.
Figure 4:
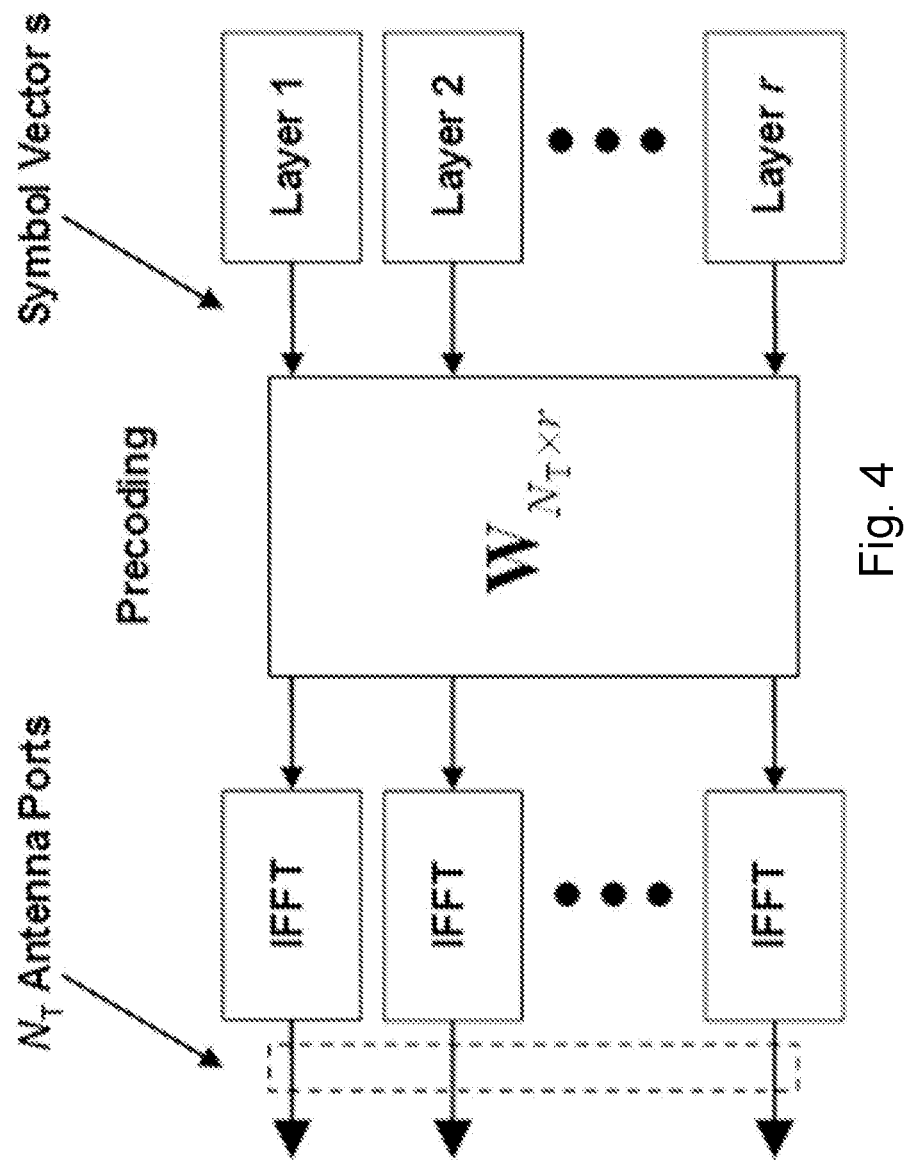
FIG. 4 is a block diagram illustrating the logical structure of precoded spatial multiplexing mode in LTE.
Figure 6:
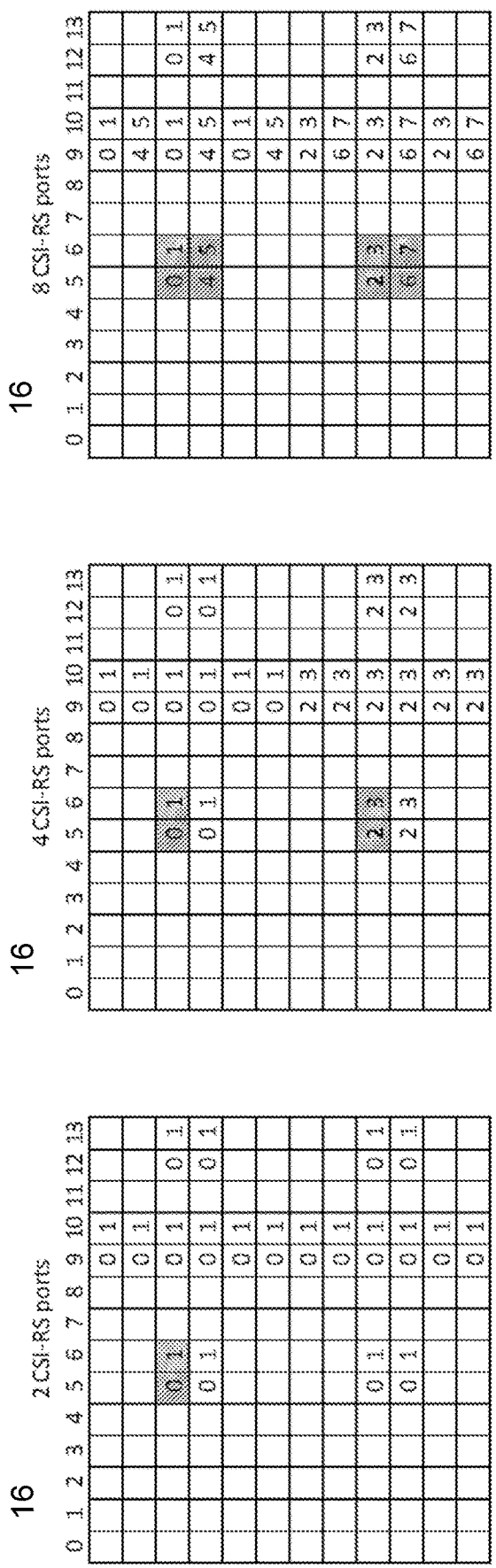
FIG. 6 illustrates resource element grids with resource block pairs showing potential positions for CSI-RS for 2, 4, and 8 antenna ports.

Network node 120 and wireless device 110 may communicate wireless signals 130 according to a radio frame and subframe structure similar to that described with respect to FIGS. 1-3. Other embodiments may include any suitable radio frame structure. For example, in NR the duration of the time symbols (such as OFDM symbols) may vary with the used numerology, and a subframe may thus not always contain the same number of symbols. Instead, the concept of "slots" may be used, a slot usually occupying 14 symbols, or occasionally 7 symbols, thus corresponding to an LTE subframe.

Each network node 120 may have a single transmitter 140 or multiple transmitters 140 for transmitting signals 130 to wireless devices 110. In some embodiments, network node 120 may comprise a multi-input multi-output (MIMO) system. Similarly, each wireless device 110 may have a single receiver or multiple receivers for receiving signals 130 from network nodes 120 or other wireless devices 110. The multiple transmitters of network node 120 may be associated with logical antenna ports.

Wireless signals 130 may include reference signals, such as CSI-RS reference signals 135. In particular embodiments, wireless signals 130 may include more than sixteen CSI-RS 135 in a subframe. Each CSI-RS 135 may be associated with an antenna port.

In particular embodiments, a network node, such as network node 120, transmits a number M of CSI-RS 135 ports to one or more wireless devices, such as wireless device 110. A fraction of the M ports are transmitted over a first physical resource block (PRB) and a remaining fraction of the M ports are transmitted over a second PRB. Network node 120 may map the M CSI-RS ports to resource elements of a radio subframe. A fraction of the M ports may be mapped to a first PRB of the subframe and a remaining fraction of the M ports may be mapped to a second PRB of the subframe. The first PRB may be an odd numbered PRB of a subframe and the second PRB may be an even numbered PRB of the subframe.

In particular embodiments, the mapping comprises grouping the resource elements of the radio subframe into a plurality of aggregated CSI-RS resources. The LTE radio subframe could also be referred to as an NR "slot", comprising e.g. 7 or 14 OFDM symbols. Each aggregated CSI-RS resource comprises a number $N_{ports}^{CSI}$ of resource elements per PRB, wherein $N_{ports}^{CSI}$ comprises two, four, or eight resource elements. The mapping further comprises combining a number ($N_{res}^{CSI}$) of the plurality of aggregated CSI-RS resources to carry the M CSI-RS ports. A number (Q) of antenna ports carried within each aggregated CSI-RS resource is an integer multiple of $N_{ports}^{CSI}$.

In particular embodiments, M is greater than sixteen. For example, M may be equal to thirty-two. The resource elements of the first PRB may comprise at least two groups of aggregated CSI-RS resources, wherein each of the at least two groups comprises eight resource elements and carries eight antenna ports. The resource elements of the second PRB may comprise at least two groups of aggregated CSI-RS resources, wherein each of the at least two groups comprises eight resource elements and carries eight antenna ports. A length eight orthogonal cover code (OCC) may be used across the eight antenna ports of each of the at least two groups of aggregated CSI-RS resources of the first PRB and the second PRB.

As another example, M is equal to twenty. The resource elements of the first PRB may comprise at least three groups of aggregated CSI-RS resources. Each of the at least three groups comprises four resource elements and carries four antenna ports. The resource elements of the second PRB comprise at least two groups of aggregated CSI-RS resources, wherein each of the at least two groups comprises four resource elements and carries four antenna ports. A length four orthogonal cover code (OCC) may be used across the four antenna ports of each of the at least three groups of aggregated CSI-RS resources of the first resource block and the at least two groups of aggregated CSI-RS resources of the second resource block.

As another example, M is equal to twenty-eight. The resource elements of the first PRB may comprise at least four groups of aggregated CSI-RS resources, wherein each of the at least four groups comprises four resource elements and carries four antenna ports. The resource elements of the second PRB may comprise at least three groups of aggregated CSI-RS resources, wherein each of the at least three groups comprises four resource elements and carries four antenna ports. A length four orthogonal cover code (OCC) may be used across the four antenna ports of each of the at least four groups of aggregated CSI-RS resources of the first resource block and the at least three groups of aggregated CSI-RS resources of the second resource block.

In particular embodiments, the number of CSI-RS ports transmitted in the first PRB is not equal to the number of CSI-RS ports transmitted in the second PRB.

In particular embodiments, network node 120 may receive, from wireless device 110, a channel estimation based on one or more of the transmitted CSI-RS 135 ports.

According to some embodiments, a wireless device, such as wireless device 110, receives a number M of CSI-RS 135 ports. A fraction of the M ports are received over a first PRB and a remaining fraction of the M ports are received over a second PRB. In particular embodiments, the M CSI-RS ports are mapped to resource elements of a radio subframe. A fraction of the M ports are mapped to a first PRB of the subframe and a remaining fraction of the M ports are mapped to a second PRB of the subframe. Wireless device 110 may measure a channel of the received CSI-RS 135 ports to estimate an effective channel, and transmit the measured channel state information to network node 120. Particular algorithms for transmitting and receiving CSI-RS are described in more detail with respect to FIGS. 13-25.

In wireless network 100, each network node 120 may use any suitable radio access technology, such as long term evolution (LTE), LTE-Advanced, UMTS, HSPA, GSM, cdma2000, NR, WiMax, WiFi, and/or other suitable radio access technology. Wireless network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a wireless network may include one or more wireless devices and one or more different types of radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described with respect to FIG. 26A below. Similarly, a network node may include any suitable combination of hardware and/or software. For example, in particular embodiments, a network node, such as network node 120, may include the components described with respect to FIG. 27A below.

In a first group of embodiments, $N_{res}^{CSI}$ different $N_{ports}^{CSI}$-port NZP CSI-RS resources are aggregated to form a S-port NZP CSI-RS design where $S>N_{ports}^{CSI}N_{res}^{CSI}$ and S is a common divisor of both $N_{res}^{CSI}$ and $N_{ports}^{CSI}$ (i.e., mod(S, $N_{res}^{CSI}$)=0 and mod(S, $N_{ports}^{CSI}$)=0). The number of antenna ports carried within each aggregated CSI-RS resource is an integer multiple of the value $N_{ports}^{CSI}$. More specifically, the number of ports carried within each aggregated CSI-RS resource in the first group of embodiments is an integer $Q=S/N_{res}^{CSI}>N_{ports}^{CSI}$. This is different from the NZP CSI-RS designs described above in the Background section wherein the number of ports carried within each aggregated CSI-RS resource is limited to $N_{ports}^{CSI}$. In the case of LTE up to Release 13, $N_{ports}^{CSI}$ can take on values of 2, 4 and 8.

In order to pack more than $N_{ports}^{CSI}$ CSI-RS ports within each aggregated CSI-RS resource, CDM groups may be formed over $S/(N_{ports}^{CSI}N_{res}^{CSI})$ adjacent PRBs. For instance, consider the case with $N_{ports}^{CSI}=8$ and $N_{res}^{CSI}=2$ where two legacy 8-port NZP CSI-RS resources aggregated to form a new CSI-RS design. This can be used to form a 32-port NZP CSI-RS design (i.e., S=32). In this design, each aggregated CSI-RS resource may carry $Q=S/N_{res}^{CSI}=16$ CSI-RS ports (note that the LTE Release 13 16-port design only allows 8-ports within each aggregated CSI-RS resource). To pack 16 CSI-RS ports within each aggregated CSI-RS, CDM groups are formed over $S/(N_{ports}^{CSI}N_{res}^{CSI})$ =32/(8·2)=2 adjacent PRBs. The length of the OCC applied over each of these CDM groups is a design parameter described later in detailed embodiments corresponding to specific NZP CSI-RS designs.

By packing more CSI-RS ports into each aggregated CSI-RS resource, the CSI-RS resource element overhead may be reduced compared to the approach of limiting each aggregated resource to $N_{ports}^{CSI}$ CSI-RS ports as done in LTE Release 13 CSI-RS design. Furthermore, because each aggregated CSI-RS resource in the first group of embodiments carries more than $N_{ports}^{CSI}$ CSI-RS ports per resource, the number of NZP CSI-RS resources that need to be aggregated can be reduced. Thus, the number of available CSI-RS configurations in a subframe does not have to be reduced. A particular embodiment includes a 32-port NZP CSI-RS design with length-8 OCC.

A 32-port NZP CSI-RS design may be attained by aggregating two legacy 8-port CSI-RS resources. Thus, S=32, $N_{ports}^{CSI}=8$, and $N_{res}^{CSI}=2$. Each aggregated CSI-RS resource carries Q=16 ports, and CDM groups are formed across two adjacent PRBs. This design may use a length-8 OCC, such as the one shown in Equation 11, within a CDM group. With this design, two 32-port CSI-RS configurations are possible within each subframe without any CSI-RS RE overhead increase. An example of the 32-port NZP CSI-RS design that uses length-8 OCC is illustrated in FIG. 13.

Figure 13:
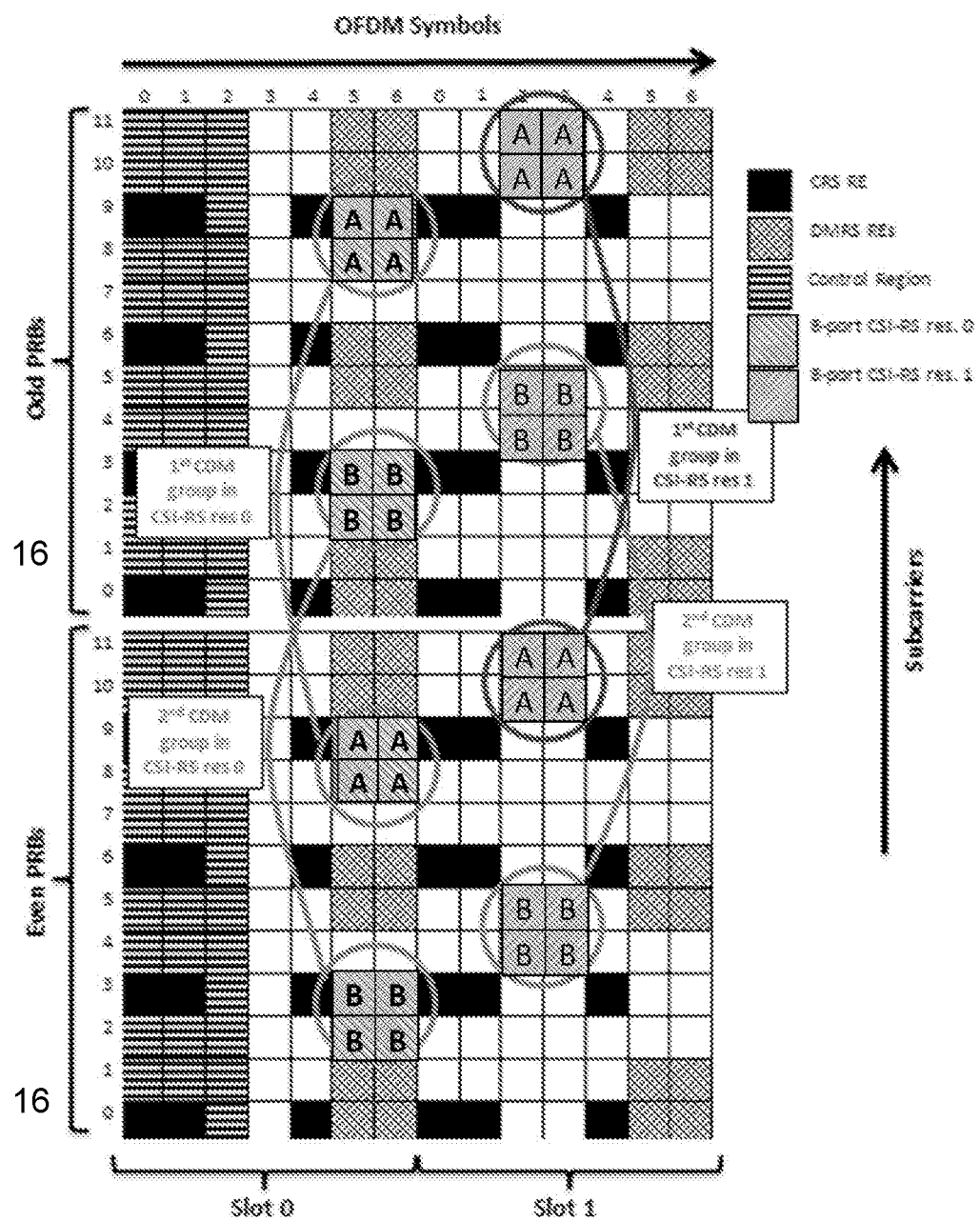
FIG. 13 is an example resource element grid illustrating a 32-port NZP CRI-RS design with length 8 OCC, according to a particular embodiment.

FIG. 13 is an example resource element grid illustrating a 32-port NZP CRI-RS design with length 8 OCC, according to a particular embodiment. The resource element grid comprises two PRBs 16. The horizontal axis represents the time domain and the vertical axis represents the frequency domain.

LTE legacy 8-port CSI-RS resources 0 and 1 are aggregated together to form the 32-port NZP CSI-RS design. CSI-RS resource elements denoted by letter 'A' in two adjacent PRBs within the same legacy 8-port CSI-RS resource are grouped together to form one CDM group. Similarly, CSI-RS resource elements denoted by letter 'B' in two adjacent PRBs within the same legacy 8-port CSI-RS resource are grouped together to form another CDM group.

Using the length-8 OCC in Equation 11, 8 CSI-RS ports can be transmitted within each CDM group. As a result, 16 CSI-RS ports can be transmitted within the two CDM groups of each legacy 8-port CSI-RS resource, and 32 CSI-RS ports can be transmitted in the two 8-port legacy CSI-RS resources aggregated together.

Although the example illustrated in FIG. 13 shows legacy 8-port CSI-RS configurations 0 and 1 aggregated together, the same design principle applies when two other legacy 8-port CSI-RS configurations are aggregated together.

$$W_8 = \begin{bmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{bmatrix} \quad \text{Equation 11}$$

A particular embodiment includes a 24-port NZP CSI-RS design with length-8 OCC. A 24-port NZP CSI-RS design may be attained by aggregating three legacy 4-port CSI-RS resources. Thus, S=24, $N_{ports}^{CSI}=4$, and $N_{res}^{CSI}=3$. Each aggregated CSI-RS resource carries Q=8 ports, and CDM groups are formed across two adjacent PRBs. This design may use a length-8 OCC, such as the one shown in Equation 11, within a CDM group. With this design, three 24-port CSI-RS configurations are possible within each subframe without any CSI-RS RE overhead increase. An example of the 24-port NZP CSI-RS design that uses length-8 OCC is shown in FIG. 14.

Figure 14:
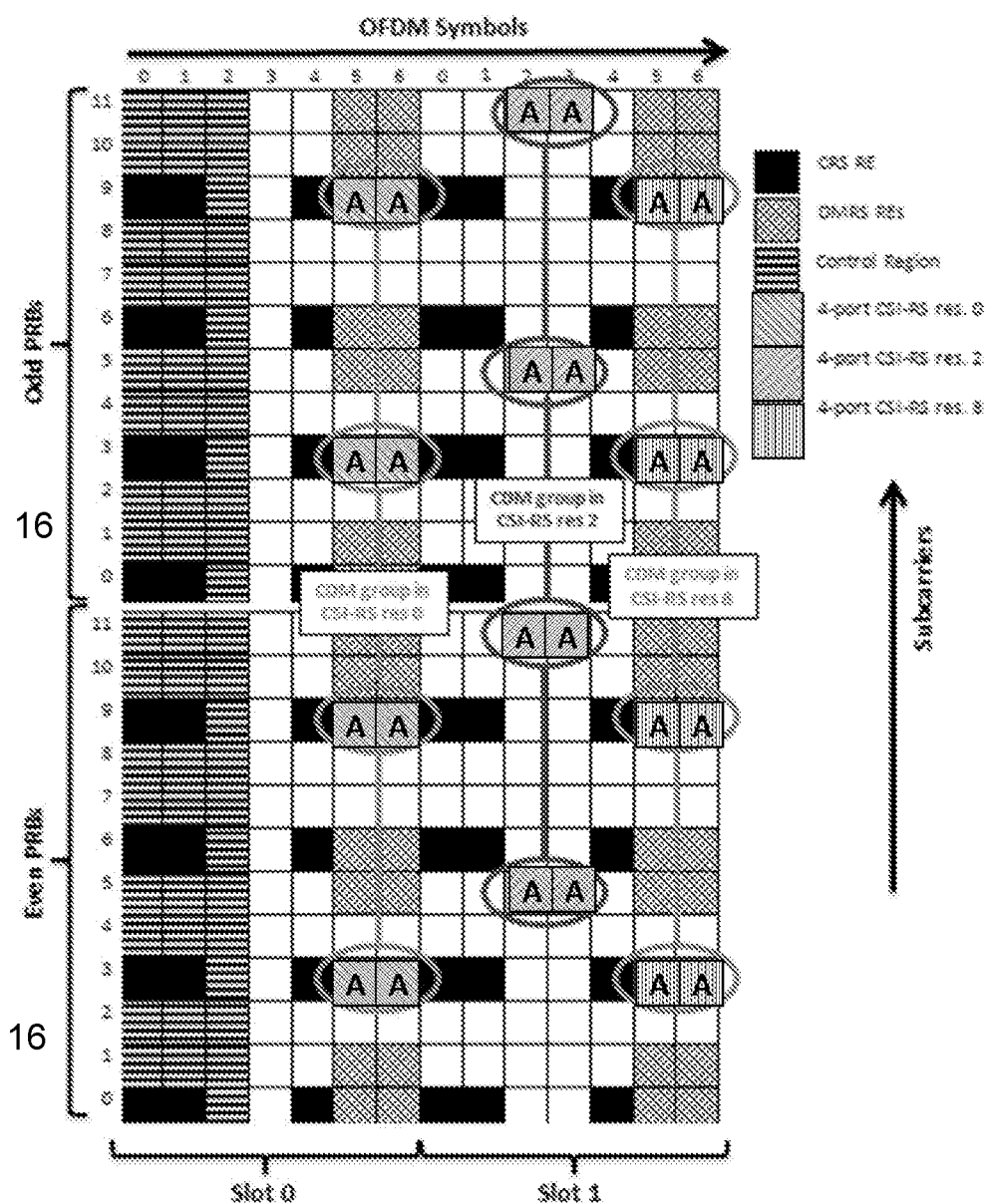
FIG. 14 is an example resource element grid illustrating a 24-port NZP CRI-RS design with length 8 OCC, according to a particular embodiment.

FIG. 14 is an example resource element grid illustrating a 24-port NZP CRI-RS design with length 8 OCC, according to a particular embodiment. The resource element grid comprises two PRBs 16. The horizontal axis represents the time domain and the vertical axis represents the frequency domain.

LTE legacy 4-port CSI-RS resources 0, 2 and 8 are aggregated together to form the 24-port NZP CSI-RS design. CSI-RS resource elements denoted by letter 'A' in two adjacent PRBs within the same legacy 4-port CSI-RS resource are grouped together to form one CDM group. Using the length-8 OCC in Equation 11, 8 CSI-RS ports can be transmitted within each CDM group.

Because each legacy 4-port CSI-RS resource only includes one CDM group in the illustrated example, 8-CSI-RS ports can be transmitted per aggregated CSI-RS resource. A total of 24 CSI-RS ports can be transmitted in the three aggregated legacy 4-port CSI-RS resources. Although the example illustrated in FIG. 14 shows legacy 4-port CSI-RS configurations 0, 2 and 8 aggregated together, the same design principle applies when three other legacy 4-port CSI-RS configurations are aggregated together.

When higher-layer parameter 'cdmType' is set to cdm8 for CSI-RS using more than 16 antenna ports, antenna port number $$p=(2i'+q)N_{ports}^{CSI}+p' \quad \text{Equation 12}$$

where $p' \in \{15, 16, \ldots, 15+N_{ports}^{CSI}-1\}$ and $q \in \{0,1\}$ for CSI-RS resource number $i' \in \{0, 1, \ldots, N_{res}^{CSI}-1\}$.

When higher-layer parameter 'cdmType' is set to cdm8 for CSI-RS using more than 16 antenna ports, the complex-valued modulation symbols $a_{k,l}^{(p)}$ used as reference symbols on antenna port p may be defined as:

$$a_{k,l}^{(p)} = w_{p',m}(i) \cdot r_{l,n_s}(m')$$  Equation 13 where $$k = k' + 12m - \begin{cases} k'' & \text{for } p' \in \{15, 16, 19, 20\}, \\ & \text{normal cyclic prefix, } N_{ports}^{CSI} = 8 \\ k'' + 6 & \text{for } p' \in \{17, 18, 21, 22\}, \\ & \text{normal cyclic prefix, } N_{ports}^{CSI} = 8 \\ 6k'' & \text{for } p' \in \{15, 16, 17, 18\}, \\ & \text{normal cyclic prefix, } N_{ports}^{CSI} = 4 \end{cases}$$  Equation 14

$$l = l' + \begin{cases} 1'' & \text{CSI reference signal configurations} \\ & \text{0-19, normal cyclic prefix} \\ 21'' & \text{CSI reference signal configurations} \\ & \text{20-31, normal cyclic prefix} \end{cases}$$

$$l'' = 0, 1$$

$$k'' = 0, 1$$

$$i = \begin{cases} 2k'' + 1'' + \text{Mod}(m, 2) \times 4 & \text{if Mod}(N_{RB}^{DL}, 2) = 0 \\ & \text{if Mod}(N_{RB}^{DL}, 2) = 1 \\ 2k'' + 1'' + \text{Mod}(m, 2) \times 4 & \text{and } m < \frac{N_{RB}^{DL} - 1}{2} \\ & \text{if Mod}(N_{RB}^{DL}, 2) = 1 \\ 2k'' + 1''\text{Mod}(m - 1, 2) \times 4 & \text{and } m > \frac{N_{RB}^{DL} + 1}{2} \end{cases}$$

$$m = \begin{cases} 0, 1, \ldots, (N_{RB}^{DL} - 1)/2, \\ (N_{RB}^{DL} + 1)/2, \ldots, N_{RB}^{DL} - 1 & \text{if Mod}(N_{RB}^{DL}, 2) = 1 \\ 0, 1, \ldots, N_{RB}^{DL} - 1, & \text{otherwise} \end{cases}$$

$$m' = m + \left\lfloor \frac{N_{RB}^{max,DL} - N_{RB}^{DL}}{2} \right\rfloor$$

where $w_{p',m}(i)$ in Equation 13 is given by Table 5. Furthermore, Mod(x,2) denotes the modulo-2 operator (if x is an odd integer then Mod(x,2)=1; if x is an even integer then Mod(x,2)=0 In addition to depending on the quantity i defined in Equation 14 and the quantity p', $w_{p',m}(i)$ also depends on the resource block index m and the quantity q defined in Equation 12. If one of Conditions 1-3 in Table 5 is satisfied, then $[w_{p',m}(0), \ldots, w_{p',m}(3)]$ are chosen depending on the value of q as shown in the top part of Table 5. If one of Conditions 4-6 in Table 5 is satisfied, then $[w_{p',m}(4), \ldots, w_{p',m}(7)]$ are chosen depending on the value of q as shown in the bottom part of Table 5.

TABLE 5

The sequence $w_{p',m}(i)$ for CDM8

| | p' | | $[w_{p',m}(0), \ldots, w_{p',m}(3)]$ | |
|---|---|---|---|---|
| Conditions on m | $N_{ports}^{CSI}=4$ | $N_{ports}^{CSI}=8$ | q = 0 | q = 1 |
| Condition 1: Mod(m, 2) = 0 and | 15 | 15, 17 | [1 1 1 1] | [1 1 1 1] |
| | 16 | 16, 18 | [1 −1 1 −1] | [1 −1 1 −1] |
| | 17 | 19, 21 | [1 1 −1 −1] | [1 1 −1 −1] |
| | 18 | 20, 22 | [1 −1 −1 1] | [1 −1 −1 1] |
| $\text{Mod}(N_{RB}^{DL}, 2) = 0$ | | | | |
| or | | | | |
| Condition 2: Mod(m, 2) = 0, | | | | |
| $\text{Mod}(N_{RB}^{DL}, 2) = 1$ and $m < \frac{N_{RB}^{DL} - 1}{2}$ | | | | |
| or | | | | |
| Condition 3: Mod(m, 2) = 1, | | | | |
| $\text{Mod}(N_{RB}^{DL}, 2) = 1$ and $m > \frac{N_{RB}^{DL} + 1}{2}$ | | | | |

| | p' | | $[w_{p',m}(4), \ldots, w_{p',m}(7)]$ | |
|---|---|---|---|---|
| Conditions on m | $N_{ports}^{CSI}=4$ | $N_{ports}^{CSI}=8$ | q = 0 | q = 1 |
| Condition 4: Mod(m, 2) = 1 and | 15 | 15, 17 | [1 1 1 1] | [−1 −1 −1 −1] |
| | 16 | 16, 18 | [1 −1 1 −1] | [−1 1 −1 1] |
| | 17 | 19, 21 | [1 1 −1 −1] | [−1 −1 1 1] |
| | 18 | 20, 22 | [1 −1 −1 1] | [−1 1 1 −1] |
| $\text{Mod}(N_{RB}^{DL}, 2) = 0$ | | | | |
| or | | | | |
| Condition 5: Mod(m, 2) = 1, | | | | |

TABLE 5-continued

The sequence $w_{p',m}(i)$ for CDM8

$\text{Mod}(N_{RB}^{DL}, 2) = 1$ and $m < \dfrac{N_{RB}^{DL} - 1}{2}$ or

Condition 6: $\text{Mod}(m, 2) = 0$, $\text{Mod}(N_{RB}^{DL}, 2) = 1$ and $m > \dfrac{N_{RB}^{DL} + 1}{2}$ A particular embodiment includes a 20-port NZP CSI-RS design with length-4 OCC. A 20-port NZP CSI-RS design may be attained by aggregating 5 legacy 2-port CSI-RS resources. Thus, S=20, $N_{ports}^{CSI}$=2, and $N_{res}^{CSI}$=5. Each aggregated CSI-RS resource carries Q=4 ports, and CDM groups are formed across two adjacent PRBs. The design uses a length-4 OCC, such as the one shown in Equation 15, within a CDM group. Four 20-port CSI-RS configurations are possible within each subframe without any CSI-RS resource element overhead increase. An example of the 20-port NZP CSI-RS design that uses length-4 OCC is shown in FIG. 15.

Figure 15:
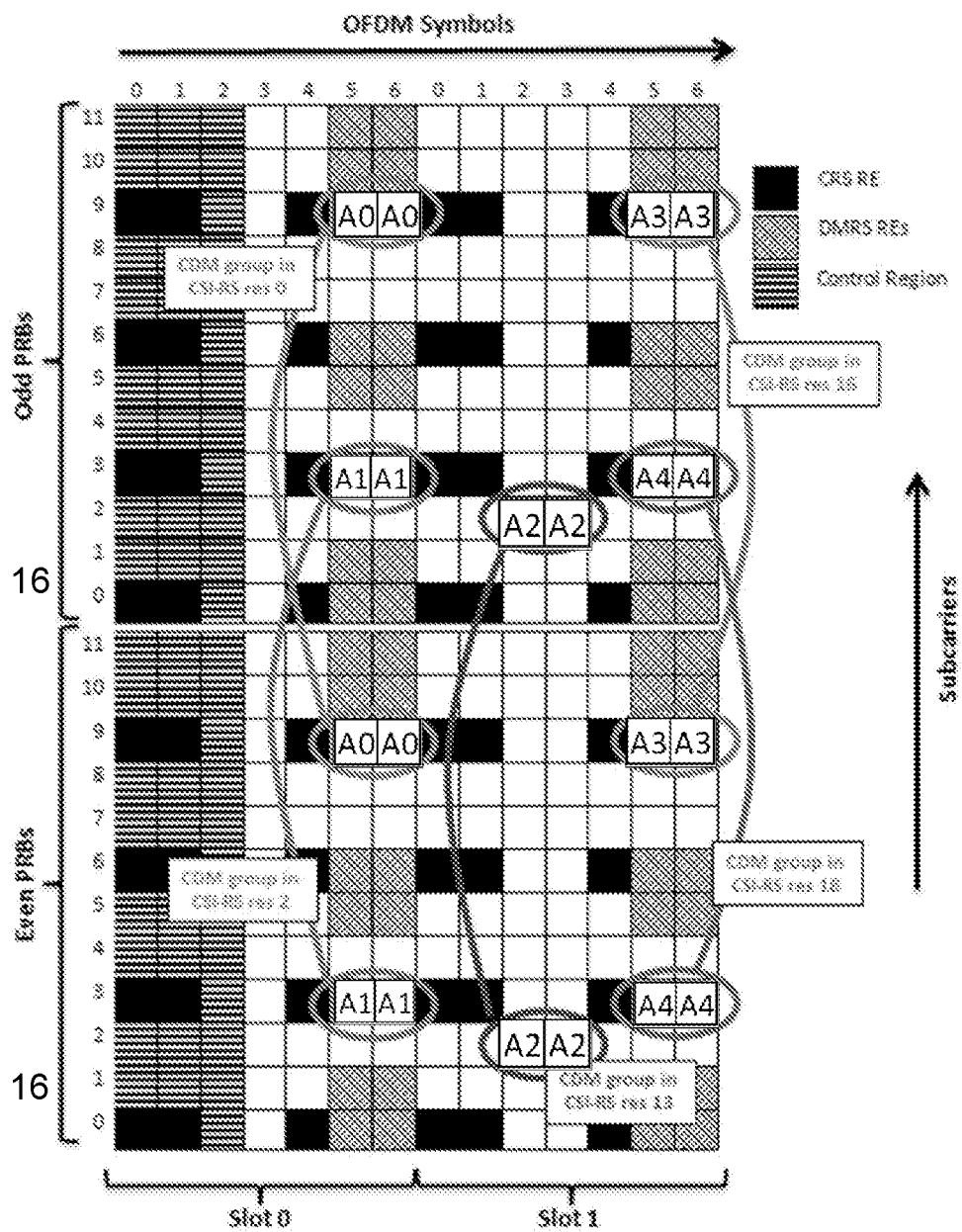
FIG. 15 is an example resource element grid illustrating a 20-port NZP CRI-RS design with length 4 OCC, according to a particular embodiment.

FIG. 15 is an example resource element grid illustrating a 20-port NZP CRI-RS design with length 4 OCC, according to a particular embodiment. The resource element grid comprises two PRBs 16. The horizontal axis represents the time domain and the vertical axis represents the frequency domain.

LTE legacy 2-port CSI-RS resources 0, 2, 13, 16 and 18 are aggregated together to form the 20-port NZP CSI-RS design. CSI-RS resource elements denoted by letter 'A' in two adjacent PRBs within the same legacy 2-port CSI-RS resource are grouped together to form one CDM group. Using the length-4 OCC in Equation 15, 4 CSI-RS ports can be transmitted within each CDM group.

Because the legacy 2-port CSI-RS resource only includes one CDM group per legacy 2-port CSI-RS resource, 4-CSI-RS ports can be transmitted per aggregated CSI-RS resource. A total of 20 CSI-RS ports can be transmitted in the five aggregated legacy 2-port CSI-RS resources. Although the example illustrated in FIG. 15 shows legacy 2-port CSI-RS configurations 0, 2, 13, 16 and 18 aggregated together, the same design principle applies when five other legacy 2-port CSI-RS configurations are aggregated together.

$$W_4 = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \qquad \text{Equation 15}$$

A particular embodiment includes a 28-port NZP CSI-RS design with length-4 OCC. A 28-port NZP CSI-RS design may be attained by aggregating 7 legacy 2-port CSI-RS resources. Thus, S=28, $N_{ports}^{CSI}$=2, and $N_{res}^{CSI}$=7. Each aggregated CSI-RS resource carries Q=4 ports, and CDM groups are formed across two adjacent PRBs. The design uses a length-4 OCC, such as the one shown in Equation 15, within a CDM group. Two 28-port CSI-RS configurations are possible within each subframe without any CSI-RS resource element overhead increase. An example of the 28-port NZP CSI-RS design that uses length-4 OCC is shown in FIG. 16.

Figure 16:
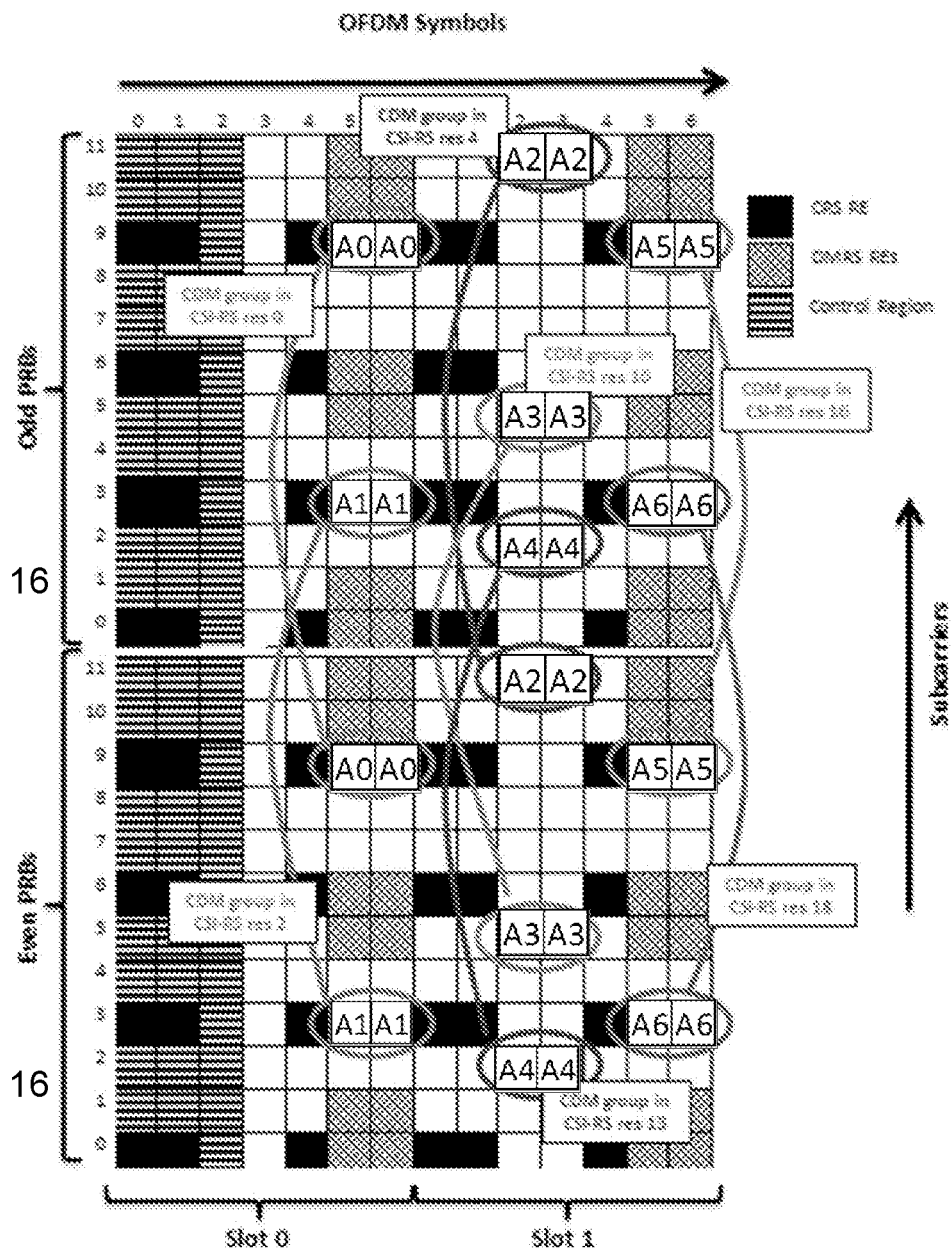
FIG. 16 is an example resource element grid illustrating a 28-port NZP CRI-RS design with length 4 OCC, according to a particular embodiment.

FIG. 16 is an example resource element grid illustrating a 28-port NZP CRI-RS design with length 4 OCC, according to a particular embodiment. The resource element grid comprises two PRBs 16. The horizontal axis represents the time domain and the vertical axis represents the frequency domain.

LTE legacy 2-port CSI-RS resources 0, 2, 4, 10, 13, 16 and 18 are aggregated together to form the 28-port NZP CSI-RS design. CSI-RS resource elements denoted by letter 'A' in two adjacent PRBs within the same legacy 2-port CSI-RS resource are grouped together to form one CDM group. CSI-RS resource elements with the same number are part of the same CDM group (e.g., the four resource elements labelled A0 form CDM group 0). Using the length-4 OCC in Equation 15, 4 CSI-RS ports can be transmitted within each CDM group.

Because the legacy 2-port CSI-RS resource includes only one CDM group in this example, 4-CSI-RS ports can be transmitted per aggregated CSI-RS resource. A total of 28 CSI-RS ports can be transmitted in the seven aggregated legacy 2-port CSI-RS resources. Although the example illustrated in FIG. 15 shows legacy 2-port CSI-RS configurations 0, 2, 4, 10, 13, 16 and 18 aggregated together, the same design principle applies when seven other legacy 2-port CSI-RS configurations are aggregated together.

When higher-layer parameter 'cdmType' is set to cdm4 for CSI-RS using more than 16 antenna ports, antenna port number $$p = (2i' + q)N_{ports}^{CSI} + p' \qquad \text{Equation 16}$$

where $p' \in \{15, \ldots, 15 + N_{ports}^{CSI} - 1\}$ and $q \bigstar \{0,1\}$ for CSI-RS resource number $i' \in \{0, 1, \ldots, N_{res}^{CSI} - 1\}$.

When higher-layer parameter 'cdmType' is set to cdm4 for CSI-RS using more than 16 antenna ports, the complex-valued modulation symbols $a_{k,l}^{(p)}$ used as reference symbols on antenna port p may be defined as:

$$a_{k,l}^{(p)} = w_{p',m}(i) \cdot r_{l,n_s}(m') \qquad \text{Equation 17}$$

where $$k = \qquad \text{Equation 18}$$

$$k' + 12m + \begin{cases} -0 & \text{for } p' \in \{15, 16\}, \text{ normal cyclic prefix} \\ -6 & \text{for } p' \in \{17, 18\}, \text{ normal cyclic prefix} \\ -1 & \text{for } p' \in \{19, 20\}, \text{ normal cyclic prefix} \\ -7 & \text{for } p' \in \{21, 22\}, \text{ normal cyclic prefix} \\ -0 & \text{for } p' \in \{15, 16\}, \text{ extended cyclic prefix} \\ -3 & \text{for } p' \in \{17, 18\}, \text{ extended cyclic prefix} \\ -6 & \text{for } p' \in \{19, 20\}, \text{ extended cyclic prefix} \\ -9 & \text{for } p' \in \{21, 22\}, \text{ extended cyclic prefix} \end{cases}$$

-continued $$i = 1' + \begin{cases} 1'' & \text{CSI reference signal configurations} \\ & 0\text{-}19, \text{ normal cyclic prefix} \\ 21'' & \text{CSI reference signal configurations} \\ & 20\text{-}31, \text{ normal cyclic prefix} \\ 1'' & \text{CSI reference signal configurations} \\ & 0\text{-}27, \text{ extended cyclic prefix} \end{cases}$$

$$i'' = 0, 1$$

$$i = \begin{cases} 1'' + \text{Mod}(m, 2) \times 2 & \text{if } \text{Mod}(N_{RB}^{DL}, 2) = 0 \\ 1'' + \text{Mod}(m, 2) \times 2 & \text{if } \text{Mod}(N_{RB}^{DL}, 2) = 1 \text{ and} \\ & m < \frac{N_{RB}^{DL} - 1}{2} \\ 1'' + \text{Mod}(m-1, 2) \times 2 & \text{if } \text{Mod}(N_{RB}^{DL}, 2) = 1 \text{ and} \\ & m > \frac{N_{RB}^{DL} + 1}{2} \end{cases}$$

$$m = \begin{cases} 0, 1, \ldots, (N_{RB}^{DL} - 1)/2, \\ (N_{RB}^{DL} + 1)/2, \ldots, & \text{if } \text{Mod}(N_{RB}^{DL}, 2) = 1 \\ N_{RB}^{DL} - 1 \\ 0, 1, \ldots, N_{RB}^{DL} - 1, & \text{otherwise} \end{cases}$$

$$m' = m + \left\lfloor \frac{N_{RB}^{max,DL} - N_{RB}^{DL}}{2} \right\rfloor$$

where $w_{p',m}(i)$ in Equation 17 is given by Table 6. Furthermore, Mod(x,2) denotes the modulo-2 operator (if x is an odd integer then Mod(x,2)=1; if x is an even integer then Mod(x,2)=0. In addition to depending on the quantity i defined in Equation 18 and the quantity p', $w_{p',m}(i)$ also depends on the resource block index m and the quantity q defined in Equation 16. If one of Conditions 1-3 in Table 6 is satisfied, then $[w_{p',m}(0), \ldots, w_{p',m}(3)]$ are chosen depending on the value of q as shown in the top part of Table 6. If one of Conditions 4-6 in Table 6 is satisfied, then $[w_{p',m}(4), \ldots, w_{p',m}(7)]$ are chosen depending on the value of q as shown in the bottom part of Table 6.

TABLE 6

The sequence $w_{p',m}(i)$ for CDM 4

| | p' | $[w_{p',m}(0), w_{p',m}(1)]$ | |
|---|---|---|---|
| Conditions on m | $N_{ports}^{CSI} = 2$ | q = 0 | q = 1 |
| Condition 1: Mod(m, 2) = 0 and | 15 | [1 1] | [1 1] |
| | 16 | [1 −1] | [1 −1] |
| $\text{Mod}(N_{RB}^{DL}, 2) = 0$ | | | |
| or | | | |
| Condition 2: Mod(m, 2) = 0, | | | |
| $\text{Mod}(N_{RB}^{DL}, 2) = 1$ and $m < \frac{N_{RB}^{DL} - 1}{2}$ | | | |
| or | | | |
| Condition 3: Mod(m, 2) = 1, | | | |
| $\text{Mod}(N_{RB}^{DL}, 2) = 1$ and $m > \frac{N_{RB}^{DL} + 1}{2}$ | | | |

| | p' | $[w_{p',m}(2), w_{p',m}(3)]$ | |
|---|---|---|---|
| Conditions on m | $N_{ports}^{CSI} = 2$ | q = 0 | q = 1 |

TABLE 6-continued

The sequence $w_{p',m}(i)$ for CDM 4

| | | | |
|---|---|---|---|
| Condition 4: Mod(m, 2) = 1 and | 15 | [1 1] | [−1 −1] |
| | 16 | [1 −1] | [−1 1] |
| $\text{Mod}(N_{RB}^{DL}, 2) = 0$ | | | |
| or | | | |
| Condition 5: Mod(m, 2) = 1, | | | |
| $\text{Mod}(N_{RB}^{DL}, 2) = 1$ and $m < \frac{N_{RB}^{DL} - 1}{2}$ | | | |
| or | | | |
| Condition 6: Mod(m, 2) = 0, | | | |
| $\text{Mod}(N_{RB}^{DL}, 2) = 1$ and $m > \frac{N_{RB}^{DL} + 1}{2}$ | | | |

A particular embodiment includes a 24-port NZP CSI-RS design with length-4 OCC. A 24-port NZP CSI-RS design may be attained by aggregating three legacy 4-port CSI-RS resources. Thus, S=24, $N_{ports}^{CSI}$=4, and $N_{res}^{CSI}$=3. Each aggregated CSI-RS resource carries Q=8 ports, and CDM groups are formed across two adjacent PRBs. The design uses a length-4 OCC, such as the one shown in Equation 15, within a CDM group. Three 24-port CSI-RS configurations are possible within each subframe without any CSI-RS resource element overhead increase. An example of the 24-port NZP CSI-RS design that uses length-4 OCC is shown in FIG. 17.

Figure 17:
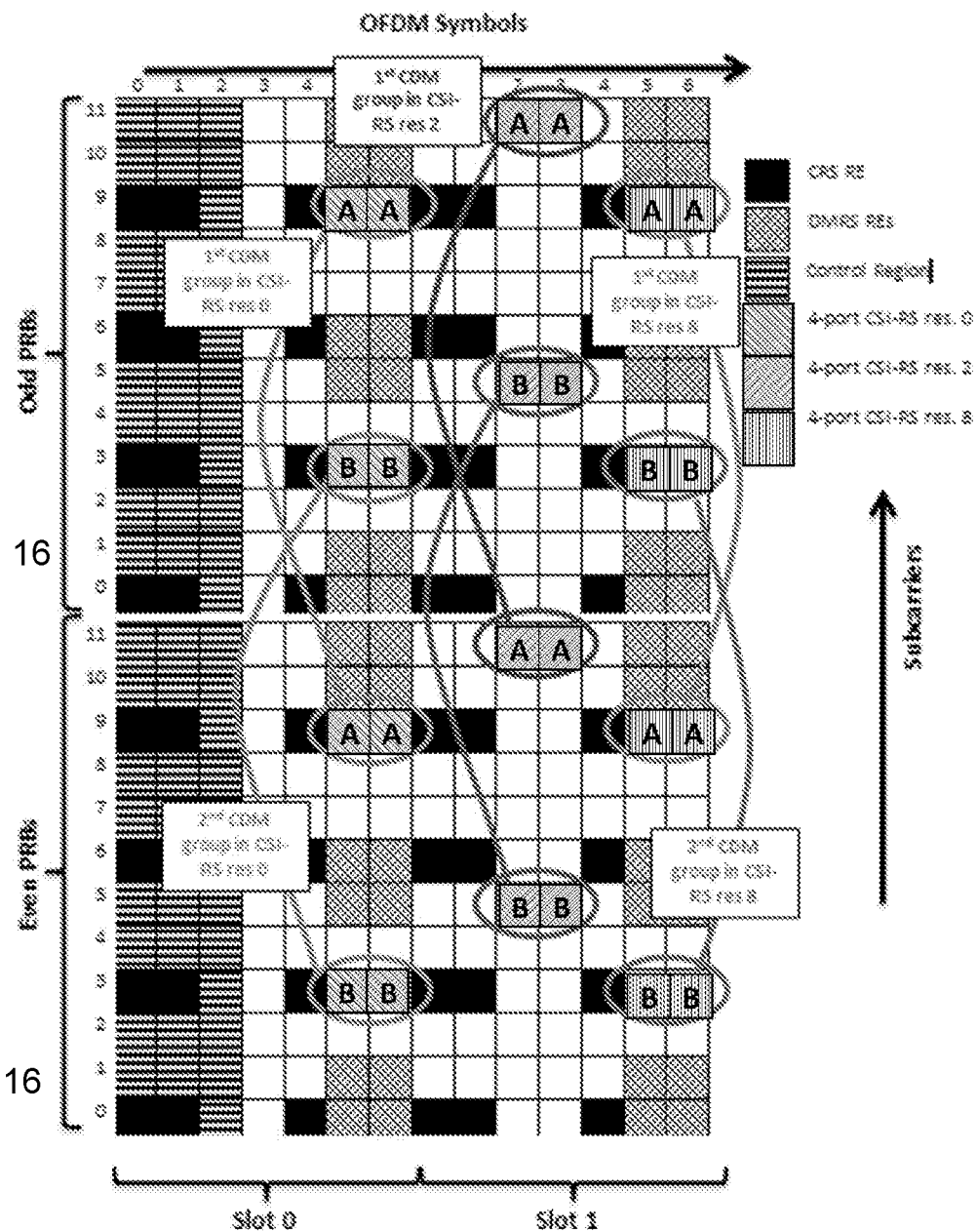
FIG. 17 is an example resource element grid illustrating a 24-port NZP CRI-RS design with length 4 OCC, according to a particular embodiment.

FIG. 17 is an example resource element grid illustrating a 24-port NZP CRI-RS design with length 4 OCC, according to a particular embodiment. The resource element grid comprises two PRBs 16. The horizontal axis represents the time domain and the vertical axis represents the frequency domain.

LTE legacy 4-port CSI-RS resources 0, 2 and 8 are aggregated together to form the 24-port NZP CSI-RS design. CSI-RS resource elements denoted by letter 'A' in two adjacent PRBs within the same legacy 4-port CSI-RS resource are grouped together to form one CDM group. Similarly, CSI-RS resource elements denoted by letter 'B' in two adjacent PRBs within the same legacy 4-port CSI-RS resource are grouped together to form another CDM group. Using the length-4 OCC in Equation 15, 4 CSI-RS ports can be transmitted within each CDM group. As a result, 8 CSI-RS ports can be transmitted within the two CDM groups of each legacy 4-port CSI-RS resource, and 24 CSI-RS ports can be transmitted in the three 4-port legacy CSI-RS resources aggregated together. Although the example illustrated in FIG. 17 shows legacy 4-port CSI-RS configurations 0, 2 and 8 aggregated together, the same design principle applies when three other legacy 4-port CSI-RS configurations are aggregated together.

A particular embodiment includes a 32-port NZP CSI-RS design with length-4 OCC. A 32-port NZP CSI-RS design may be attained by aggregating two legacy 8-port CSI-RS resources. Thus, S=32, $N_{ports}^{CSI}$=8, and $N_{res}^{CSI}$=2. Each aggregated CSI-RS resource carries Q=16 ports, and CDM groups are formed across two adjacent PRBs. The design uses a length-4 OCC, such as the one shown in Equation 15, within a CDM group. Two 32-port CSI-RS configurations are possible within each subframe without any CSI-RS resource element overhead increase. An example of the 32-port NZP CSI-RS design that uses length-4 OCC is shown in FIG. 18.

Figure 18:
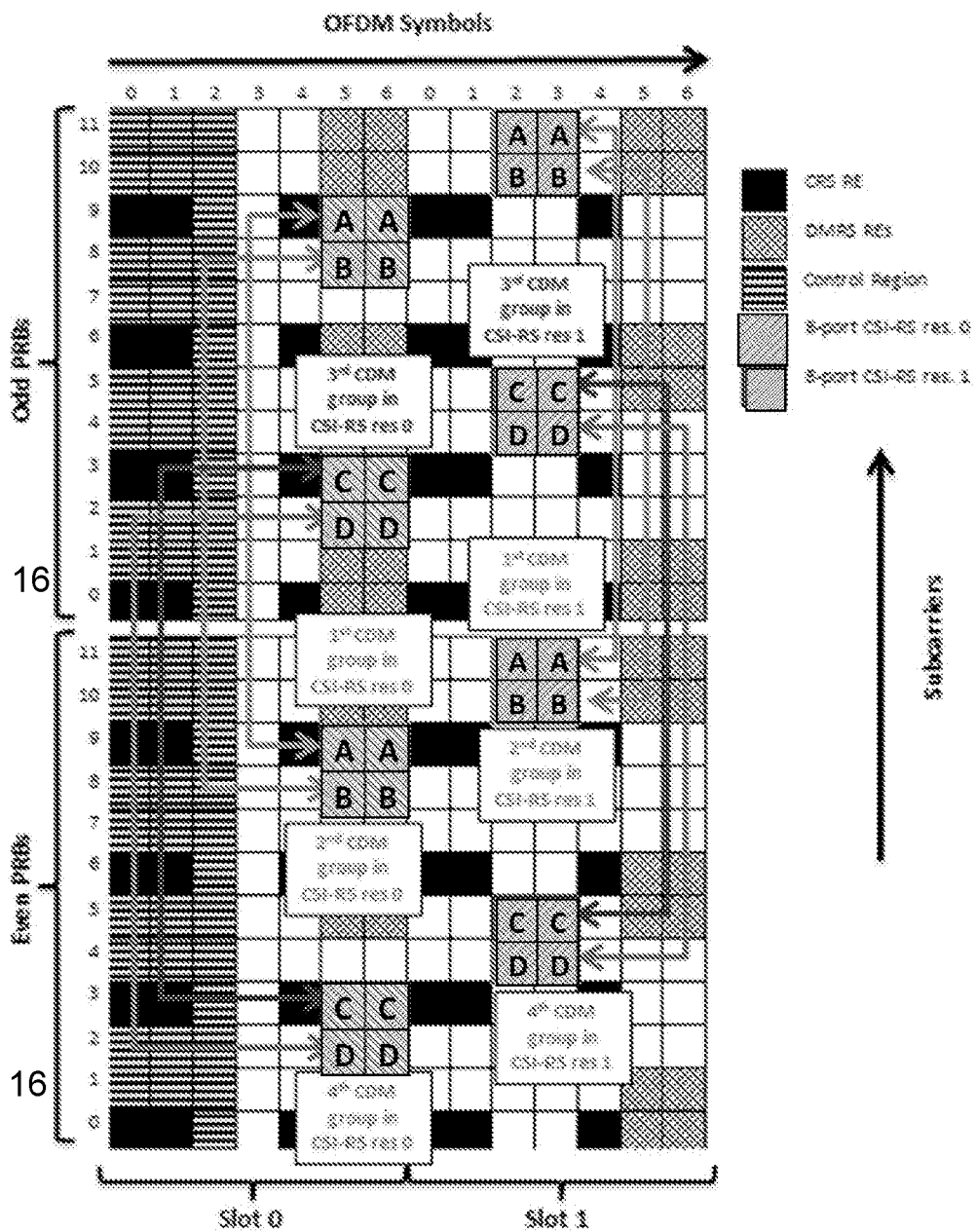
FIG. 18 is an example resource element grid illustrating a 32-port NZP CRI-RS design with length 4 OCC, according to a particular embodiment.

FIG. 18 is an example resource element grid illustrating a 32-port NZP CRI-RS design with length 4 OCC, according to a particular embodiment. The resource element grid comprises two PRBs 16. The horizontal axis represents the time domain and the vertical axis represents the frequency domain.

LTE legacy 8-port CSI-RS resources 0 and 1 are aggregated together to form the 32-port NZP CSI-RS design. CSI-RS resource elements denoted by letter 'A' in two adjacent PRBs within the same legacy 8-port CSI-RS resource are grouped together to form one CDM group. Similarly, CSI-RS resource elements denoted by letters 'B', 'C', and 'D' in two adjacent PRBs within the same legacy 8-port CSI-RS resource are grouped together to form three more CDM groups. Using the length-4 OCC in Equation 15, 4 CSI-RS ports can be transmitted within each CDM group. As a result, 16 CSI-RS ports can be transmitted within the four CDM groups of each legacy 8-port CSI-RS resource, and 32 CSI-RS ports can be transmitted in the two 8-port legacy CSI-RS resources aggregated together. Although the example illustrated in FIG. 18 shows legacy 8-port CSI-RS configurations 0 and 1 aggregated together, the same design principle applies when two other legacy 8-port CSI-RS configurations are aggregated together.

When higher-layer parameter 'cdmType' is set to cdm4 for CSI-RS using more than 16 antenna ports, antenna port number $$p = (2i'+q)N_{ports}^{CSI} + p'$$ Equation 19 where $p' \in \{15, 16, \ldots, 15+N_{ports}^{CSI}-1\}$ and $q \in \{0,1\}$ for CSI-RS resource number $i' \in \{0, 1, \ldots, N_{res}^{CSI}-1\}$.

When higher-layer parameter 'cdmType' is set to cdm4 for CSI-RS using more than 16 antenna ports, the complex-valued modulation symbols $a_{k,l}^{(p)}$ used as reference symbols on antenna port p may be defined as:

$$a_{k,l}^{(p)} = w_{p',m}(i) \cdot r_{l,n_s}(m')$$ Equation 20 where $$k = k' + 12m - \begin{cases} k'' & \text{for } p' \in \{15, 16, 19, 20\}, \\ & \text{normal cyclic prefix, } N_{ports}^{CSI} = 8 \\ k'' + 6 & \text{for } p' \in \{17, 18, 21, 22\}, \\ & \text{normal cyclic prefix, } N_{ports}^{CSI} = 8 \\ 6k'' & \text{for } p' \in \{15, 16, 17, 18\}, \\ & \text{normal cyclic prefix, } N_{ports}^{CSI} = 4 \end{cases}$$ Equation 21

$$l = l' + \begin{cases} 1'' & \text{CSI reference signal configurations} \\ & \text{0-19, normal cyclic prefix} \\ 21'' & \text{CSI reference signal configurations} \\ & \text{20-31, normal cyclic prefix} \end{cases}$$

$$1'' = 0, 1$$

$$k'' = 0, 1$$

$$i = \begin{cases} 1'' + \text{Mod}(m, 2) \times 2 & \text{if Mod}(N_{RB}^{DL}, 2) = 0 \\ 1'' + \text{Mod}(m, 2) \times 2 & \text{if Mod}(N_{RB}^{DL}, 2) = 1 \text{ and} \\ & m < \dfrac{N_{RB}^{DL} - 1}{2} \\ 1'' + \text{Mod}(m-1, 2) \times 2 & \text{if Mod}(N_{RB}^{DL}, 2) = 1 \text{ and} \\ & m > \dfrac{N_{RB}^{DL} + 1}{2} \end{cases}$$

$$m = \begin{cases} 0, 1, \ldots, (N_{RB}^{DL} - 1)/2, \\ (N_{RB}^{DL} + 1)/2, \ldots, N_{RB}^{DK} - 1 & \text{if Mod}(N_{RB}^{DL}, 2) = 1 \\ 0, 1, \ldots, N_{RB}^{DL} - 1, & \text{otherwise} \end{cases}$$

$$m' = m + \left\lfloor \dfrac{N_{RB}^{max,DL} - N_{RB}^{DL}}{2} \right\rfloor$$

where $w_{p',m}(i)$ in Equation 15 is given by Table 7. Furthermore, Mod(x,2) denotes the modulo-2 operator (if x is an odd integer then Mod(x,2)=1; if x is an even integer then Mod(x,2)=0. Note that in addition to depending on the quantity i defined in Equation 21 and the quantity p', $w_{p',m}(i)$ also depends on the resource block index m and the quantity q defined in Equation 19. If one of Conditions 1-3 in Table 7 is satisfied, then $[w_{p',m}(0), \ldots, w_{p',m}(3)]$ are chosen depending on the value of q as shown in the top part of Table 7. If one of Conditions 4-6 in Table 7 is satisfied, then $[w_{p',m}(4), \ldots, w_{p',m}(7)]$ are chosen depending on the value of q as shown in the bottom part of Table 7.

TABLE 7

The sequence $w_{p',m}(i)$ for CDM 4

| | p' | | $[w_{p',m}(0), w_{p',m}(1)]$ | |
|---|---|---|---|---|
| Conditions on m | $N_{ports}^{CSI} = 4$ | $N_{ports}^{CSI} = 8$ | q = 0 | q = 1 |
| Condition 1: Mod(m, 2) = 0 and $\text{Mod}(N_{RB}^{DL}, 2) = 0$ or Condition 2: Mod(m, 2) = 0, $\text{Mod}(N_{RB}^{DL}, 2) = 1$ and $m < \dfrac{N_{RB}^{DL} - 1}{2}$ | 15, 17<br>16, 18 | 15, 17, 19, 21<br>16, 18, 20, 22 | [1  1]<br>[1 −1] | [1  1]<br>[1 −1] |

TABLE 7-continued

The sequence $w_{p',m}(i)$ for CDM 4 or

Condition 3: Mod(m, 2) = 1, $\text{Mod}(N_{RB}^{DL}, 2) = 1$ and $m > \frac{N_{RB}^{DL} + 1}{2}$

| | p' | | $[w_{p',m}(2), w_{p',m}(3)]$ | |
|---|---|---|---|---|
| Conditions on m | $N_{ports}^{CSI} = 4$ | $N_{ports}^{CSI} = 8$ | q = 0 | q = 1 |
| Condition 4: Mod(m, 2) = 1 and | 15, 17 | 15, 17, 19, 21 | [1  1] | [−1 −1] |
| | 16, 18 | 16, 18, 20, 22 | [1 −1] | [−1  1] |
| $\text{Mod}(N_{RB}^{DL}, 2) = 0$ | | | | | or

Condition 5: Mod(m, 2) = 1, $\text{Mod}(N_{RB}^{DL}, 2) = 1$ and $m < \frac{N_{RB}^{DL} - 1}{2}$ or Condition 6: Mod(m, 2) = 0, $\text{Mod}(N_{RB}^{DL}, 2) = 1$ and $m > \frac{N_{RB}^{DL} + 1}{2}$ Some embodiments include an odd number of PRBs. In some of the first group of embodiments, the CSI-RS resource elements may be arranged in PRB pairs (i.e., CSI-RS signal for each CSI-RS port is transmitted on resource elements of two adjacent PRBs). Some LTE systems, however, include an odd number of PRBs. For example, systems with 5 MHz system bandwidth may contain 25 PRBs and systems with 15 MHz bandwidth may contain 75 PRBs. In this case, one option is that CSI-RS is not transmitted on one of the PRBs and the CSI-RS resource elements in the PRB are allocated for PDSCH. One question is where the PRB that does not contain CSI-RS transmission should be allocated.

Particular embodiments may allocate the PRB to the middle of the bandwidth. For example, for 5 MHz bandwidth with PRBs indexed from 0 to 24, PRB #12 may be selected for not transmitting CSI-RS. For 15 MHz bandwidth with PRB indexed from 0 to 74, PRB #38 may be selected for not transmitting CSI-RS. In general, for a system with N PRBs and mod(N,2)=1, PRB # (N−1)/2 may be selected for not transmitting CSI-RS as shown in FIG. 19.

Figure 19:
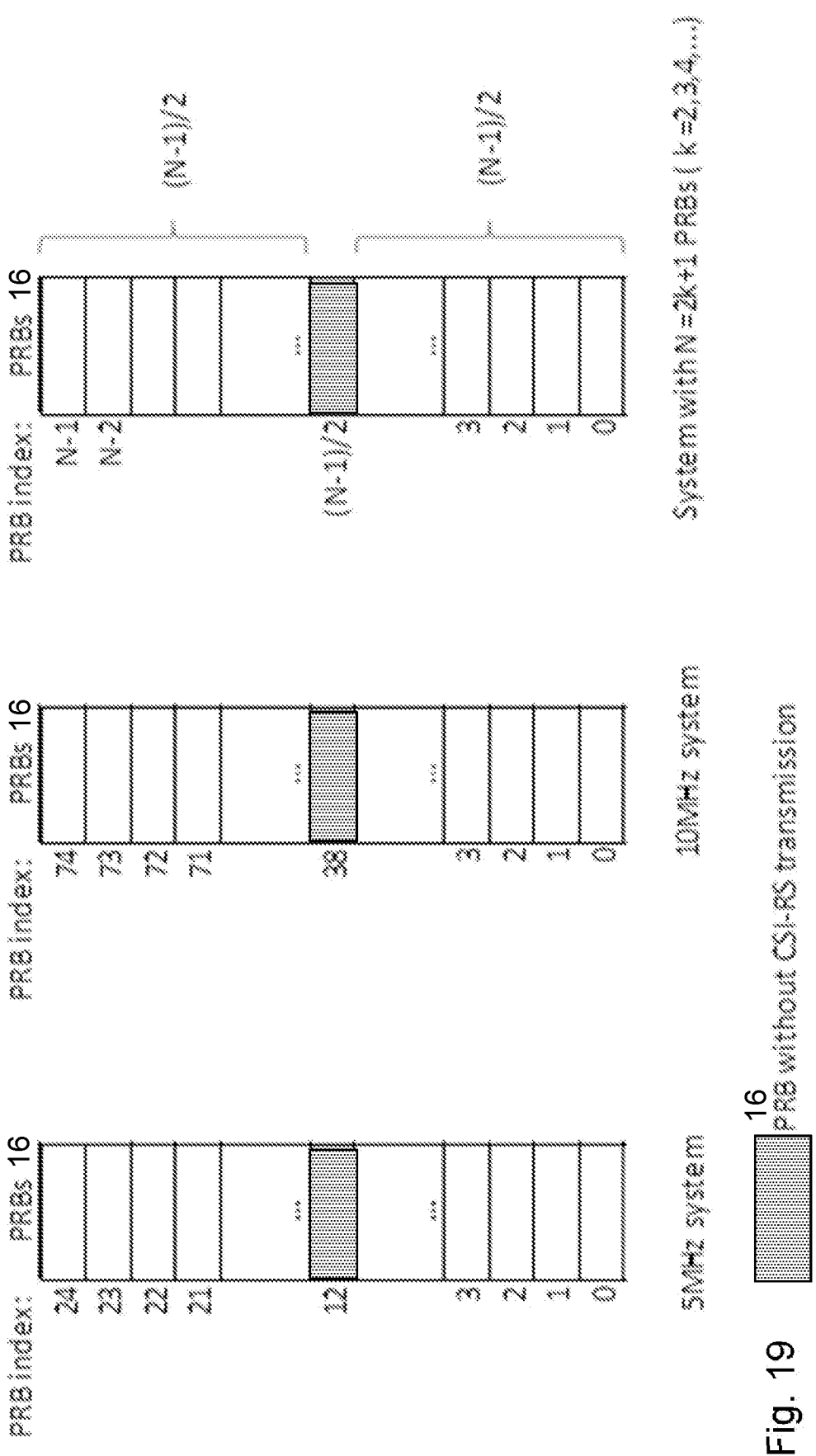
FIG. 19 illustrates PRB allocation without CRS transmission in a system with an odd number of PRBs, according to some embodiments.

FIG. 19 illustrates PRB allocation without CRS transmission in a system with an odd number of PRBs, according to some embodiments. The resource element grid comprises two PRBs 16. As illustrated, the middle PRB in each system is the PRB without CSI-RS transmission.

One of the benefits with this PRB selection is that the selected PRB is one of 6 PRBs that carry PSS/SSS/PBCH in certain subframes over which CSI-RS transmission is not allowed, so the impact on channel estimation by removing the PRB for CSI-RS transmission is not significant. Also, in some embodiments a UE could make channel interpolations for the PRB based on the channel estimations on both side of the PRB and less band edge effect is expected compared to the case where the PRB without CSI-RS transmission is allocated to the band edge.

In a second group of embodiments, a fraction of the CSI-RS ports may be transmitted over a first PRB and the remaining CSI-RS ports may be transmitted over a second PRB. In the existing CSI-RS designs described above in the Background section, a CSI-RS signal is transmitted on each PRB of the associated antenna port. This allows the channel between each pair of transmit and receive antenna ports to be estimated at each PRB. However, when the channel is less frequency selective (i.e., the channel does not change much over frequency) per PRB channel estimation may not be necessary. The channel can be measured coarser in frequency domain without much system performance loss.

For example, in the second group of embodiments a fraction of the CSI-RS ports may be transmitted over the even PRBs and the remaining CSI-RS ports may be transmitted over the odd PRBs. This supports more antenna ports without increasing the CSI-RS resource overhead. In addition, the number of available CSI-RS configurations in a subframe may not need to be reduced.

A particular embodiment includes a 32-port NZP CSI-RS design with length-8 OCC. A 32-port NZP CSI-RS design may be attained by aggregating two legacy 8-port CSI-RS resources. Each aggregated CSI-RS resource carries 8 ports in the even PRBs and 8 ports in the odd PRBs. Hence, the two aggregated CSI-RS resources carry 16 CSI-RS ports in the even PRBs and another 16 CSI-RS ports in the odd PRBs. The design uses a length-8 OCC, such as the one shown in Equation 11, within a CDM group. Two 32-port CSI-RS configurations are possible within each subframe without any CSI-RS resource element overhead increase. An example of the 32-port NZP CSI-RS design that uses length-8 OCC is shown in FIG. 20.

Figure 20:
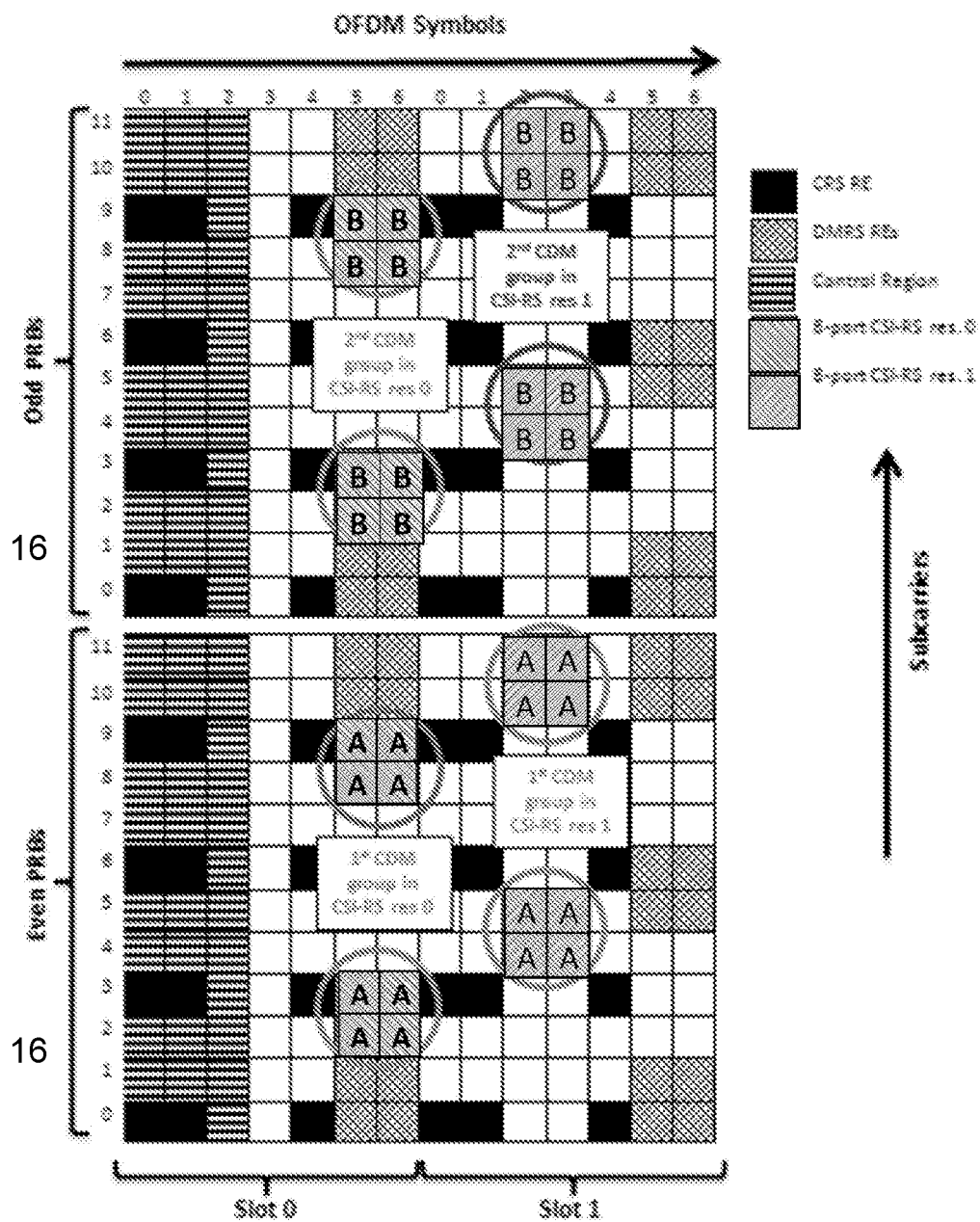
FIG. 20 illustrates an example resource element grid with a 32-port NZP CRI-RS design with length 8 OCC, according to a particular embodiment.

FIG. 20 illustrates two example resource element grids with a 32-port NZP CRI-RS design with length 8 OCC, according to a particular embodiment. The resource element grid comprises two PRBs 16. Each resource element grid comprises a PRB 16. The horizontal axis represents the time domain and the vertical axis represents the frequency domain.

LTE legacy 8-port CSI-RS resources 0 and 1 are aggregated together to form the 32-port NZP CSI-RS design. CSI-RS resource elements denoted by letter 'A' in the even PRBs within the same legacy 8-port CSI-RS resource are grouped together to form one CDM group. Similarly, CSI-RS resource elements denoted by letter 'B' in the odd PRBs within the same legacy 8-port CSI-RS resource are grouped together to form another CDM group.

Using the length-8 OCC in Equation 11, 8 CSI-RS ports can be transmitted within each CDM group. In this embodiment, the CDM group is contained within a PRB. Although the illustrated in FIG. 20 shows legacy 8-port CSI-RS configurations 0 and 1 aggregated together, the same design principle applies when two other legacy 8-port CSI-RS configurations are aggregated together.

When higher-layer parameter 'cdmType' is set to cdm8 for CSI-RS using more than 16 antenna ports, antenna port number $$p = (2i'+q)N_{ports}^{CSI} + p' \quad \text{Equation 22}$$

where $p' \in \{15, 16, \ldots, 15+N_{ports}^{CSI}-1\}$ and $q \bigstar \{0,1\}$ for CSI-RS resource number $i' \in \{0, 1, \ldots, N_{res}^{CSI}-1\}$.

When higher-layer parameter 'cdmType' is set to cdm8 for CSI-RS using more than 16 antenna ports, the complex-valued modulation symbols $a_{k,l}^{(p)}$ used as reference symbols on antenna port p may be defined as:

$$a_{k,l}^{(p)} = w_{p'}(i) \cdot r_{l,n_s}(m') \quad \text{Equation 23}$$

where $$k = k' + 12m - 6k'' + k''' \quad \text{Equation 24}$$
$$p' \in \{15, 1617, 18, 19, 20, 21, 22\},$$
$$\text{normal cyclic prefix, } N_{posts}^{CSI} = 8$$

$$l = l' + \begin{cases} 1'' & \text{CSI reference signal configurations} \\ & 0\text{-}19, \text{ normal cyclic prefix} \\ 21'' & \text{CSI reference signal configurations} \\ & 20\text{-}31, \text{ normal cyclic prefix} \end{cases}$$

$$l'' = 0, 1$$
$$k'' = 0, 1$$
$$k''' = 0, 1$$

$$i = \begin{cases} 2k'' + 1'' & \text{for } p' \in \{15, 16, 19, 20\} \\ 2k'' + 1'' + 4 & \text{for } p' \in \{17, 18, 21, 22\} \end{cases}$$

$$m = \begin{cases} 0, 2, \ldots, N_{RB}^{DL} - 2 & \text{if } q = 0 \text{ and } \text{Mod}(N_{RB}^{DL}, 2) = 0 \\ 1, 3, \ldots, N_{RB}^{DL} - 1 & \text{if } q = 1 \text{ and } \text{Mod}(N_{RB}^{DL}, 2) = 0 \\ 0, 2, \ldots, N_{RB}^{DL} - 1 & \text{if } q = 0 \text{ and } \text{Mod}(N_{RB}^{DL}, 2) = 1 \\ 1, 3, \ldots, N_{RB}^{DL} - 2 & \text{if } q = 1 \text{ and } \text{Mod}(N_{RB}^{DL}, 2) = 1 \end{cases}$$

$$m' = m + \left\lfloor \frac{N_{RB}^{max,DL} - N_{RB}^{DL}}{2} \right\rfloor$$

where $w_{p'}(i)$ in Equation 23 is given by Table 8. Furthermore, Mod(x,2) denotes the modulo-2 operator (if x is an odd integer then Mod(x,2)=1; if x is an even integer then Mod(x,2)=0.

TABLE 8

The sequence $w_{p'}(i)$ for CDM4

| $N_{ports}^{CSI} = 8$ $p'$ | $[w_{p',m}(0), \ldots, w_{p',m}(7)]$ |
| --- | --- |
| 15 | [1 1 1 1 1 1 1 1] |
| 16 | [1 −1 1 −1 1 1 −1 1 −1] |

TABLE 8-continued

The sequence $w_{p'}(i)$ for CDM4

| $N_{ports}^{CSI} = 8$ $p'$ | $[w_{p',m}(0), \ldots, w_{p',m}(7)]$ |
| --- | --- |
| 17 | [1 1 −1 −1 1 1 −1 −1] |
| 18 | [1 −1 −1 1 1 −1 −1 1] |
| 19 | [1 1 1 1 −1 −1 −1 −1] |
| 20 | [1 −1 1 −1 −1 1 −1 1] |
| 21 | [1 1 −1 −1 −1 −1 1 1] |
| 22 | [1 −1 −1 1 −1 1 1 −1] |

Figure 21:
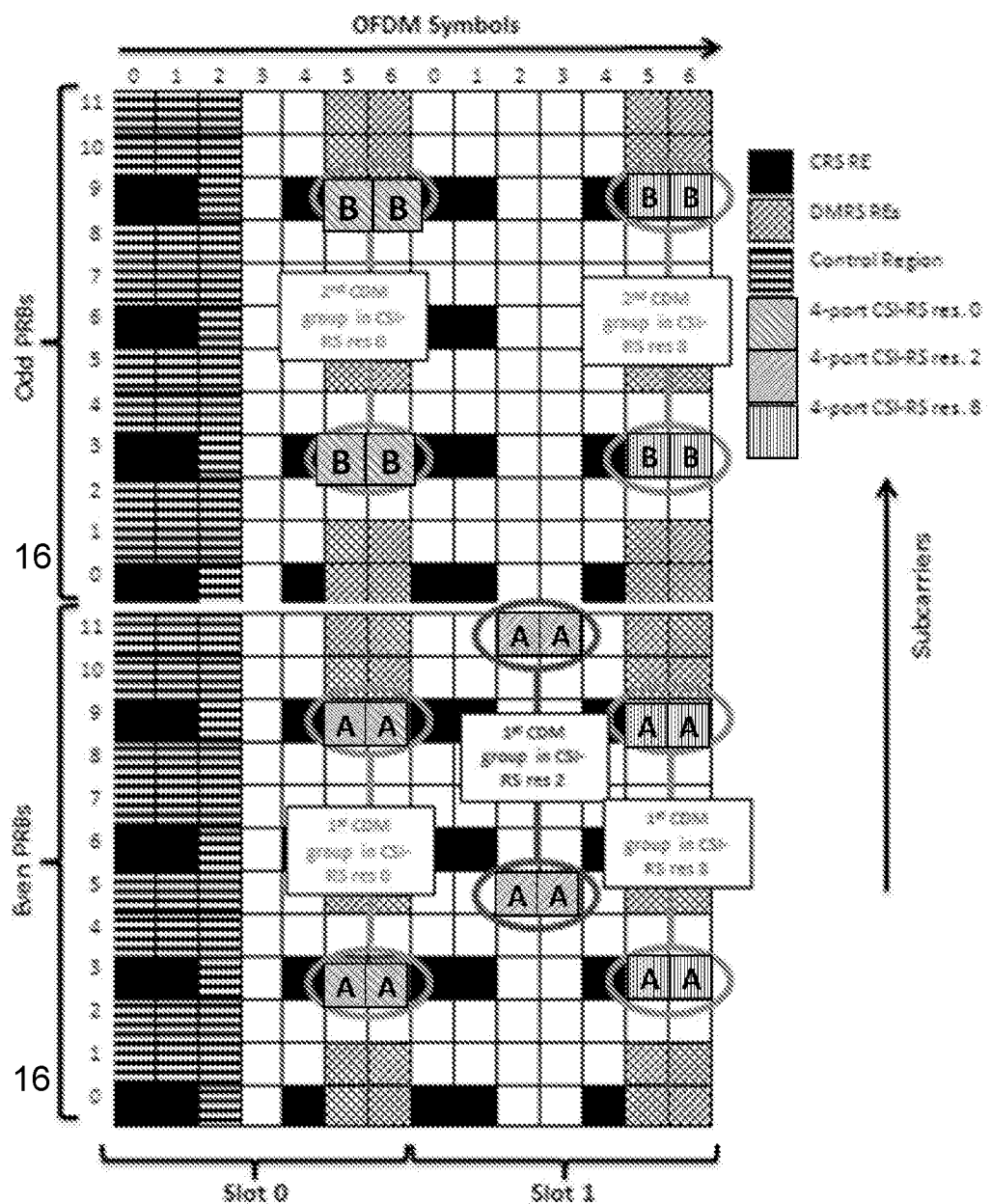
FIG. 21 illustrates an example resource element grid with a 20-port NZP CRI-RS design with length 4 OCC, according to a particular embodiment.

Particular embodiments include a 20-port NZP CSI-RS design with length-4 OCC. A 20-port NZP CSI-RS design may be attained by aggregating 3 legacy 4-port CSI-RS resources in even PRBs and 2 legacy 4-port CSI-RS resources in odd PRBs as shown in FIG. 21. Each aggregated CSI-RS resource carries 4 ports in the even PRBs and 4 ports in the odd PRBs. Given 3 aggregated CSI-RS resources in even PRBs, these aggregated resources carry 12 ports. The 2 aggregated CSI-RS resources in odd PRBs carry 8 ports. The design uses a length-4 OCC, such as the one shown in Equation 15, within a CDM group. Up to four 20-port CSI-RS configurations are possible within each subframe without any CSI-RS resource element overhead increase. An example of the 20-port NZP CSI-RS design that uses length-4 OCC is shown in FIG. 21.

FIG. 21 illustrates two example resource element grids with a 20-port NZP CRI-RS design with length 4 OCC, according to a particular embodiment. The resource element grid comprises two PRBs 16. The horizontal axis represents the time domain and the vertical axis represents the frequency domain.

LTE legacy 4-port CSI-RS resources 0, 2 and 8 are aggregated together in even PRBs and LTE legacy 4-port CSI-RS resources 0 and 8 are aggregated together in odd PRBs. CSI-RS resource elements denoted by letter 'A' in the even PRBs within the same legacy 4-port CSI-RS resource are grouped together to form one CDM group. Similarly, CSI-RS resource elements denoted by letter 'B' in the odd PRBs within the same legacy 4-port CSI-RS resource are grouped together to form another CDM group. Using the length-4 OCC in Equation 15, 4 CSI-RS ports can be transmitted within each CDM group. In this embodiment, the CDM group is contained within a PRB. Although the example illustrated in FIG. 21 shows legacy 4-port CSI-RS configurations 0, 8 or 2 aggregated together, the same design principle applies when two other legacy 4-port CSI-RS configurations are aggregated together in odd PRBs and three other legacy 4-port CSI-RS configurations are aggregated together in even PRBs.

Figure 22:
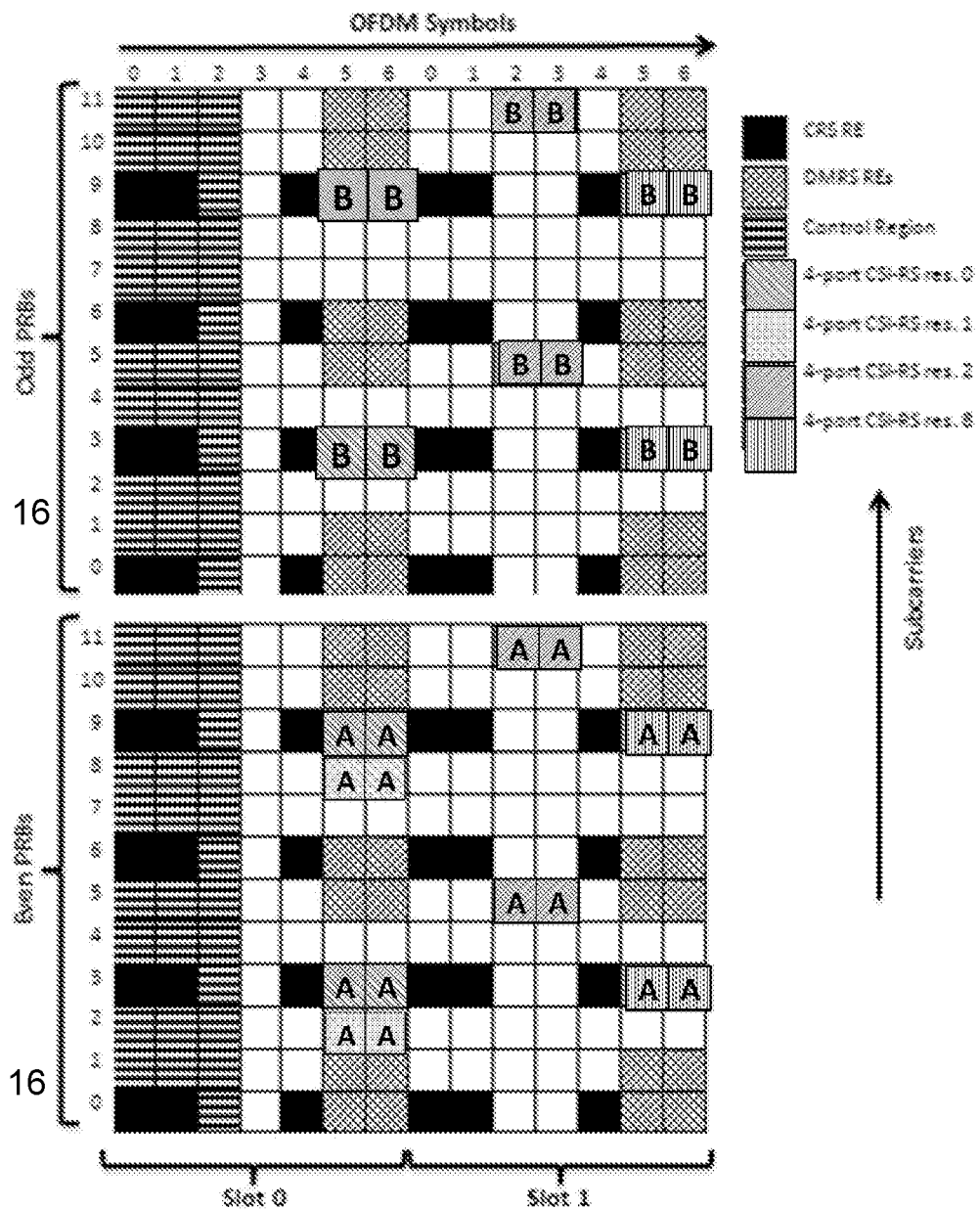
FIG. 22 illustrates an example resource element grid with a 28-port NZP CRI-RS design with length 4 OCC, according to a particular embodiment.

Particular embodiments include a 28-port NZP CSI-RS design with length-4 OCC. A 28-port NZP CSI-RS design may be attained by aggregating 4 legacy 4-port CSI-RS resources in even PRBs and 3 legacy 4-port CSI-RS resources in odd PRBs as shown in FIG. 22. Each aggregated CSI-RS resource carries 4 ports in the even PRBs and 4 ports in the odd PRBs. Given 4 aggregated CSI-RS resources in even PRBs, the aggregated resources carry 16 ports. The 3 aggregated CSI-RS resources in odd PRBs carry 12 ports. The design uses a length-4 OCC, such as the one shown in Equation 15, within a CDM group. Up to two 28-port CSI-RS configurations are possible within each subframe without any CSI-RS resource element overhead increase. An example of the 28-port NZP CSI-RS design that uses length-4 OCC is shown in FIG. 22.

FIG. 22 illustrates two example resource element grids with a 28-port NZP CRI-RS design with length 4 OCC, according to a particular embodiment. The resource element grid comprises two PRBs 16. The horizontal axis represents the time domain and the vertical axis represents the frequency domain.

LTE legacy 4-port CSI-RS resources 0, 1, 2 and 8 are aggregated together in even PRBs and LTE legacy 4-port CSI-RS resources 0, 2 and 8 are aggregated together in odd PRBs. CSI-RS resource elements denoted by letter 'A' in the even PRBs within the same legacy 4-port CSI-RS resource are grouped together to form one CDM group. Similarly, CSI-RS resource elements denoted by letter 'B' in the odd PRBs within the same legacy 4-port CSI-RS resource are grouped together to form another CDM group. Using the length-4 OCC in Equation 15, 4 CSI-RS ports can be transmitted within each CDM group. In this embodiment, the CDM group is contained within a PRB. Although the example illustrated in FIG. 22 shows legacy 4-port CSI-RS configurations 0, 2, 8 and 1 aggregated together, the same design principle applies when three other legacy 4-port CSI-RS configurations are aggregated together in odd PRBs and four other legacy 4-port CSI-RS configurations are aggregated together in even PRBs.

When higher-layer parameter 'cdmType' is set to cdm4 for CSI-RS using more than 16 antenna ports, antenna port number $$p = 2i'N_{ports}^{CSI} + p' \qquad \text{Equation 25}$$

where $p' \in \{15, 16, \ldots, 15+N_{ports}^{CSI}-1\}$. The CSI-RS resource number i' in Equation 25 is given by $$i' \in \begin{cases} \{0, 1, \ldots, N_{res,1}^{CSI}-1\} & \text{if } q=0 \\ \{0, 1, \ldots, N_{res,2}^{CSI}-1\} & \text{if } q=1 \end{cases} \qquad \text{Equation 26}$$

In Equation 26, the conditions q=0 and q=1 correspond to the even PRBs and the odd PRBs, respectively. Thus, $N_{res,1}^{CSI}$ and $N_{res,2}^{CSI}$ denote the number of legacy CSI resources configured for even and odd PRBs, respectively. For 20 NZP CSI-RS ports, $N_{res,1}^{CSI}=3$ and $N_{res,2}^{CSI}=2$. For 28 NZP CSI-RS ports, $N_{res,1}^{CSI}=4$ and $N_{res,2}^{CSI}=3$. In some other embodiments with a different number of CSI-RS ports, $N_{res,1}^{CSI}$ and $N_{res,2}^{CSI}$ can be chosen to be equal.

When higher-layer parameter 'cdmType' is set to cdm4 for CSI-RS using more than 16 (P) antenna ports, the complex-valued modulation symbols $a_{k,l}^{(p)}$ used as reference symbols on antenna port p may be defined as:

$$a_{k,l}^{(p')} = w_{p'}(i) \cdot r_{l,n_s}(m') \qquad \text{Equation 27}$$

where $$k = k' + 12m - \begin{cases} k'' & \text{for } p' \in \{15, 16, 19, 20\}, \\ & \text{normal cyclic prefix, } N_{ports}^{CSI} = 8 \\ k'' + 6 & \text{for } p' \in \{17, 18, 21, 22\}, \\ & \text{normal cyclic prefix, } N_{ports}^{CSI} = 8 \\ 6k'' & \text{for } p' \in \{15, 16, 17, 18\}, \\ & \text{normal cyclic prefix, } N_{ports}^{CSI} = 4 \end{cases} \qquad \text{Equation 28}$$

$$l = l' + \begin{cases} 1'' & \text{CSI reference signal configurations} \\ & 0\text{-}19, \text{ normal cyclic prefix} \\ 21'' & \text{CSI reference signal configurations} \\ & 20\text{-}31, \text{ normal cyclic prefix} \end{cases}$$

$$1'' = 0, 1$$

$$k'' = 0, 1$$

$$i = 2k'' + 1''$$

$$m = \begin{cases} 0, 2, \ldots, N_{RB}^{DL}-2 & \text{if } q=0 \text{ and } \text{Mod}(N_{RB}^{DL}, 2)=0 \\ 1, 3, \ldots, N_{RB}^{DL}-1 & \text{if } q=1 \text{ and } \text{Mod}(N_{RB}^{DL}, 2)=0 \\ 0, 2, \ldots, N_{RB}^{DL}-1 & \text{if } q=0 \text{ and } \text{Mod}(N_{RB}^{DL}, 2)=1 \\ 1, 3, \ldots, N_{RB}^{DL}-2 & \text{if } q=1 \text{ and } \text{Mod}(N_{RB}^{DL}, 2)=1 \end{cases}$$

$$m' = m + \left\lfloor \frac{N_{RB}^{max,DL} - N_{RB}^{DL}}{2} \right\rfloor$$

where $w^{p'}(i)$ in Equation 28 is given by Table 4. Furthermore, Mod(x,2) denotes the modulo-2 operator (if x is an odd integer then Mod(x,2)=1; if x is an even integer then Mod(x,2)=0.

A third group of embodiments supports backwards compatibility. For example, when a system with more than 16 ports is deployed, it is desirable that the legacy UEs can still be supported. For a legacy UE supporting 8-port CSI-RS, it is desirable to support data transmission with 8 antenna ports. To support such a backward compatible feature, particular embodiments may use OCC2 code and share 8 of the CSI-RS ports with the legacy UEs. Some embodiments may allocate CSI-RS resources of all CSI-RS ports in each PRB.

A particular embodiment includes NZP CSI-RS design with length-2 OCC. For 32 CSI-RS ports, 32 CSI-RS resource elements are allocated in each PRB. The 32 resource elements can be an aggregation of 4 legacy 8-port CSI-RS resources as shown in FIG. 23.

Figure 23:
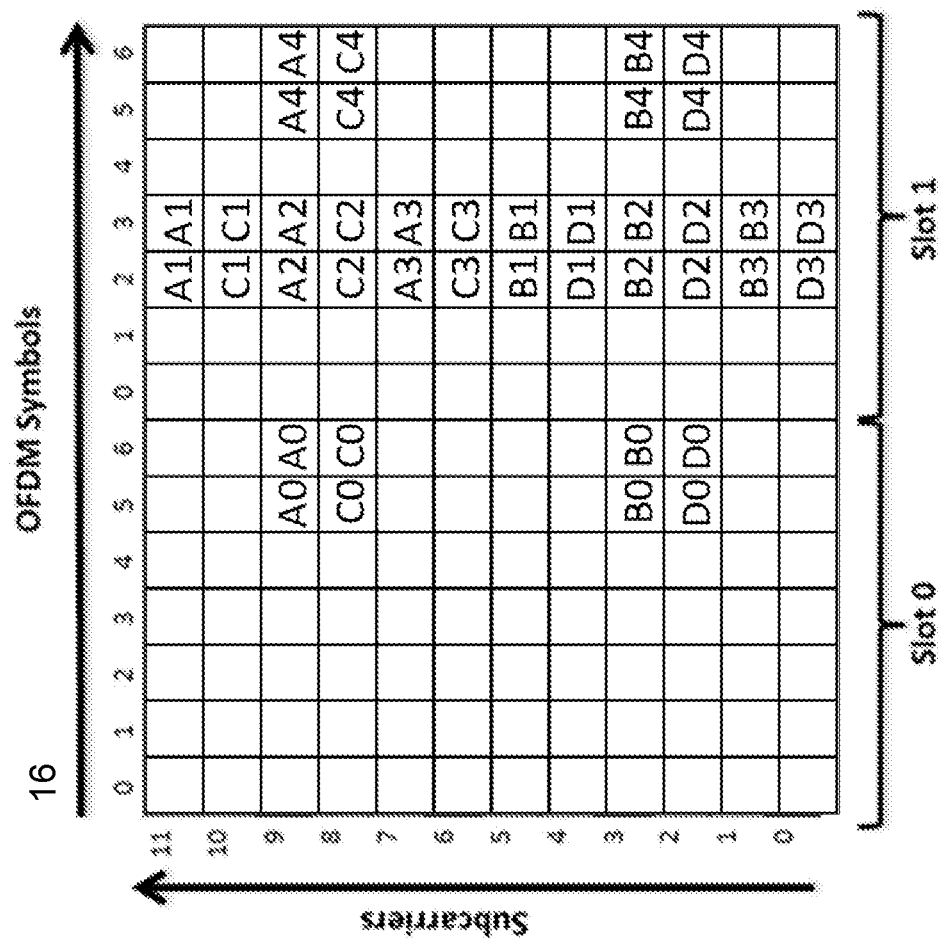
FIG. 23 is an example resource element grid illustrating a 32-port NZP CRI-RS design with length 2 OCC, according to a particular embodiment.

FIG. 23 is an example resource element grid illustrating a 32-port NZP CRI-RS design with length 2 OCC, according to a particular embodiment. The horizontal axis represents the time domain and the vertical axis represents the frequency domain. OCC2 code is applied over the resource elements labelled with the same letter (e.g., "A") of each 8-port resource. Resource elements of the same 8-port resource include the same number. For example, resource element pairs A0, B0, C0 and D0 form one 8-port resource.

By properly allocating antenna ports to the CSI-RS resource elements, one of the 8-port CSI-RS resources can be also configured for legacy UEs supporting 8 CSI-RS ports. The rest of the CSI-RS resource elements can be configured as ZP CSI-RS for the legacy UEs so that the UEs assume that there is no CSI-RS transmission on those resource elements. For example, 8-port CSI-RS resource configurations 0 to 3 can be aggregated to form a 32-port CSI-RS resource and 8-port CSI-RS configuration 0 can be used for sharing with legacy UEs supporting only 8 CSI-RS ports.

When antennas with two polarizations are deployed, to be fully compatible to a legacy 8-port CSI-RS, the CSI-RS resource elements labelled with letters "A" and "B" in FIG. 23 can be mapped to antenna ports with one polarization, while resource elements labelled with "C" and "D" can be mapped to antenna ports with the other polarization. This can be done by proper CSI-RS port mapping between the 32 ports CSI-RS and the four 8 ports CSI-RS. An example is shown in Table 9, where the 32 CSI-RS ports are indexed from 15 to 46 while each of the four 8 CSI-RS ports are indexed from 15 to 22.

TABLE 9 example CSI-RS port mapping to support legacy UEs

| | | 32 ports CSI-RS port index --> | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|
| Polarization #1 | 8-port CSI_RS port index | 8-port config 0 | 15 | 16 | 17 | 18 | | | | | | | | | | | | |
| | | 8-port config 1 | | | | | 15 | 16 | 17 | 18 | | | | | | | | |
| | | 8-port config 2 | | | | | | | | | 15 | 16 | 17 | 18 | | | | |
| | | 8-port config 3 | | | | | | | | | | | | | 15 | 16 | 17 | 18 |
| | | 32 ports CSI-RS port index --> | 31 | 32 | 33 | 34 | 35 | 36 | 37 | 38 | 39 | 40 | 41 | 42 | 43 | 44 | 45 | 46 |
| Polarization #2 | 8-port CSI_RS port index | 8-port config 0 | 19 | 20 | 21 | 22 | | | | | | | | | | | | |
| | | 8-port config 1 | | | | | 19 | 20 | 21 | 22 | | | | | | | | |
| | | 8-port config 2 | | | | | | | | | 19 | 20 | 21 | 22 | | | | |
| | | 8-port config 3 | | | | | | | | | | | | | 19 | 20 | 21 | 22 |

Similarly, the resources for N (N>16) CSI-RS ports can be obtained by aggregating M legacy CSI-RS resources. For example: 20 port CSI-RS can be attained by aggregating five legacy 4-port CSI-RS resources; 24 port CSI-RS can be attained by aggregating six legacy 4-port CSI-RS resources or three 8 ports CSI-RS resources; and 28 port CSI-RS can be attained by aggregating seven legacy 4 ports CSI-RS resources.

In particular embodiments, one of the legacy CSI-RS resources can be shared with legacy UEs supporting 4 or 8 CSI-RS ports.

Figure 24:
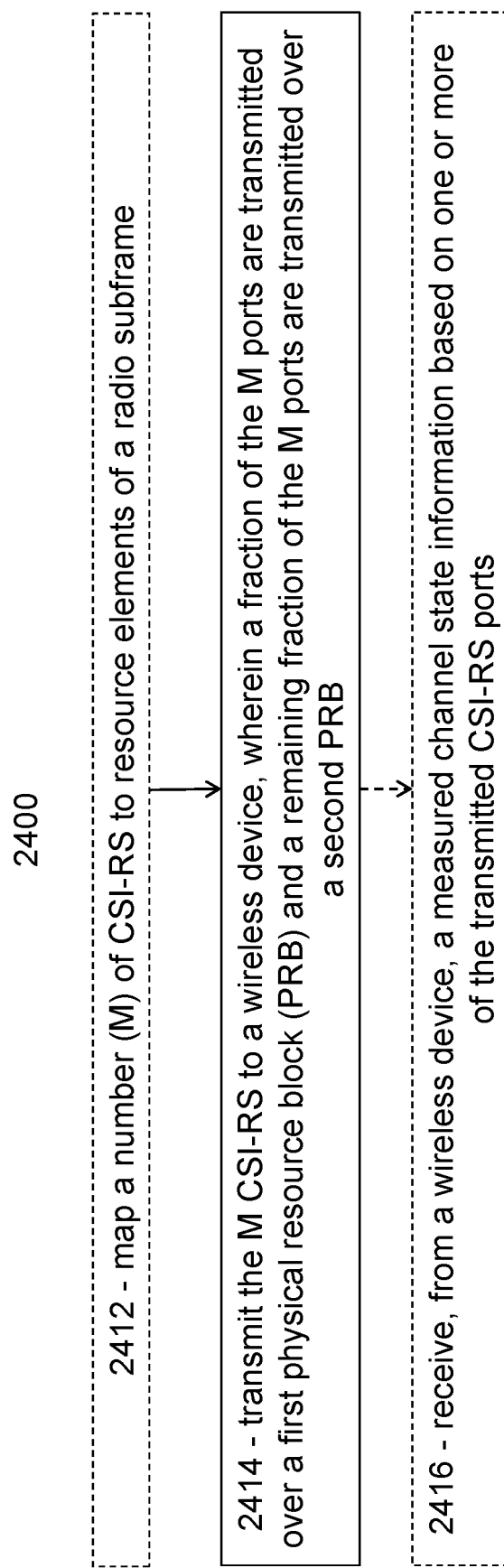
FIG. 24 is a flow diagram illustrating an example method in a network node of transmitting channel state information reference signals (CSI-RS), according to some embodiments.
Figure 25:
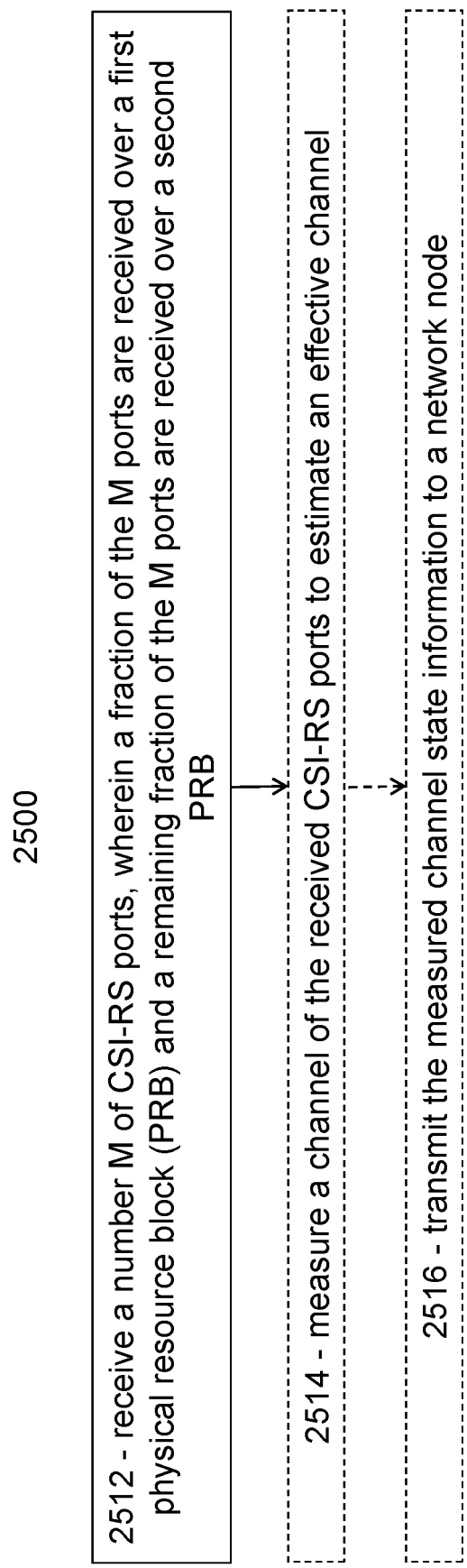
FIG. 25 is a flow diagram illustrating an example method in a wireless device of receiving channel state information reference signals (CSI-RS), according to some embodiments.

The examples described with respect to FIGS. 12-23 may be generally represented by the flowcharts in FIG. 24 (with respect to a network node) and FIG. 25 (with respect to a wireless device).

FIG. 24 is a flow diagram illustrating an example method in a network node of transmitting channel state information reference signals (CSI-RS), according to some embodiments. In particular embodiments, one or more steps of FIG. 24 may be performed by radio network elements of wireless network 100 described with respect to FIG. 12.

The method begins at step 2412, where a network node maps a number (M) of CSI-RS to resource elements of a radio subframe. M is greater than 16. For example, network node 120 may map 20 (or 24, 28, 32, or any other suitable number) of antenna ports to resource elements of a radio subframe. Network node 120 may map a fraction of the 20 antenna ports to a first PRB (e.g., all odd numbered PRBs), and the remaining antenna ports to a second PRB (e.g., all even numbers PRBs).

In particular embodiments, the mapping comprises grouping the resource elements of the radio subframe into a plurality of aggregated CSI-RS resources. Each aggregated CSI-RS resource comprises a number $N_{ports}^{CSI}$ of resource elements per PRB (e.g., two, four, or eight resource elements). The mapping further comprises combining a number ($\tilde{N}_{res}^{CSI}$) of the plurality of aggregated CSI-RS resources to carry the M CSI-RS ports. A number (Q) of antenna ports carried within each aggregated CSI-RS resource is an integer multiple of $N_{ports}^{CSI}$. Particular embodiments may include any of the resource mappings described above with respect to FIGS. 13-23.

At step 2414, the network node transmits the M CSI-RS to a wireless device. A fraction of the M ports are transmitted over a first PRB and a remaining fraction of the M ports are transmitted over a second PRB. For example, network node 120 may transmit 32 CSI-RS to wireless device 110. A fraction of the 32 ports (e.g., 16) may be transmitted on the odd numbered PRBs, and the remaining CSI-RS (e.g., 16) may be transmitted on the even numbered PRBs. Particular embodiments may transmit the M CSI-RS according to any of the examples described above with respect to FIGS. 13-23. Wireless device 110 may use the CSI-RS to perform channel estimation.

At step 2416, the network node may receive, from a wireless device, a measured channel state information based on one or more of the transmitted CSI-RS ports. For example, network node 120 may receive a measured channel state information from wireless device 110.

Modifications, additions, or omissions may be made to method 2400. Additionally, one or more steps in method 2400 of FIG. 24 may be performed in parallel or in any suitable order. The steps of method 2400 may be repeated over time as necessary.

FIG. 25 is a flow diagram illustrating an example method in a wireless device of receiving channel state information reference signals (CSI-RS), according to some embodiments. In particular embodiments, one or more steps of FIG. 25 may be performed by radio network elements of wireless network 100 described with respect to FIG. 12.

The method begins at step 2512, where a wireless device receives a number M of CSI-RS ports. A fraction of the M ports are received over a first PRB and a remaining fraction of the M ports are received over a second PRB. For example, wireless device 110 may receive 32 CSI-RS from network node 120. A fraction of the 32 ports (e.g., 16) may be received on the odd numbered PRBs, and the remaining CSI-RS (e.g., 16) may be received on the even numbered PRBs. Particular embodiments may receive the M CSI-RS according to any of the examples described above with respect to FIGS. 13-23.

At step 2514, the wireless device measures a channel of the received CSI-RS ports to estimate an effective channel. For example, wireless device 110 may measure the 32 received CSI-RS and use the measurements to estimate an effective channel between network node 120 and wireless device 110.

At step 2516, the wireless device transmits a measured channel state information to the network node. For example, wireless device 110 may transmit a measured channel state information to network node 120.

Modifications, additions, or omissions may be made to method 2500. Additionally, one or more steps in method 2500 of FIG. 25 may be performed in parallel or in any suitable order. The steps of method 2500 may be repeated over time as necessary.

Figure 26B:
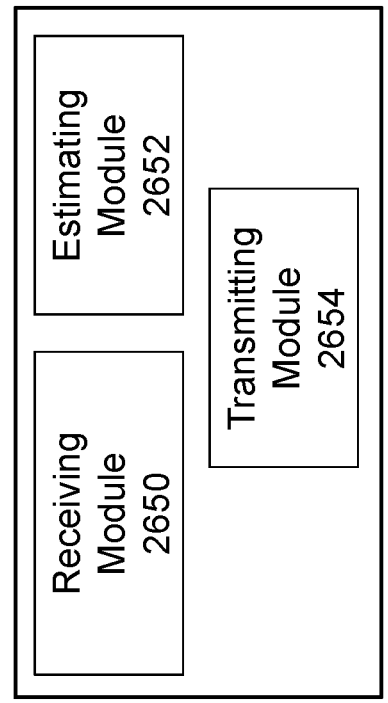
FIG. 26B is a block diagram illustrating example components of a wireless device.
Figure 26A:
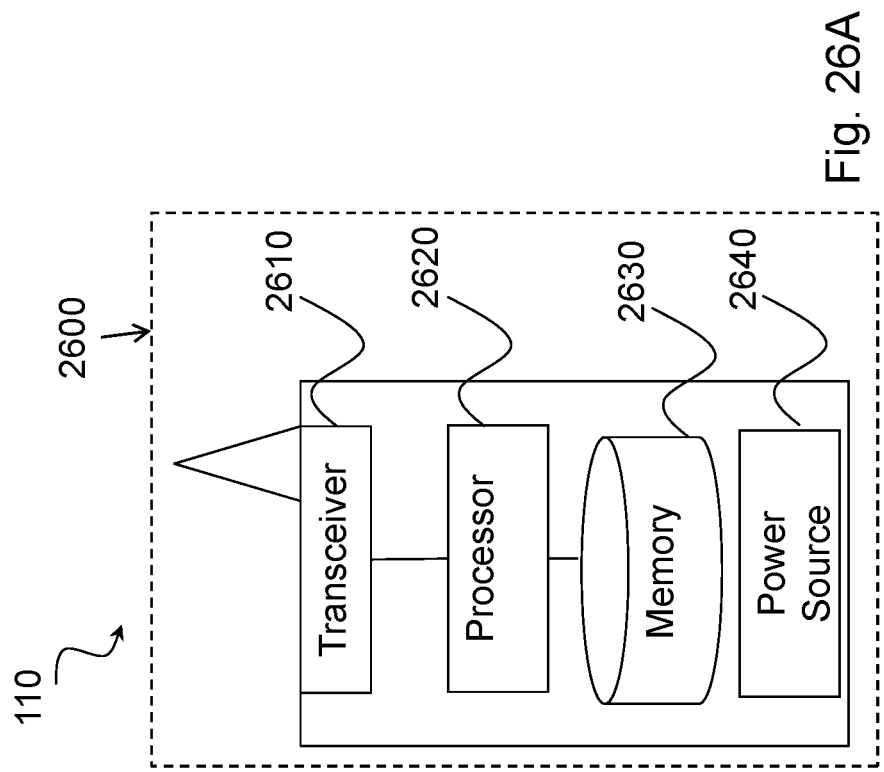
FIG. 26A is a block diagram illustrating an example embodiment of a wireless device.

FIG. 26A is a block diagram illustrating an example embodiment of a wireless device. The wireless device is an example of the wireless devices 110 illustrated in FIG. 12. In particular embodiments, the wireless device is capable of receiving a number M (M>16) of CSI-RS ports from a network node. A fraction of the M ports are received over a first PRB and a remaining fraction of the M ports are received over a second PRB.

Particular examples of a wireless device include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, a vehicle-to-vehicle device, or any other device that can provide wireless communication. The wireless device includes processing circuitry 2600. Processing circuitry 2600 includes transceiver 2610, processor 2620, memory 2630, and power source 2640. In some embodiments, transceiver 2610 facilitates transmitting wireless signals to and receiving wireless signals from wireless network node 120 (e.g., via an antenna), processor 2620 executes instructions to provide some or all of the functionality described herein as provided by the wireless device, and memory 2630 stores the instructions executed by processor 2620. Power source 2640 supplies electrical power to one or more of the components of wireless device 110, such as transceiver 2610, processor 2620, and/or memory 2630.

Processor 2620 includes any suitable combination of hardware and software implemented in one or more integrated circuits or modules to execute instructions and manipulate data to perform some or all of the described functions of the wireless device. In some embodiments, processor 2620 may include, for example, one or more computers, one more programmable logic devices, one or more central processing units (CPUs), one or more microprocessors, one or more applications, and/or other logic, and/or any suitable combination of the preceding. Processor 2620 may include analog and/or digital circuitry configured to perform some or all of the described functions of wireless device 110. For example, processor 2620 may include resistors, capacitors, inductors, transistors, diodes, and/or any other suitable circuit components.

Memory 2630 is generally operable to store computer executable code and data. Examples of memory 2630 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

Power source 2640 is generally operable to supply electrical power to the components of wireless device 110. Power source 2640 may include any suitable type of battery, such as lithium-ion, lithium-air, lithium polymer, nickel cadmium, nickel metal hydride, or any other suitable type of battery for supplying power to a wireless device.

In particular embodiments, processor 2620 in communication with transceiver 2610 transmits a number M of CSI-RS ports to one or more wireless devices. A fraction of the M ports are transmitted over a first PRB and a remaining fraction of the M ports are transmitted over a second PRB.

Other embodiments of the wireless device may include additional components (beyond those shown in FIG. 26A) responsible for providing certain aspects of the wireless device's functionality, including any of the functionality described above and/or any additional functionality (including any functionality necessary to support the solution described above).

FIG. 26B is a block diagram illustrating example components of a wireless device 110. The components may include receiving module 2650, estimating module 2652, and transmitting module 2654.

Receiving module 2650 may perform the receiving functions of wireless device 110. For example, receiving module 2650 may receive M (M>16) CSI-RS antenna ports in one or more PRBs according to any of the examples described with respect to FIGS. 13-25. In certain embodiments, receiving module 2650 may include or be included in processor 2620. In particular embodiments, receiving module 2650 may communicate with estimating module 2652 and transmitting module 2654.

Estimating module 2652 may perform the estimating functions of wireless device 110. For example, estimating module 2652 may estimate a wireless channel using the received CSI-RS. In certain embodiments, estimating module 2652 may include or be included in processor 2620. In particular embodiments, estimating module 2652 may communicate with receiving module 2650 and transmitting module 2654.

Transmitting module 2654 may perform the transmitting functions of wireless device 110. For example, transmitting module 2654 may transmit a measured channel state information to network node 120. In certain embodiments, transmitting module 2654 may include or be included in processor 2620. In particular embodiments, transmitting module 2654 may communicate with receiving module 2650 and estimating module 2652.

FIG. 27A is a block diagram illustrating an example embodiment of a network node. The network node is an example of the network node 120 illustrated in FIG. 12. In particular embodiments, the network node is capable of transmitting a number M (M>16) of CSI-RS ports to one or more wireless devices. A fraction of the M ports are transmitted over a first PRB and a remaining fraction of the M ports are transmitted over a second PRB.

Network node 120 can be an eNodeB, a nodeB, a base station, a wireless access point (e.g., a Wi-Fi access point), a low power node, a base transceiver station (BTS), a transmission point or node, a remote RF unit (RRU), a remote radio head (RRH), or other radio access node. The network node includes processing circuitry 2700. Processing circuitry 2700 includes at least one transceiver 2710, at least one processor 2720, at least one memory 2730, and at least one network interface 2740. Transceiver 2710 facilitates transmitting wireless signals to and receiving wireless signals from a wireless device, such as wireless devices 110 (e.g., via an antenna); processor 2720 executes instructions to provide some or all of the functionality described above as being provided by a network node 120; memory 2730 stores the instructions executed by processor 2720; and network interface 2740 communicates signals to backend network components, such as a gateway, switch, router, Internet, Public Switched Telephone Network (PSTN), controller, and/or other network nodes 120. Processor 2720 and memory 2730 can be of the same types as described with respect to processor 2620 and memory 2630 of FIG. 26A above.

In some embodiments, network interface 2740 is communicatively coupled to processor 2720 and refers to any suitable device operable to receive input for network node 120, send output from network node 120, perform suitable processing of the input or output or both, communicate to other devices, or any combination of the preceding. Network interface 2740 includes appropriate hardware (e.g., port, modem, network interface card, etc.) and software, including protocol conversion and data processing capabilities, to communicate through a network.

In particular embodiments, processor 2720 in communication with transceiver 2710 transmits a number M of CSI-RS ports to one or more wireless devices. A fraction of the M ports are transmitted over a first PRB and a remaining fraction of the M ports are transmitted over a second PRB.

Other embodiments of network node 120 include additional components (beyond those shown in FIG. 27A) responsible for providing certain aspects of the network node's functionality, including any of the functionality described above and/or any additional functionality (including any functionality necessary to support the solution described above). The various different types of network nodes may include components having the same physical hardware but configured (e.g., via programming) to support different radio access technologies, or may represent partly or entirely different physical components.

FIG. 27B is a block diagram illustrating example components of a network node 120. The components may include mapping module 2750, transmitting module 2752, and receiving module 2754.

Mapping module 2750 may perform the mapping functions of network node 120. For example, mapping module 2750 may map M (M>16) CSI-RS antenna ports to one or more PRBs according to any of the examples described with respect to FIGS. 13-25. In certain embodiments, mapping module 2750 may include or be included in processor 2720. In particular embodiments, mapping module 2750 may communicate with transmitting module 2752 and receiving module 2754.

Transmitting module 2752 may perform the transmitting functions of network node 120. For example, transmitting module 2752 may transmit M (M>16) CSI-RS antenna ports on one or more PRBs according to any of the examples described with respect to FIGS. 13-25. In certain embodiments, transmitting module 2752 may include or be included in processor 2720. In particular embodiments, transmitting module 2752 may communicate with mapping module 2750 and receiving module 2754.

Receiving module 2754 may perform the receiving functions of network node 120. For example, receiving module 2754 may receive a measured channel state information from wireless device 110. In certain embodiments, receiving module 2754 may include or be included in processor 2620. In particular embodiments, receiving module 2754 may communicate with mapping module 2750 and transmitting module 2752.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art.

Accordingly, the above description of the embodiments does not constrain this disclosure. Other changes, substitutions, and alterations are possible without departing from the spirit and scope of this disclosure, as defined by the claims below.

Abbreviations used in the preceding description include:
3GPP Third Generation Partnership Project
BTS Base Transceiver Station
CDM Code Division Multiplexing
D2D Device to Device
DFT Discrete Fourier Transform
DL Downlink
eNB eNodeB
FDD Frequency Division Duplex
LTE Long Term Evolution
MAC Medium Access Control
M2M Machine to Machine
MIMO Multi-Input Multi-Output
MTC Machine Type Communication
NR New Radio
OFDM Orthogonal Frequency Division Multiplexing
PDSCH Physical Downlink Shared Channel
PUCCH Physical Uplink Control Channel
PRB Physical Resource Block
RAN Radio Access Network
RAT Radio Access Technology
RBS Radio Base Station
RE Resource Element
RNC Radio Network Controller
RRC Radio Resource Control
RRH Remote Radio Head
RRU Remote Radio Unit
TDD Time Division Duplex
UE User Equipment
UL Uplink
UTRAN Universal Terrestrial Radio Access Network
WAN Wireless Access Network

The invention claimed is:

1. A method for use in a network node of transmitting channel state information reference signals (CSI-RS), the method comprising:
transmitting a number M of CSI-RS ports to one or more wireless devices, wherein a fraction of the M ports are transmitted over a first physical resource block (PRB) and a remaining fraction of the M ports are transmitted over a second PRB;
M being equal to twenty-eight;
the first PRB including resource elements, the resource elements of the first PRB including at least four groups of aggregated CSI-RS resources, each of the at least four groups including four resource elements, and each of the at least four groups carrying four antenna ports; and
the second PRB including resource elements, the resource elements of the second PRB including at least three groups of aggregated CSI-RS resources, each of the at least three groups including four resource elements, and each of the at least three groups carrying four antenna ports.

2. The method of claim 1, further comprising mapping the number M of CSI-RS ports to resource elements of a radio subframe, wherein a fraction of the M ports are mapped to the first PRB of the subframe and a remaining fraction of the M ports are mapped to the second PRB of the subframe.

3. The method of claim 2, wherein the mapping comprises: grouping the resource elements of the radio subframe into a plurality of aggregated CSI-RS resources, each aggregated CSI-RS resource comprising a number $N_{ports}^{CSI}$ of resource elements per PRB, wherein $N_{ports}^{CSI}$ comprises two, four, or eight resource elements; and combining a number ($^{Nes}$) of the plurality of aggregated CSI-RS resources to carry the M CSI-RS ports, wherein a number (Q) of antenna ports carried within each aggregated CSI-RS resource is an integer multiple of $N_{ports}^{CSI}$.

4. The method of claim 1, further comprising receiving, from a wireless device, a measured channel state information based on one or more of the transmitted CSI-RS ports.

5. The method of claim 1, wherein the first PRB is an odd numbered PRB of a subframe and the second PRB is an even numbered PRB of the subframe.

6. The method of claim 1, wherein the number of CSI-RS ports transmitted in the first PRB is not equal to the number of CSI-RS ports transmitted in the second PRB.

7. The method of claim 1, wherein M is greater than sixteen.

8. The method of claim 1, wherein a length four orthogonal cover code (OCC) is used across the four antenna ports of each of the at least four groups of aggregated CSI-RS resources of the first resource block and the at least three groups of aggregated CSI-RS resources of the second resource block.

9. A method for use in a wireless device of receiving channel state information reference signals (CSI-RS), the method comprising:
receiving a number M of CSI-RS ports, wherein a fraction of the M ports are received over a first physical resource block (PRB) and a remaining fraction of the M ports are received over a second PRB;
M being equal to twenty-eight;
the first PRB including resource elements, the resource elements of the first PRB including at least four groups of aggregated CSI-RS resources, each of the at least four groups including four resource elements, and each of the at least four groups carrying four antenna ports; and
the second PRB including resource elements, the resource elements of the second PRB including at least three groups of aggregated CSI-RS resources, each of the at least three groups including four resource elements, and each of the at least three groups carrying four antenna ports.

10. The method of claim 9, wherein the number M of CSI-RS ports are mapped to resource elements of a radio subframe, and a fraction of the M ports are mapped to the first PRB of the subframe and a remaining fraction of the M ports are mapped to the second PRB of the subframe.

11. The method of claim 9 further comprising:
measuring a channel of the received CSI-RS ports to estimate an effective channel; and transmitting a measured channel state information to a network node.

12. The method of claim 9, wherein the first PRB is an odd numbered PRB of a subframe and the second PRB is an even numbered PRB of the subframe.

13. A network node operable to transmit channel state information reference signals (CSI-RS), the network node comprising processing, the processing circuitry operable to:
transmit a number M of CSI-RS ports to one or more wireless devices, wherein a fraction of the M ports are transmitted over a first physical resource block (PRB) and a remaining fraction of the M ports are transmitted over a second PRB;
M being equal to twenty-eight;
the first PRB including resource elements, the resource elements of the first PRB including at least four groups of aggregated CSI-RS resources, each of the at least four groups including four resource elements, and each of the at least four groups carrying four antenna ports; and
the second PRB including resource elements, the resource elements of the second PRB including at least three groups of aggregated CSI-RS resources, each of the at least three groups including four resource elements, and each of the at least three groups carrying four antenna ports.

14. The network node of claim 13, wherein the processing circuitry is operable to map the number M of CSI-RS ports to resource elements of a radio subframe, and wherein a fraction of the M ports are mapped to the first PRB of the subframe and a remaining fraction of the M ports are mapped to the second PRB of the subframe.

15. The network node of claim 14, the processing circuitry further operable to receive, from a wireless device, a measured channel state information based on one or more of the transmitted CSI-RS ports.

16. The network node of claim 14 wherein the first PRB is an odd numbered PRB of a subframe and the second PRB is an even numbered PRB of the subframe.

17. A wireless device operable to receive channel state information reference signals (CSI-RS), the wireless device comprising processing circuitry, the processing circuitry operable to:
receive a number M of CSI-RS ports, wherein a fraction of the M ports are received over a first physical resource block (PRB) and a remaining fraction of the M ports are received over a second PRB;
M being equal to twenty-eight;
the first PRB including resource elements, the resource elements of the first PRB including at least four groups of aggregated CSI-RS resources, each of the at least four groups including four resource elements, and each of the at least four groups carrying four antenna ports; and
the second PRB including resource elements, the resource elements of the second PRB including at least three groups of aggregated CSI-RS resources, each of the at least three groups including four resource elements, and each of the at least three groups carrying four antenna ports.

18. The wireless device of claim 17, wherein the number M of CSI-RS ports are mapped to resource elements of a radio subframe, and a fraction of the M ports are mapped to the first PRB of the subframe and a remaining fraction of the M ports are mapped to the second PRB of the subframe.

19. The wireless device of claim 17, the processing circuitry further operable to: measure a channel of the received CSI-RS ports to estimate an effective channel; and transmit a measured channel state information to a network node.

20. The wireless device of claim 17, wherein the first PRB is an odd numbered PRB of a subframe and the second PRB is an even numbered PRB of the subframe.

* * * * *